US011127081B1

(12) United States Patent
Kullman et al.

(10) Patent No.: US 11,127,081 B1
(45) Date of Patent: Sep. 21, 2021

(54) GENERATION AND PRESENTATION OF MEDIA TO USERS

(71) Applicant: Allstate Insurance Company, Northbrook, IL (US)

(72) Inventors: Wayne J. Kullman, Glenview, IL (US); Jennifer A. Brandmaier, Chicago, IL (US); Alinawaz Ismaili, Skokie, IL (US); William Loo, Arlington Heights, IL (US); Philip Peter Ramirez, Arlington Heights, IL (US); Grace Song, Glenview, IL (US); Alfasha Zulkifli, Wonder Lake, IL (US)

(73) Assignee: Allstate Insurance Company, Northbrook, IL (US)

( * ) Notice: Subject to any disclaimer, the term of this patent is extended or adjusted under 35 U.S.C. 154(b) by 1069 days.

(21) Appl. No.: 14/338,097

(22) Filed: Jul. 22, 2014

(51) Int. Cl.
*G06Q 40/08* (2012.01)
*G06Q 30/02* (2012.01)

(52) U.S. Cl.
CPC ......... *G06Q 40/08* (2013.01); *G06Q 30/0201* (2013.01)

(58) Field of Classification Search
CPC ..................................................... G06Q 40/00
See application file for complete search history.

(56) References Cited

U.S. PATENT DOCUMENTS

| | | | | |
|---|---|---|---|---|
| 4,831,526 A | * | 5/1989 | Luchs | G06Q 40/02 705/4 |
| 6,186,793 B1 | * | 2/2001 | Brubaker | G06Q 40/08 434/107 |
| 6,453,302 B1 | * | 9/2002 | Johnson | G06Q 30/02 705/27.2 |
| 6,519,571 B1 | * | 2/2003 | Guheen | G06Q 30/02 705/14.66 |
| 7,143,051 B1 | * | 11/2006 | Hanby | G06Q 40/025 705/4 |

(Continued)

FOREIGN PATENT DOCUMENTS

| | | |
|---|---|---|
| EP | 1288815 A1 | 3/2003 |
| WO | 2002044841 A2 | 6/2002 |

OTHER PUBLICATIONS

D. S. Lee, "Are you using the right questions (when you select automation equipment)," Proceedings: Electrical Insulation Conference and Electrical Manufacturing and Coil Winding Conference (Cat. No.99CH37035), Cincinnati, OH, USA, 1999, pp. 447-450, (Automation) (Year: 1999).*

(Continued)

*Primary Examiner* — Chikaodinaka Ojiaku
(74) *Attorney, Agent, or Firm* — Dinsmore & Shohl LLP

(57) ABSTRACT

A computer-assisted method for determining, such as by a computing device, a success rate for a presentation page included in a plurality of insurance presentations is described herein. Based on the success rate for the presentation page, a display of a recommendation for an insurance agent to include the presentation page in an insurance presentation for a customer may be generated. The insurance agent may select an option to include the presentation in the insurance presentation, and the selection may be received at a computing device. The insurance presentation may then be generated to include the presentation page.

20 Claims, 43 Drawing Sheets

(56) References Cited

U.S. PATENT DOCUMENTS

| | | | | |
|---|---|---|---|---|
| 7,319,970 | B1* | 1/2008 | Simone | G06Q 40/00 |
| | | | | 705/4 |
| 7,333,940 | B2* | 2/2008 | Best-Devereux | G06Q 40/00 |
| | | | | 705/35 |
| 8,090,598 | B2* | 1/2012 | Bauer | G06Q 40/02 |
| | | | | 705/4 |
| 8,126,743 | B1 | 2/2012 | Wilk | |
| 8,355,934 | B2* | 1/2013 | Virdhagriswaran | G06Q 40/08 |
| | | | | 705/4 |
| 8,370,155 | B2* | 2/2013 | Byrd | H04M 3/51 |
| | | | | 704/270 |
| 8,433,588 | B2* | 4/2013 | Willis | G06Q 40/08 |
| | | | | 705/4 |
| 8,463,624 | B2* | 6/2013 | Hashim | H04L 63/20 |
| | | | | 705/4 |
| 8,478,769 | B2 | 7/2013 | Goldfarb | |
| 8,527,288 | B2* | 9/2013 | Tivey | G06Q 30/02 |
| | | | | 705/1.1 |
| 8,577,699 | B1* | 11/2013 | Diener | G06Q 40/08 |
| | | | | 705/4 |
| 8,606,512 | B1* | 12/2013 | Bogovich | G01C 21/3407 |
| | | | | 701/423 |
| 8,799,028 | B1* | 8/2014 | Warden | G06Q 10/0635 |
| | | | | 705/4 |
| 8,799,125 | B2* | 8/2014 | Schumann, Jr. | G06Q 40/08 |
| | | | | 705/35 |
| 9,183,593 | B2* | 11/2015 | Willis | G06Q 40/08 |
| 9,521,205 | B1* | 12/2016 | Liao | H04L 67/22 |
| 2002/0194033 | A1* | 12/2002 | Huff | G06Q 40/02 |
| | | | | 705/4 |
| 2003/0004760 | A1* | 1/2003 | Schiff | G06Q 30/02 |
| | | | | 705/5 |
| 2003/0074277 | A1* | 4/2003 | Foutz | G06Q 30/06 |
| | | | | 705/26.1 |
| 2004/0039610 | A1 | 2/2004 | Weitermann et al. | |
| 2004/0044549 | A1* | 3/2004 | Loop | G06Q 40/02 |
| | | | | 705/4 |
| 2006/0100912 | A1* | 5/2006 | Kumar | G06F 16/951 |
| | | | | 705/4 |
| 2006/0200432 | A1* | 9/2006 | Flinn | G06N 7/02 |
| | | | | 706/12 |
| 2006/0200434 | A1* | 9/2006 | Flinn | G06Q 30/0255 |
| | | | | 706/12 |
| 2007/0203872 | A1* | 8/2007 | Flinn | G06N 7/02 |
| | | | | 706/62 |
| 2008/0065426 | A1* | 3/2008 | Ziade | G06Q 40/08 |
| | | | | 705/4 |
| 2009/0070152 | A1* | 3/2009 | Sperske | G06Q 40/08 |
| | | | | 705/4 |
| 2009/0119133 | A1* | 5/2009 | Yeransian | G06Q 40/08 |
| | | | | 705/4 |
| 2009/0216772 | A1* | 8/2009 | Goldfarb | G06Q 10/10 |
| 2010/0004957 | A1* | 1/2010 | Ball | G06Q 40/00 |
| | | | | 705/4 |
| 2010/0063890 | A1* | 3/2010 | Huckleby | G06Q 30/02 |
| | | | | 705/26.1 |
| 2010/0100398 | A1* | 4/2010 | Auker | G06Q 40/08 |
| | | | | 705/4 |
| 2010/0146414 | A1* | 6/2010 | Dongole | G06Q 30/00 |
| | | | | 715/760 |
| 2010/0153137 | A1* | 6/2010 | Rao | G06Q 40/08 |
| | | | | 705/4 |
| 2010/0223078 | A1* | 9/2010 | Willis | G06Q 40/08 |
| | | | | 705/4 |
| 2011/0161116 | A1 | 6/2011 | Peak et al. | |
| 2011/0161117 | A1* | 6/2011 | Busque | G06Q 20/3278 |
| | | | | 705/4 |
| 2011/0166893 | A1* | 7/2011 | McConnell | G06Q 40/08 |
| | | | | 705/4 |
| 2012/0109692 | A1* | 5/2012 | Collins | G06Q 30/00 |
| | | | | 705/4 |
| 2012/0166228 | A1* | 6/2012 | Singleton | G06Q 40/08 |
| | | | | 705/4 |
| 2012/0197667 | A1* | 8/2012 | Reid | G06Q 40/08 |
| | | | | 705/4 |
| 2012/0209633 | A1* | 8/2012 | Brookes | G06Q 40/08 |
| | | | | 705/4 |
| 2012/0226391 | A1* | 9/2012 | Fryer | G08G 1/202 |
| | | | | 701/1 |
| 2012/0271663 | A1* | 10/2012 | Amigo | G06Q 40/02 |
| | | | | 705/4 |
| 2012/0278110 | A1* | 11/2012 | Jones | G06Q 40/08 |
| | | | | 705/4 |
| 2013/0013346 | A1* | 1/2013 | O'Connor | G06Q 10/10 |
| | | | | 705/4 |
| 2013/0066656 | A1* | 3/2013 | Hanson | G06Q 40/08 |
| | | | | 705/4 |
| 2013/0110556 | A1* | 5/2013 | Griffith | G06Q 40/08 |
| | | | | 705/4 |
| 2013/0110560 | A1* | 5/2013 | Syed | G06Q 40/08 |
| | | | | 705/4 |
| 2013/0204645 | A1* | 8/2013 | Lehman | G06Q 20/322 |
| | | | | 705/4 |
| 2013/0238368 | A1* | 9/2013 | Willis | G06Q 40/08 |
| | | | | 705/4 |
| 2013/0325517 | A1* | 12/2013 | Berg | G06Q 40/08 |
| | | | | 705/4 |
| 2014/0012797 | A1* | 1/2014 | Rao | G06Q 10/10 |
| | | | | 706/48 |
| 2014/0012870 | A1* | 1/2014 | Wark | G06Q 10/101 |
| | | | | 707/769 |
| 2014/0025827 | A1* | 1/2014 | Konuk | H04L 67/10 |
| | | | | 709/226 |
| 2014/0074512 | A1* | 3/2014 | Hare | G06Q 40/08 |
| | | | | 705/4 |
| 2014/0089511 | A1* | 3/2014 | McLean | H04L 67/10 |
| | | | | 709/226 |
| 2014/0122688 | A1* | 5/2014 | Partida | G06F 11/0793 |
| | | | | 709/224 |
| 2014/0222469 | A1* | 8/2014 | Stahl | G06Q 40/08 |
| | | | | 705/4 |
| 2014/0298194 | A1* | 10/2014 | Prasad | G06F 3/0482 |
| | | | | 715/745 |
| 2014/0304429 | A1* | 10/2014 | Softky | G06F 40/14 |
| | | | | 710/8 |
| 2014/0324449 | A1 | 10/2014 | Gutschmidt et al. | |
| 2014/0324627 | A1* | 10/2014 | Haver | G06Q 30/0273 |
| | | | | 705/26.9 |
| 2015/0149390 | A1* | 5/2015 | Brdiczka | G06N 5/02 |
| | | | | 706/11 |
| 2015/0347183 | A1* | 12/2015 | Borthakur | G06F 9/4856 |
| | | | | 718/105 |
| 2016/0078136 | A1* | 3/2016 | Nijjer | G06F 16/24575 |
| | | | | 707/706 |
| 2016/0335260 | A1* | 11/2016 | Convertino | G06F 16/2358 |

OTHER PUBLICATIONS

"Prevent premium leakage, asess risk and deliver support claims services"; Insurance GIS Solutions; Retrieved Apr. 4, 2014; <http://www.mapinfo.com/industries/industries-gis-solutions/>.

"Location Analytics: The Future is Where"; Linda Hecht; Innovation Insights; Nov. 1, 2013; <http:insights.wired.com/profiles/blogs/location-analytics-where-the-future-will-be#axzz2xeGvfhRo>.

"GIS for Insurance"; ESRI; GIS Best Practices Series; Mar. 2012; Retrieved Apr. 4, 2014.

"Maptitude Mapping Software"; Caliper Corporation; retrieved Jul. 10, 2014; <http://www.maptitude.com/maptitude/insurance/default.htm>.

"Web Map Layers for Insurance: Real-time reporting and analysis"; Cadcorp (V01); Retrieved Apr. 4, 2014.

"EZLynx Management System Manual"; Elynx; Webcetera, Inc., 2013; retrieved on Apr. 7, 2014.

"Insurance Tech Trends 2013: Elements of Postdigital"; White, Mark, Bill, Briggs, Goldberg, Andrew, O'Mara, Matthew; Deloitte Development LLC; Retrieved Apr. 7, 2014.

(56) References Cited

OTHER PUBLICATIONS

"Maptitude Mapping Software: Route Mapping Software"; Caliper Corporation; retrieved Jul. 22, 2014; <www.caliper.com/Maptitude/route_mapping_software/default.htm>.

RoboAgent—Automation of prospecting for new business, Available ROBO-Agent Modules, www.roboagent.net/addons.html, dated Dec. 18, 2013, 1 page.

Using Blitz Lead management Software to Re-Quote Leads from Alliance, Copyright © 2009-2013 Blitz Lead Manager Slog, www.blitzleadermanager.com/blog/indexphp/2012/using-blitz-to-re-quote-leads-from-alliance/, dated Dec. 18, 2013, 4 pages.

Insurance Data Migrations—Case Study Detail, Grapevine Software Ltd, Quotel ITT & Northpark (SSP)—System Integration, © Copyright 2009-2013 New City Software Ltd, www.insurancedatamigrations.co.uk/index.php? mact=News,cntn01,detail0 &cntnt01articleid=16&cntnt01origid=75&cntnt01detailtemplate=CaseStudy&cntnt . . . , dated Dec. 18, 2013, 2 pages.

Feb. 16, 2018—U.S. Final Office Action—U.S. Appl. No. 14/338,108.
Feb. 26, 2018—U.S. Non-Final Office Action—U.S. Appl. No. 14/327,222.
Aug. 6, 2018—U.S. Non-Final Office Action—U.S. Appl. No. 14/338,108.
Sep. 4, 2018—U.S. Final Office Action—U.S. Appl. No. 14/327,222.
Jun. 8, 2018—U.S. Final Office Action—U.S. Appl. No. 14/327,242.
Jan. 18, 2019—U.S. Final Office Action—U.S. Appl. No. 14/338,108.
May 31, 2019 U.S. Non-Final Office Action—U.S. Appl. No. 14/338,108.
Jun. 20, 2019 U.S. Non-Final Office Action—U.S. Appl. No. 14/327,222.
Oct. 30, 2019—U.S. Final Office Action—U.S. Appl. No. 14/338,108.
Apr. 7, 2020—U.S. Final Office Action—U.S. Appl. No. 14/327,222.
Aug. 5, 2020—U.S. Non-Final Office Action—U.S. Appl. No. 14/338,108.
Dec. 21, 2020—U.S. Non-Final Office Action—U.S. Appl. No. 14/327,222.
Jan. 26, 2021—U.S. Notice of Allowance—U.S. Appl. No. 14/338,108.
NsureanceQuotes.us unveils blog to make shopping for insurance even easier. (Jan. 20, 2010). PR Newswire Retrieved from https://dialog. proquest.com/professional/docview/450655304?accountid=131444 on Jan. 13, 2021 (Year 2010).
QuoteScout is taking the hassle out of shopping for homeowner's Insurance. (Feb. 25, 2009). PR Newswire Retrieved from https://dialog.proquest.com/professional/docview/448200415?accountid=131444 on Jan. 13, 2021 (Year: 2009).

* cited by examiner

Interactive Quote Presentation

Title
Contents
Welcome
My Agency

Refresh

Create Summary

Presentation Placeholder

Next >

< Previous

Customize

GENERATION AND PRESENTATION OF MEDIA TO USERS

BACKGROUND

People seeking insurance coverage (e.g., vehicle insurance, homeowner insurance, life insurance, commercial property insurance, etc.) may interact with insurance agents and/or insurance agencies over the phone, for example, to obtain an insurance quote. However, agents cannot present, for example, visual information to customers over the phone. People seeking insurance coverage may alternatively visit the insurance agent's business location. However, in-person visits may be inconvenient for people seeking insurance. Furthermore, people seeking insurance coverage may learn the insurance coverage details, such as premium and deductible amounts, during conversations with friends and coworkers. These insurance coverage details may affect the person's desire to obtain insurance from an insurance provider after receiving a quote.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, devices, computer-implemented methods, and computer-readable media for determining, such as by a computing device, a success rate for a presentation page included in a plurality of insurance presentations. Based on the success rate for the presentation page, a display of a recommendation for an insurance agent to include the presentation page in an insurance presentation for a customer may be generated. The display of the recommendation for the insurance agent to include the presentation page may comprise a display of the presentation page and a display of the success rate for the presentation page. A selection of an option to include the presentation page in the insurance presentation may be received from the insurance agent. The insurance presentation, including the presentation page, may be generated.

In some aspects, the plurality of insurance presentations may comprise a plurality of insurance quotation presentations. The success rate may comprise a frequency that the plurality of insurance quotation presentations results in an acceptance of an insurance quotation. Alternatively, the success rate may comprise a frequency that insurance agents presenting the plurality of insurance presentations receive positive reviews from customers.

An amount of time spent by insurance agents on the presentation page included in the plurality of insurance presentations may be determined. In these examples, generating the display of the recommendation for the insurance agent to include the presentation page in the insurance presentation may be based on the amount of time spent by insurance agents on the presentation page. Additionally or alternatively, a number of customers that interact with the presentation page during presentations of the plurality of insurance presentations may be determined. Generating the display of the recommendation for the insurance agent to include the presentation page in the insurance presentation may be based on the number of customers that interact with the presentation page.

In some aspects, a question and answer pair may be provided on the presentation page, such as in response to a selection by the insurance agent of the question and answer pair. Furthermore, the plurality of insurance presentations may comprise a plurality of insurance quotation presentations. A frequency that the plurality of insurance quotation presentations including the question and answer pair result in an acceptance of an insurance quotation may be determined. Based on the frequency that the plurality of insurance quotation presentations including the question and answer pair result in an acceptance of an insurance quotation, a display of a recommendation for the insurance agent to include the question and answer pair on the presentation page may be generated.

A system may include an agent display device, a customer display device, a database configured to store information identifying success rates for presentation pages, and a computing device communicatively coupled to the database. The computing device may include a processor and a memory device communicatively coupled to the processor. The memory device may store instructions that, when executed by the processor, cause the computing device to retrieve, from the database, a success rate for a presentation page included in a plurality of insurance presentations. Based on the success rate for the presentation page, the computing device may send, via a network, an instruction for the agent display device to display a recommendation for an insurance agent to include the presentation page in an insurance presentation for a customer. The display of the recommendation for the insurance agent to include the presentation page may comprise a display of the presentation page and a display of the success rate for the presentation page. The computing device may receive an agent selection of an option to include the presentation page in the insurance presentation and generate the insurance presentation including the presentation page. An instruction for the agent display device to display the insurance presentation may be sent via the network, and an instruction for the customer display device to display the insurance presentation may also be sent.

In some aspects, the plurality of insurance presentations may comprise a plurality of insurance quotation presentations, and the success rate may comprise a frequency that the plurality of insurance quotation presentations results in an acceptance of an insurance quotation. Alternatively, the success rate may comprise a frequency that insurance agents presenting the plurality of insurance presentations receive positive reviews from customers.

Aspects of the disclosure relate to systems, devices, computer-implemented methods, and computer-readable media for generating, such as by a computing device of an insurance provider, a first insurance quote for a user. The computing device may receive, from a database, information identifying a plurality of contacts for the user. In response to determining that at least one of the plurality of contacts for the user is a customer of the insurance provider, an insurance quote for the customer may be accessed. A second insurance quote for the user based on the insurance quote for the customer and the first insurance quote for the user may be generated.

In some aspects, generating the second insurance quote for the user based on the insurance quote for the customer and the first insurance quote for the user may comprise generating the second insurance quote by adjusting the first insurance quote to be within a predetermined amount of the insurance quote for the customer. Additionally or alternatively, generating the second insurance quote for the user may comprise in response to a determination that the first insurance quote for the user is less than the insurance quote for the customer, generating the second insurance quote for the user by maintaining an amount of the first insurance quote.

The user may comprise a first user in some aspects. An insurance quote for a second user in a same demographic group as the first user may be accessed. Furthermore, generating the second insurance quote for the first user may comprise generating the second insurance quote for the user based on the insurance quote for the customer, the first insurance quote for the user, and the insurance quote for the second user.

In some aspects, a previous insurance quote for the user may be accessed. Generating the second insurance quote for the user may comprise generating the second insurance quote for the user based on the insurance quote for the customer, the first insurance quote for the user, and the previous insurance quote for the user.

A computing device may generate an insurance quotation presentation for the user, and the insurance quotation presentation may comprise a plurality of presentation pages. A first presentation page of the plurality of presentation pages may include the at least one of the first insurance quote for the user and/or the second insurance quote for the user. The first presentation page including the second insurance quote may be sent via a network to a display device of the user. The first presentation page including the second insurance quote may also be sent to a display device of an insurance agent. Alternatively, a second presentation page including the first insurance quote, the insurance quote for the customer, and an option to adjust the first insurance quote to be within a predetermined amount of the insurance quote for the customer may be sent to a display of the insurance agent. In response to receiving a selection of the option to adjust the first insurance quote, information identifying the second insurance quote may be sent via the network to the display device of the user to be displayed on the first presentation page.

A system may include an agent display device, a database storing information identifying a plurality of contacts for a user, and a computing device of an insurance provider communicatively coupled to the database. The computing device may include a processor and a memory device communicatively coupled to the processor, the memory device storing instructions that, when executed by the processor, cause the computing device to generate a first insurance quote for a user. The information identifying a plurality of contacts for the user may be retrieved from the database. In response to determining that at least one of the plurality of contacts for the user is a customer of the insurance provider, an insurance quote for the customer may be accessed. The insurance quote for the customer may be compared to the first insurance quote for the user. A second insurance quote for the user may be generated based on the comparison of the insurance quote for the customer to the first insurance quote for the user. At least one of the first insurance quote for the user and the second insurance quote for the user may be sent via a network for display on the agent display device.

The memory device may further store instructions that, when executed by the processor, cause the computing device to generate an insurance quotation presentation for the user. The insurance quotation presentation may comprise a plurality of presentation pages, and a first presentation page of the plurality of presentation pages may include the second insurance quote for the user.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 9 illustrates an example interface for an interactive quote session, according to one or more aspects of the disclosure.

FIG. 35 illustrates another example presentation page displaying an explanation of insurance coverage, according to one or more aspects of the disclosure.

FIG. 38 illustrates an example interface listing a plurality of presentations, according to one or more aspects of the disclosure.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
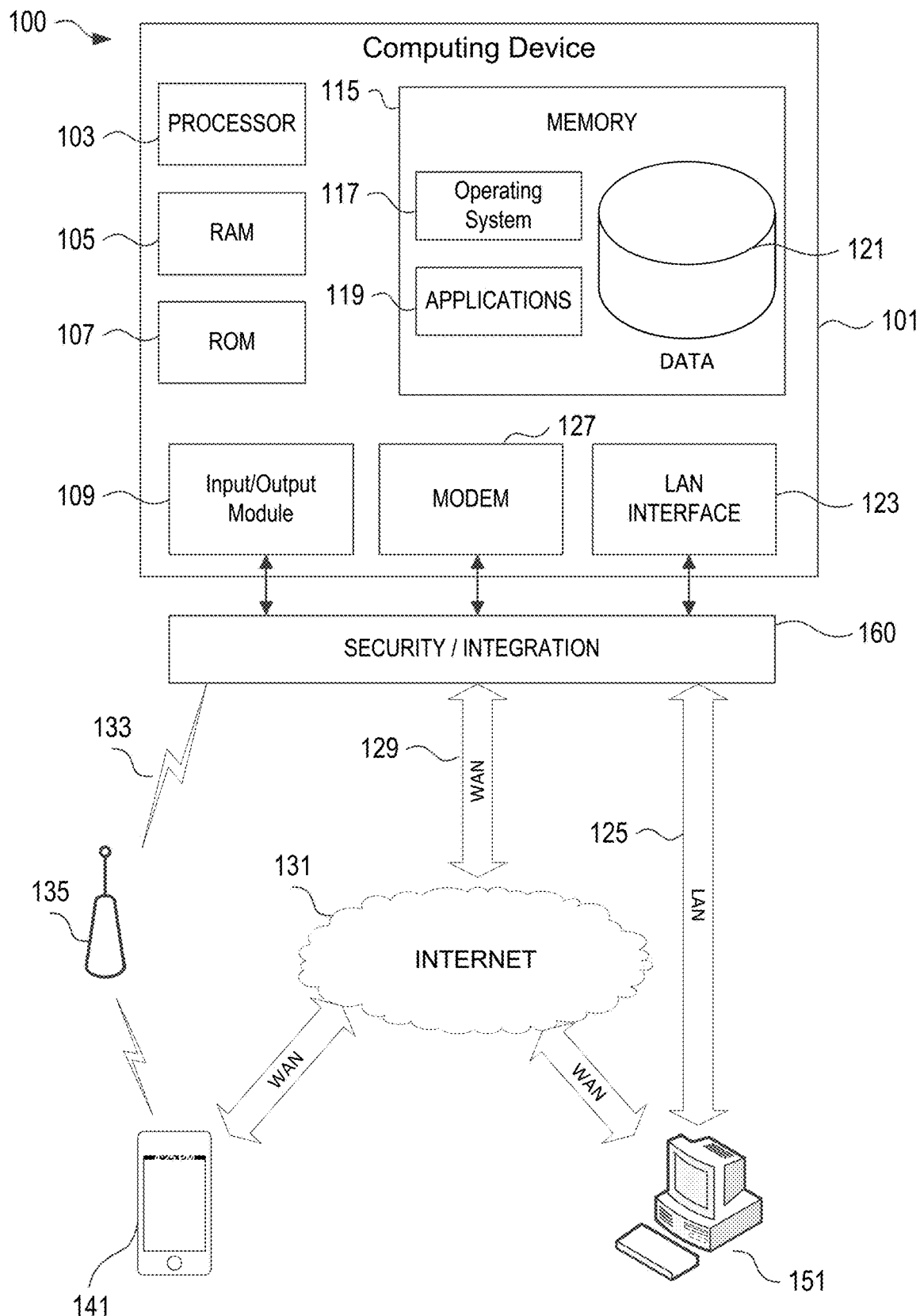
FIG. 1 illustrates a network environment and computer systems that may be used to implement one or more aspects of the disclosure.

FIG. 1 illustrates a block diagram of a computing device 101, or a computing system (e.g., a quote generation and/or presentation device) in a computer system 100 (e.g., a quote generation and/or presentation system) that may be used according to one or more illustrative embodiments of the disclosure. The computing device 101 may have a processor 103 for controlling overall operation of the computing device 101 and its associated components, including one or more memory units (e.g., a random access memory (RAM) 105, a read only memory (ROM) 107), an input/output module 109, and a memory 115. The computing device 101, along with one or more additional devices (e.g., one or more terminals such as the terminals 141 and 151, hardware comprising a security and integration layer 160) may correspond to any of multiple systems or devices, such as an insurance generation and/or presentation system and/or an insurance generation and/or presentation device configured as described herein for providing a presentation platform for insurance agents to present insurance products, ways of using insurance products and/or services, and third party offers, such as a coupon (among other content) to customers. The computing device 101 may also be configured as described herein for generating and/or adjusting quotes based on a comparison to other quotes.

The input/output (I/O) module 109 may include one or more user interfaces, such as a microphone, keypad, touch screen, and/or stylus through which a user of the computing device 101 may provide input, and may also include one or more of a speaker for providing audio output and a video display device for providing textual, audiovisual and/or graphical output. Software may be stored within the memory 115 and/or storage to provide instructions to the processor 103 for enabling the device 101 to perform various actions. For example, the memory 115 may store software used by the device 101, such as an operating system 117, one or more application programs 119, and an associated internal database 121. The various hardware memory units in the memory 115 may include volatile and nonvolatile, removable and non-removable media implemented in any method or technology for storage of information such as computer readable instructions, data structures, program modules or other data. The memory 115 also may include one or more physical persistent memory devices and/or one or more non-persistent memory devices. The memory 115 may include, but is not limited to, the RAM 105, the ROM 107, an electronically erasable programmable read only memory (EEPROM), a flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the processor 103.

The processor 103 may include a single central processing unit (CPU), which may be a single-core or multi-core processor (e.g., dual-core, quad-core, etc.), or may include multiple CPUs. In some cases, the processor 103 may have various bit sizes (e.g., 16-bit, 32-bit, 64-bit, 96-bit, 128-bit, etc.) and various processor speeds (ranging from 100 MHz to 5 GHz or faster). The processor 103 and its associated components may allow the computer system 100 to execute a series of computer-readable instructions, for example, to provide a presentation platform for insurance agents to present insurance products, ways of using insurance products and/or services, third party offers, and the like to customers and/or generate or adjust quotes based on a comparison to other quotes.

The computing device 101 (e.g., a customer terminal, an insurance provider computer hardware memory and processor system, an insurance clearinghouse computer memory and processor device, etc.) may operate in a networked environment (e.g., the computer system 100) supporting connections to one or more remote computers, such as the terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the computing device 101. In some cases, the terminals 141, 151 may be located at one or more different geographic locations, including, but not limited to, at a site associated with an insurance agent and/or agency and/or a site associated with an insurance provider. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the computing device 101 may include a modem 127 or other means for establishing communications over the WAN 129, such as network 131 (e.g., the Internet, a cellular network, and the like). When used in a wireless telecommunications network 133, the computing device 101 may include one or more transceivers, digital signal processors, and additional circuitry and software for communicating with one or more wireless computing devices 141 (e.g., mobile phones, portable customer computing devices) via one or more network devices 135 (e.g., base transceiver stations) in the wireless telecommunications network 133.

Also illustrated in FIG. 1 is a security and integration layer 160, through which communications may be sent and managed between the computing device 101 and the remote devices (e.g., the terminals 141 and 151) and remote networks (e.g., the LAN 125, the WAN 129, and the wireless telecommunications network 133). The security and integration layer 160 may comprise one or more computing devices, such as web servers, authentication servers, and various networking components (e.g., firewalls, routers, gateways, load balancers, etc.), having some or all of the elements described above with respect to the computing device 101. As an example, the security and integration layer 160 may comprise a set of web application servers configured to use secure protocols and to insulate the computing device 101 (e.g., one or more servers, a workstation, etc.) from the external devices (e.g., the terminals 141 and 151). In some cases, the security and integration layer 160 may correspond to a set of dedicated hardware and/or software operating at the same physical location and under the control of same entities as the computing device 101. For example, the security and integration layer 160 may correspond to one or more dedicated web servers and network hardware in a data center or in a cloud infrastructure supporting a cloud-based application and/or process. In other examples, the security and integration layer 160 may correspond to separate hardware and software components which may be operated at a separate physical location and/or by a separate entity.

In some cases, the data transferred to and from the computing device 101 in may include secure and sensitive data, such as insurance customer and policy data. Therefore, it may be desirable to protect the data transmission by using secure network protocols and encryption, and also to protect the integrity of the data stored when on the computing device 101 using the security and integration layer 160 to authenticate users and restrict access to unknown or unauthorized users. In various implementations, the security and integration layer 160 may provide, for example, a file-based integration scheme or a service-based integration scheme. In filed-based integration, data files may be transmitted to and from the computing device 101 through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption.

In service-based integration, one or more web services may be implemented within the computer system 100 between the computing device 101 and/or the security and integration layer 160. The web services may be accessed by authorized external devices and users to support input, extraction, and manipulation of the data in the computing device 101. Web services built to support to the computer system 100 may be cross-domain and/or cross-platform, and may be built for enterprise use. Such web services may be developed in accordance with various web service standards, such as the Web Service Interoperability (WS-I) guidelines. In some examples, system web service may be implemented in the security and integration layer 160 using the Secure Sockets Layer (SSL) or Transport Layer Security (TLS) protocol to provide secure connections between the computing device 101 and various clients, such as the terminals 141 and 151, attempting to access, insert and/or manipulate data within the computer system 100. SSL or TLS may use HTTP or HTTPS to provide authentication and/or confidentiality. In some cases, system web service may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within the memory 115 or other components in the computer system 100, may include one or more caches, for example, CPU caches used by a processing unit (e.g., the processor 103), page caches used by the operating system 117, disk caches of a hard drive, and/or database caches used to cache content from database 121. For embodiments including a CPU cache, the CPU cache may be used by one or more processors (e.g., the processor 103) in the processing unit to reduce memory latency and access time. In such examples, the processor 103 may retrieve data from or write data to the CPU cache rather than reading/writing to the memory 115, which may improve the speed of these operations. In some examples, a database cache may be created in which certain data from a database 121 may be cached in one or more separate smaller databases on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of the computer system 100.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computer devices and life insurance clearinghouse system components described herein may be configured to communicate using any of these network protocols or technologies.

Additionally, one or more application programs 119, such as an insurance presentation application, may be used by the computing device 101 within the computer system 100, including computer executable instructions for providing a presentation platform for insurance agents to present insurance products, ways of using insurance products and/or services, third party offers, and the like to customers and/or generating or adjusting quotes based on a comparison to other quotes.

Figure 2:
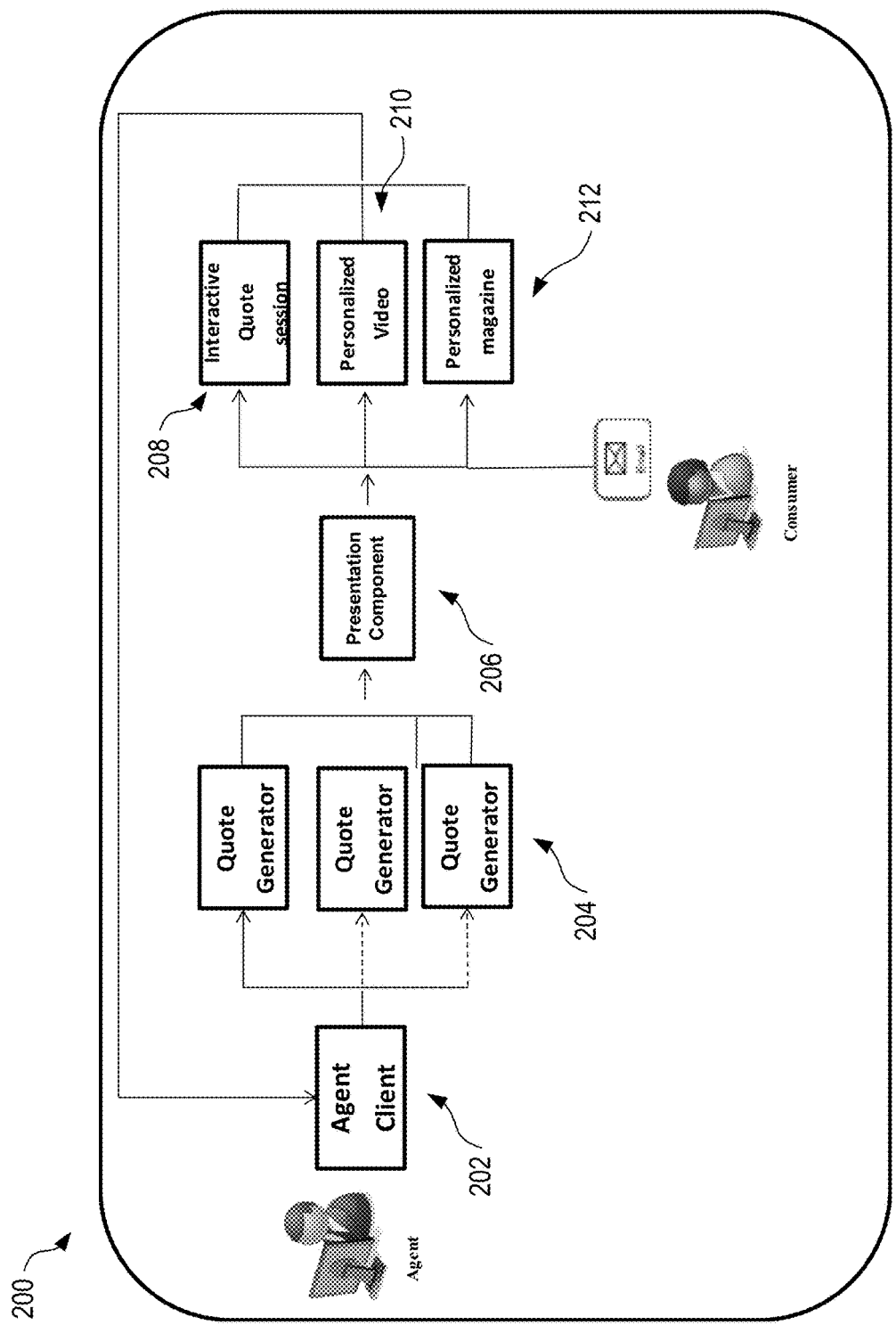
FIG. 2 illustrates an overview of an insurance quote generation and presentation system, according to one or more aspects of the disclosure.

FIG. 2 illustrates an overview of an insurance quote generation and presentation system 200, according to one or more aspects of the disclosure. Additional details of the system 200 will be described in further detail in the examples below and in other figures included herein. An agent may use a computing device, such as a workstation, to interact with one or more customers (consumers)/prospective customers. As used in the present disclosure, the terms customer and prospect may be interchangeable. The computing device may include an agent client application 202 (e.g., an electronic agent) used by the agent to interact with the customer and to retrieve information from various sources. For example, the system 200 may include one or more quote generators 204. Using the quote generators 204, the agent may generate insurance quotes for the customer.

The system 200 may also include a presentation component 206 used by the agent to generate and present insurance information, such as quotes, to the customer. The agent may choose to provide the customer with an interactive quote session 208, a personalized video 210, and/or a personalized magazine 212. These presentations may be used to, for example, create a quote for a new customer, implement policy changes for an existing customer, educate the customer on claims and coverage, update the customer's profile, or explain a quote to the customer. Each presentation will now be briefly described, with additional details to follow in the examples below. During an interactive quote session 208, the agent and customer may provide information to and review information from one another in real time. For example, the agent may provide the customer with an insurance quote, and the customer may accept the insurance quote using the session 208 and/or provide personal information, such as name, address, etc. to the agent or an insurance database. The interactive quote session may also facilitate a live video chat between the customer and the agent, such via microphones and/or cameras at the customer's and agent's computing devices.

The agent may also cause a personalized video 210 to be sent to the customer. The personalized video 210 may comprise audiovisual information that explains insurance basics, insurance quotes, or other information to the customer. In some aspects, the personalized video 210 may be created by a third party vendor. To create a personalized magazine 212 (or the personalized video 210), the agent may send a payload of information, such as insurance quote information, to a third party vendor. The third party vendor may package the information into a magazine format (or video format) and deliver the personalized magazine or video to the customer. The personalized video 210 and magazine 212 need not be generated by a third party vendor and may instead be generated at least in part within the insurance quote generation and presentation system 200. Each of the presentation types may be utilized by the agent or insurance company to sell insurance or other financial products using audio or video, to replace physical visits to the agent's office with virtual visits, and to permit customers' questions to be answered in real time. Additional details for each of the presentation types will be described in further detail in the examples below.

Figure 3:
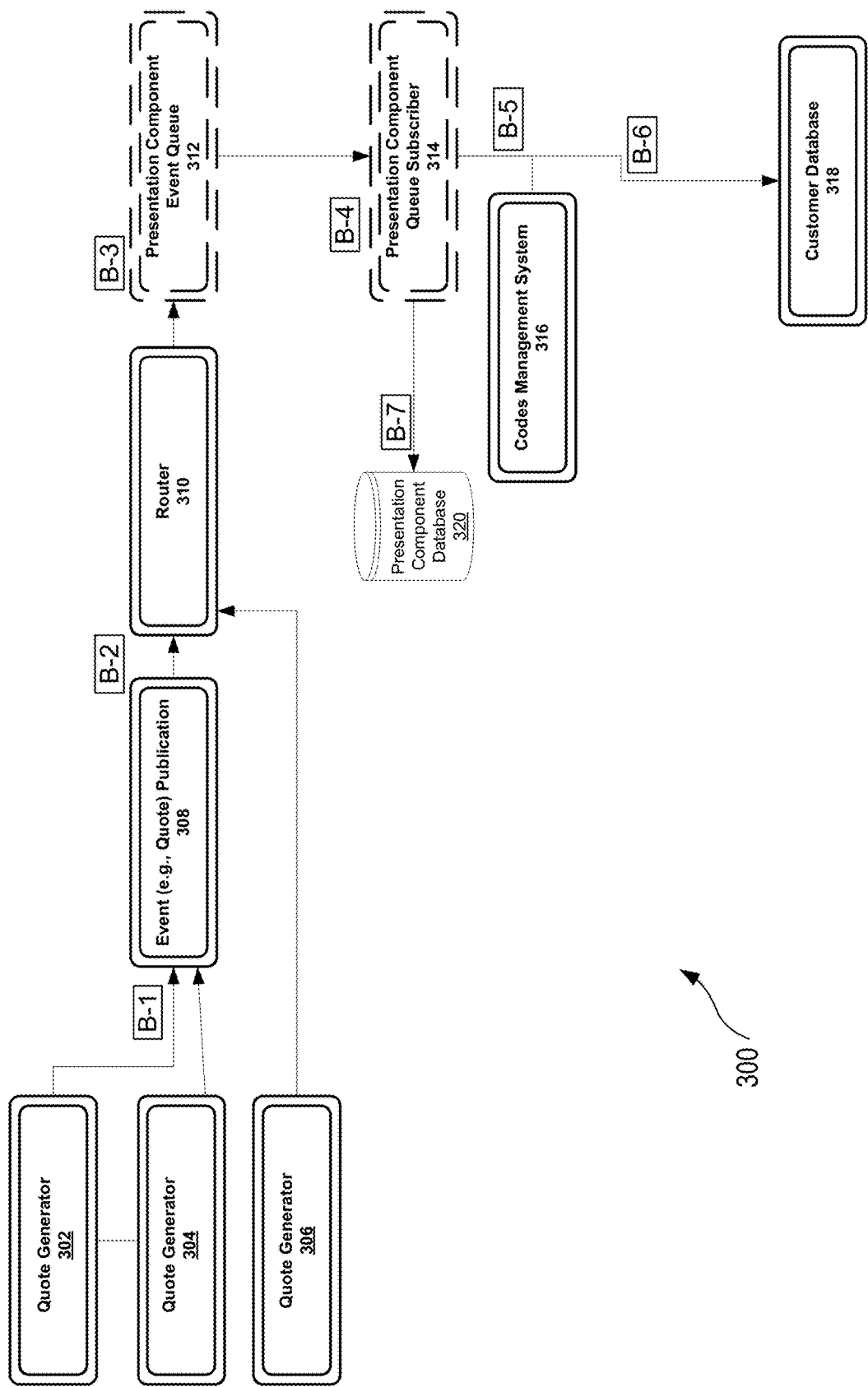
FIG. 3 illustrates various components of an insurance quote data storage system, according to one or more aspects of the disclosure.

FIG. 3 illustrates various components of an insurance quote data storage system 300, according to one or more aspects of the disclosure. The system 300 may include one or more quote generation systems, such as quote generator 302, quote generator 304, and quote generator 306. In step B-1, a computing device may send generated quotes to an event (e.g., quote) publication service 308. In step B-2, the event publication service 308 may publish the events, including generated quotes, to router 310. The router 310 may be a hardware and/or software component that listens for events (e.g., quotes) coming through the insurance provider's event tracking system (e.g., through event publication service 308) and indicates to other components in the system that a new event, such as a quote, is available. In step B-3, a queue, such as an presentation component event queue 312, may be created (or an existing queue may be used) to temporarily store the published events. Each event in the queue 312 may be acted upon in the queue order. Examples of events include saved or bound insurance quotes for particular customers.

In step B-4, a presentation component queue subscriber service 314 (which may run on a computing device) may pull events from the queue 312 and process the events according to a rules engine. The subscriber service 314 may filter out non-applicable events. For example, the subscriber service 314 may detect quotes that do not match certain parameters, such as quotes that do not contain the correct coverages or discounts. As another example, the subscriber service 314 may detect quotes requested by agents that have opted out of the presentation service. The subscriber service 314 may filter out these non-applicable quotes. In step B-5, the subscriber service 314 may call a codes management system 316 to retrieve rules used to determine (e.g., validate) whether each quote event pulled from the queue 312 should be saved into a database, such as presentation component database 320. In step B-6, the subscriber service 314 may access a customer database 318 to determine whether the quote event pulled from the queue 312 corresponds to (e.g., belongs to) a customer of the insurance company. If the quote event belongs to a customer, the subscriber service 314 may store the quote event with the customer's information (e.g., name, address, policy number, etc.) in the presentation component database 320 in step B-7. If the quote event does not belong to a customer of the insurance company, the subscriber service 314 may store the quote event in the database 320 without customer information (or add a new customer profile). The presentation component database 320 may store various types of information, such as quote information (e.g., generated quotes, enriched with customer information if available), agent information (e.g., list of agents using or capable of using the insurance quote generation and presentation system, narratives for the agents, photographs of the agents, and the like), partnerships that the insurance company has with other entities, and life tips of the insurance company.

Figure 4:
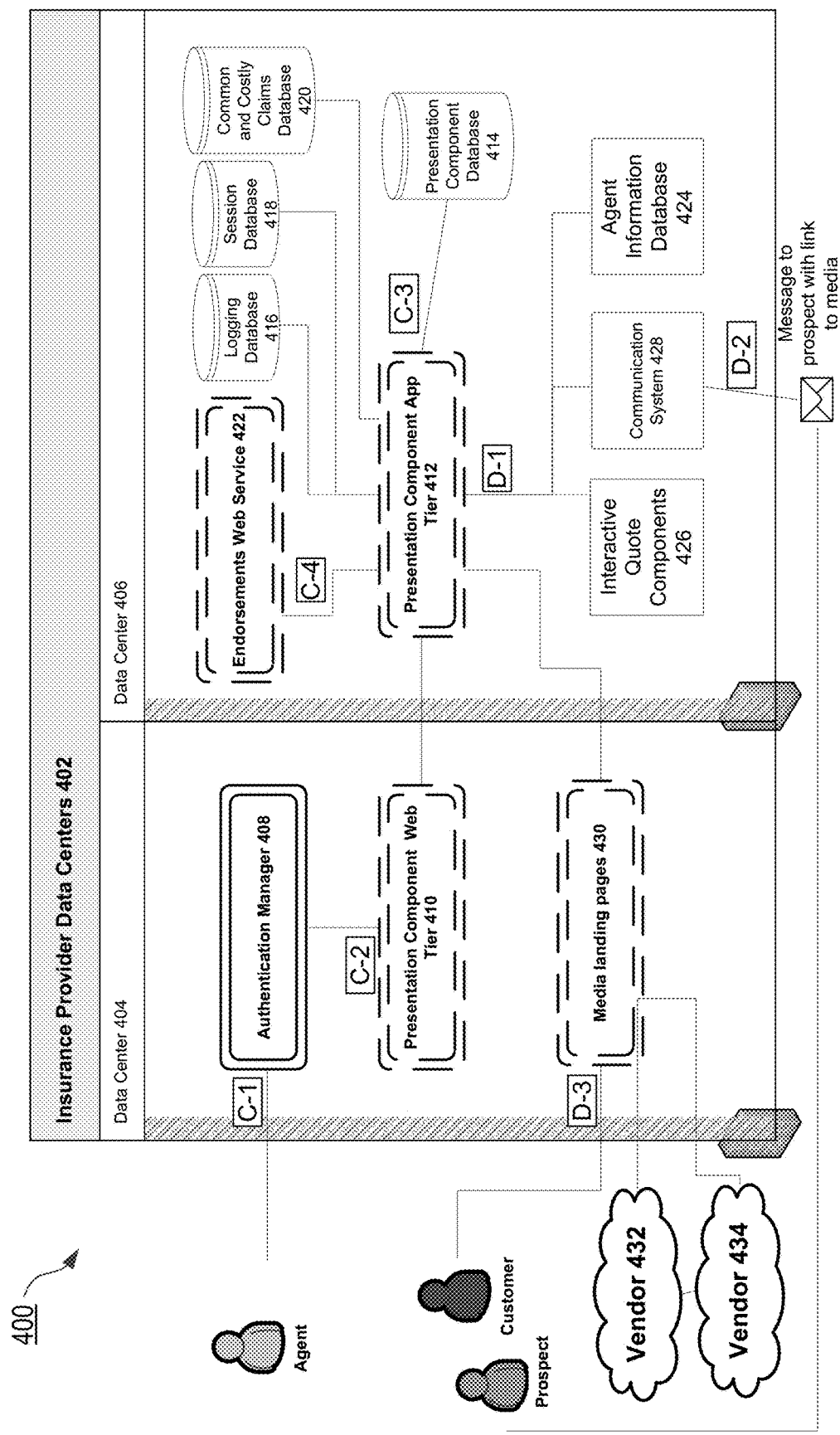
FIG. 4 illustrates various components of a presentation component system, according to one or more aspects of the disclosure.

FIG. 4 illustrates various components of a presentation component system 400, according to one or more aspects of the disclosure. As previously discussed, the presentation components system 400 may be used by the agent to interact with one or more customers or prospective customers in real time. As used in the present disclosure, the terms customer and prospect may be interchangeable. The term customer will generally be used for convenience. The system 400 may include multiple data centers 402 including a first data center 404 and a second data center 406. The data centers may be protected by one or more firewalls or other security measures. In step C-1, an agent, such as a staff agent or an exclusive agent, may be authenticated using an Authentication Manager 408. For example, the agent may provide a username and/or password to log into the presentation component system. The Authentication Manager 408 may run over a UNIX operating system or other operating system, such as WINDOWS.

In step C-2, after the agent is authenticated, the presentation component web tier 410 may display a presentation component webpage or other interface on the agent's workstation. The webpage may display a list of customers who are eligible to receive or are capable of receiving a personalized video, a personalized magazine, and/or an interactive quote session. For example, the web tier 410 may determine the capabilities of each customer's device. If the customer's device has a display, the web tier 410 may determine that the customer is capable of receiving at least the personalized video and the personalized magazine. If the customer's device also has a microphone, camera, or other input/output device for interacting with the agent, the web tier 410 may determine that the customer is also capable of receiving the interactive quote session. The web tier 410 may determine device capability by retrieving the information from a database (e.g., stored based on a previous session between the customer and the insurance company), requesting the information from the customer or his or her device, and/or detecting the capabilities in real time (e.g., based on information provided by the device during a handshake and/or authentication session). The presentation component web tier 410 may be implemented on a computing device having a software framework, such as the MICROSOFT .NET Framework or any other software framework.

In step C-3, the presentation component app tier 412 may store, in a presentation component database 414, information on an interaction with a customer whenever an agent sends personalized media or initiates an interactive quote session with the customer. A copy of the message sent to the customer may be stored. The app tier 412 may also retrieve information from and/or store information at a logging database 416, a session database 418, a common and costly claims database 420, or any other database. The presentation component app tier 412 may be implemented on a computing device having a software framework, such as the MICROSOFT .NET Framework or any other software framework.

In step C-4, the app tier 412 may communicate with an endorsements web service 422 to determine potential discounts on insurance premiums or deductibles that the customer may be eligible for. The potential discounts may be determined (e.g., retrieved) at the time the media (e.g., quote, video, magazine) is generated. In some aspects, the discounts may be valid for a predetermined period of time after the media is generated and/or sent to the customer. The customer may be made aware of the predetermined period of time during the interactive quote session or as part of the personalized video or magazine. For example, the discounts or quotes might expire two days after they are generated or provided to the customer.

In step D-1, the app tier 412 may generate a payload from data stored in one or more database (e.g., databases 414, 416, 418, and/or 420) when an agent instructs the system to send personalized media to or initiate an interactive quote with the customer. The app tier 412 may add information identifying the agent to the payload, such as a photograph of the agent, the agent's biography, the agent's experience, and the like. The agent may provide this information in real time (e.g., by inputting or uploading the information) or may instruct the app tier 412 to retrieve the information from an agent information database 424.

If the media provided to the customer is an interactive quote session, the app tier 412 may also enhance the payload with information from the interactive quote components database 426. The interactive quote components database 426 may include data that enables the agent or customer to interact with and move during the presentation, which might not be available for magazines or videos. For example, an interactive drawing feature that allows the agent or customer to draw on the presentation may be included in the payload. As another example, an interactive map of claims that is clickable or scrollable may be included in the payload. As yet another example, clickable definitions for insurance coverage terms or other concepts may be included in the payload. The drawing feature, interactive map of claims, and clickable concepts will be described in further detail in the examples that follow. After enhancing the payload with information from the databases, the app tier 412 may use the communication system 428 to deliver a message to the customer with a link to the media in step D-2. For example, an email with a URL to the enhanced media may be sent to the customer. Alternatively, the media itself may be delivered directly to the customer.

The customer may click on the link to the media, and in step D-3, the media may be delivered to the customer via media landing pages 430. For example, the landing page 430 may retrieve the appropriate data (e.g., the payload or enhanced payload) from the presentation component app tier 412 or an associated database, such as presentation component database 414. The landing page 430 may call out to an application programming interface (API), such as a vendor-hosted API, which generates the media or enhanced media from the payload to display to the customer. In some aspects, vendors, such as vendor 432 or vendor 434, may optionally be utilized to generate the media from the payload data. The media landing pages 430 may be implemented on a computing device having a software framework, such as the MICROSOFT .NET framework or any other software framework.

Figure 5:
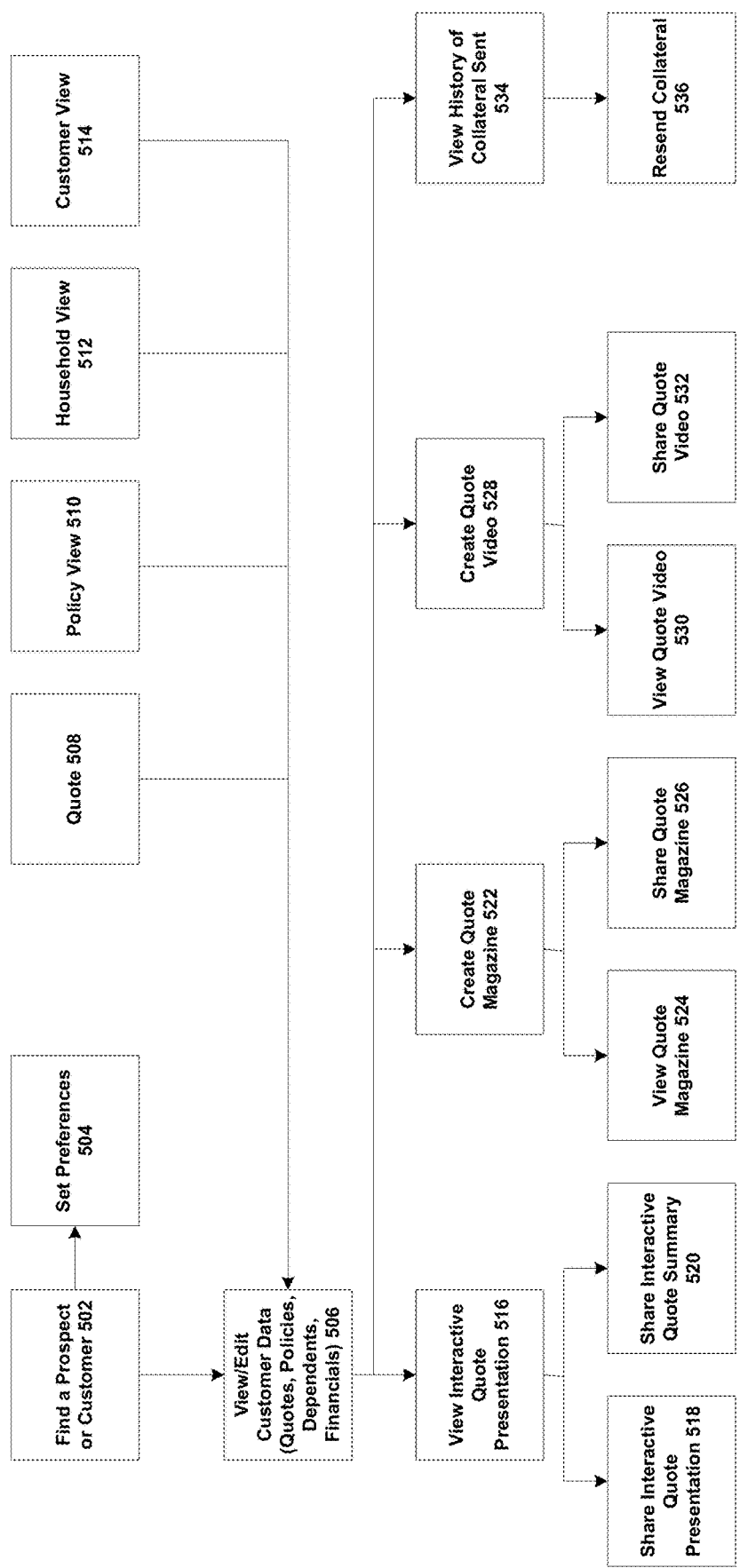
FIG. 5 illustrates an example flow diagram for an example presentation component system, according to one or more aspects of the disclosure.

FIG. 5 illustrates an example flow diagram for an example presentation component system, according to one or more aspects of the disclosure. In step 502, an agent may request to find a customer to send media to, such as an interactive quote session request, a personalized magazine, or a personalized video. The agent may set his or her viewing preferences in step 504. For example, the agent may filter the results to display customers within a particular geographical region (e.g., the state of Illinois, the Chicago metropolitan area, or an area within a predetermined distance from an address or landmark). The agent may also set his or her preferences for viewing the display for interacting with the customer, such as background color, font size, and the like.

Figure 6:
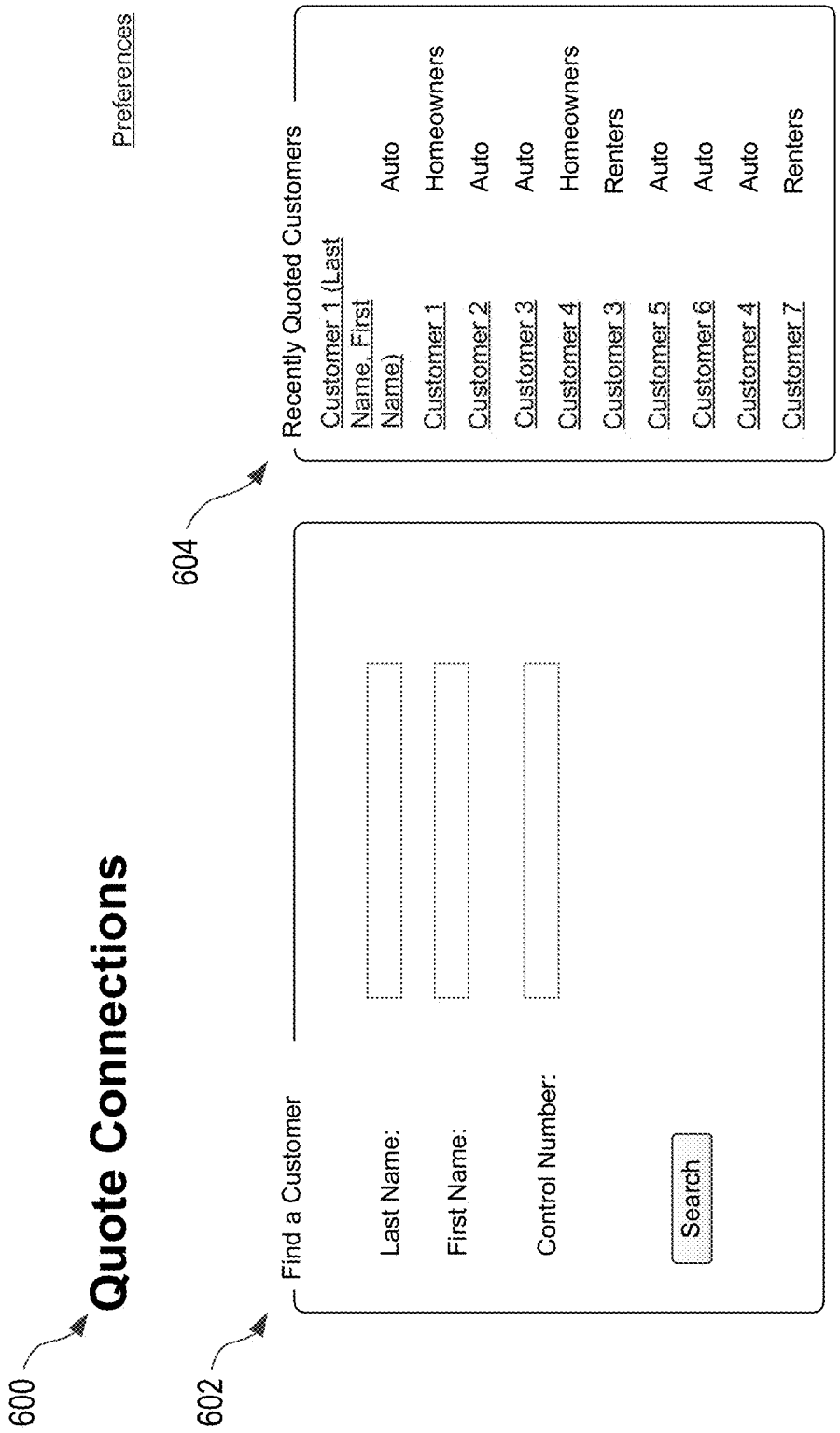
FIG. 6 illustrates an example interface for finding a customer from a database, according to one or more aspects of the disclosure.

FIG. 6 illustrates an example interface 600 for finding a customer from a database, according to one or more aspects of the disclosure. In addition to filtering customers or prospects by geographical region, the agent may be given the option 602 to input a first name and/or a last name to search for a particular customer. The agent may also input a number identifying the insurance quote, such as a control number. A computing device may determine and display the results after the agent clicks on the search option. Furthermore, the recently quoted customers along with the type of insurance quote may be displayed to the agent in data field 604. For example, the first entry in FIG. 6 displays Customer 1's first name and last name and the type of quote (Auto insurance quote). The second entry displays Customer 1 (e.g., first name and last name) along with a Homeowners insurance quote. As another example, the third entry displays Customer 2 and an auto insurance quote.

Returning to FIG. 5, in step 506, the agent may view and/or edit customer data based on the results generated from steps 502 and/or 504. For example, a list of customers that satisfy filters applied by the agent (e.g., geographical region) may be display in step 506. Additional information, such as previous quotes, previous policies, current promotions, dependents of the customer, financial information for the customer, and the like may be displayed to the agent in step 506. This information may be retrieved from one or more databases, such as quote database 508, policy view database 510, household view database 512, and customer view database 514. The agent may select a customer from the list of results.

Figure 7:
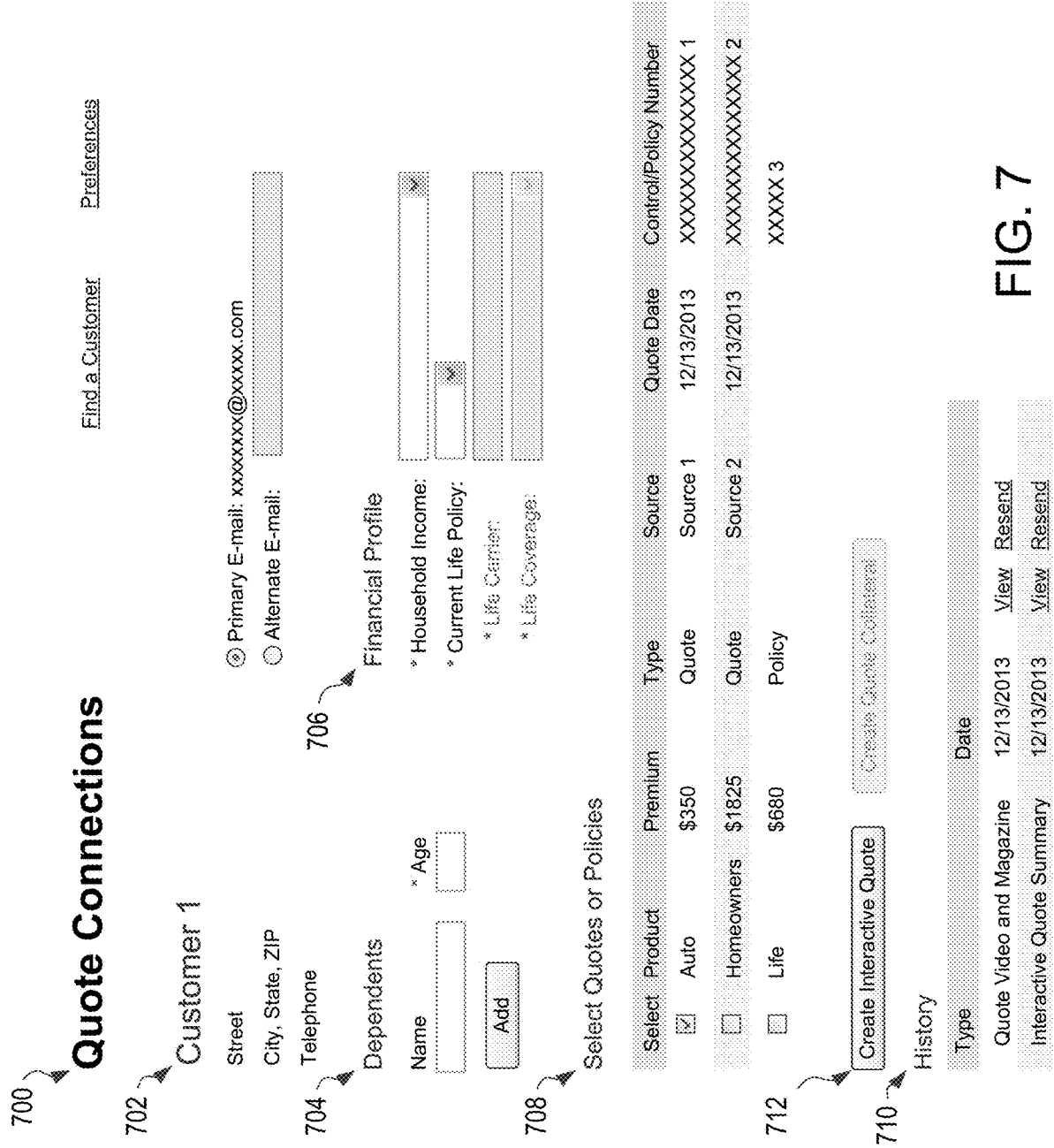
FIG. 7 illustrates an example interface for creating an interactive quote session, according to one or more aspects of the disclosure.

In step 516, the agent may select an option to view an interactive quote presentation. If the agent selects the option, the example interface illustrated in FIG. 7 may be displayed to the agent. FIG. 7 illustrates an example interface 700 for creating an interactive quote session for a selected customer, according to one or more aspects of the disclosure. The interface 700 may display customer information 702, such as an address, telephone number, and/or an e-mail address. The agent may optionally enter dependent information 704 (e.g., name and age) or financial information 706 for the customer if the agent has the information. Otherwise, the input fields may be left blank.

The interface 700 may also display quotes or policies 708 generated for the customer or prospect. The displayed quotes may be previously-generated quotes (e.g., expired quotes) or current quotes. In some aspects, a quote may be current if it is still active (e.g., the customer is still within a predetermined time limit for accepting the quote). For example, the interface 700 illustrates three quotes/policies for Customer 1. The first is an auto insurance quote with a premium of $350.00. The quote may have been generated on 12/13/2013 and assigned the control number XXXXX1. The second is a homeowner's quote with a premium of $1825.00. The quote may also have been generated on 12/13/2013 and assigned the control number XXXXX2. The third is a life insurance policy held by Customer 1 with a premium of $680.00. The policy may have been assigned the policy number XXX3.

The interface 700 may also display an interaction history 710 between the agent (or a different agent) and Customer 1. For example, a quote video and magazine may have been sent to Customer 1 on 12/13/2013. An interactive quote summary may also have been sent to Customer 1 on 12/13/2013. The agent may be given the option to view the previous history or to resend the media items to Customer 1.

Figure 8:
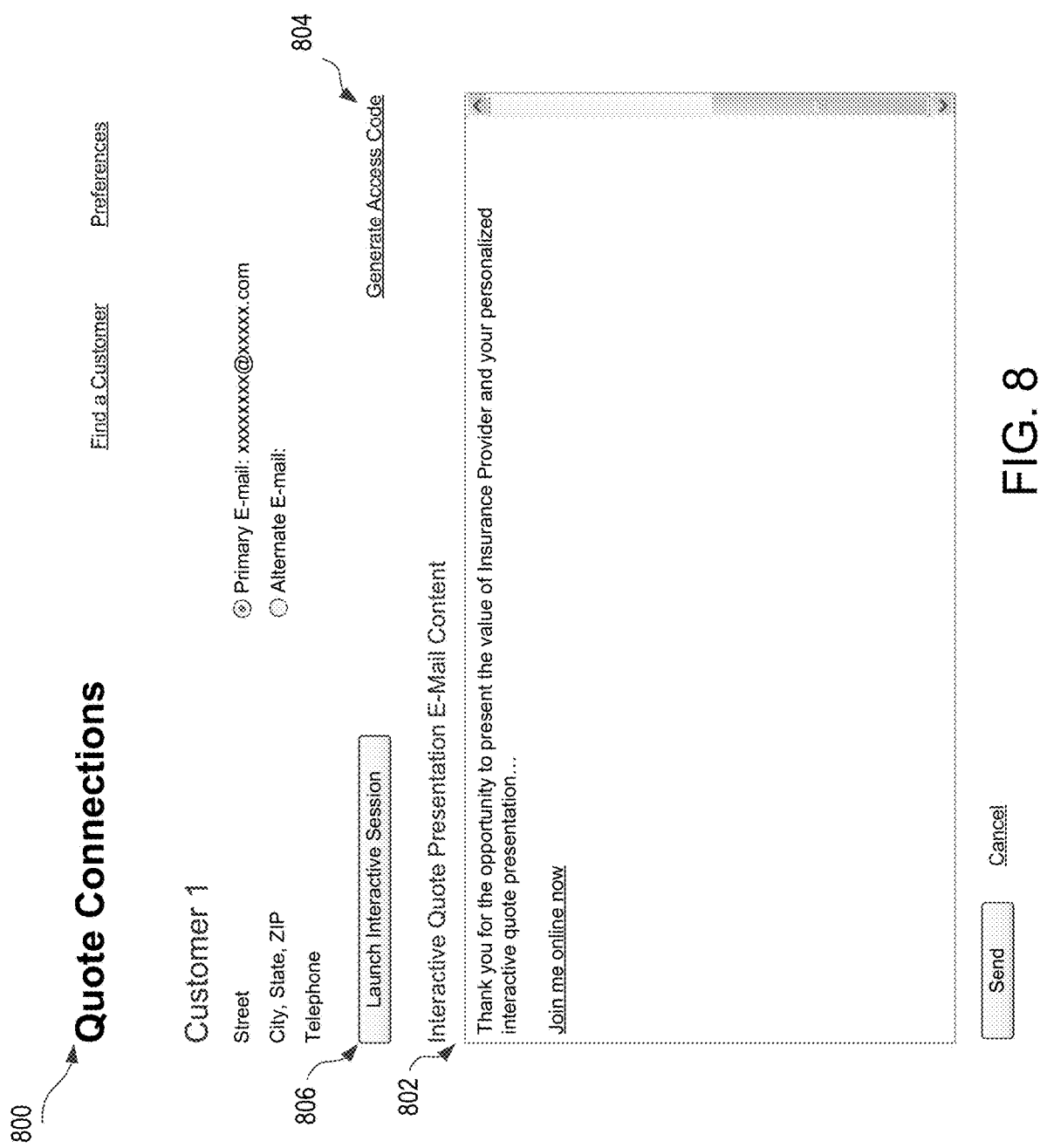
FIG. 8 illustrates an example interface for sharing an interactive quote, according to one or more aspects of the disclosure.

The agent may create an interactive quote session by selecting one or more of the quotes 708 (or by creating a new quote) and selecting the Create Interactive Quote option 712. By selecting the option, the interface illustrated in FIG. 8 may be displayed to the agent. FIG. 8 illustrates an example interface 800 for sharing an interactive quote, according to one or more aspects of the disclosure. The message window 802 may be prepopulated with a message for the customer or prospect to join the agent in an interactive quote session. The message may include a Join me online now link. In order to send the message to Customer 1 (e.g., via email address XXXXXXXX@XXXXX.com), the agent may click the Send button. The message may be sent in any format, such as e-mail, text message, and the like, depending on the contact information the agent has for the customer. The agent may optionally generate an access code by clicking the Generate Access Code option 804. The message sent to Customer 1 may be populated with the Access Code for the interactive quote session. The agent may launch the interactive quote session by clicking the Launch Interactive Session option 806.

Returning to FIG. 5, the agent may share the interactive quote presentation with the customer in step 518. For example, if the agent has launched the session, the customer may join by clicking the link in the message. Additionally or alternatively, the agent may invite the customer to join the presentation direction from the presentation interface, which is illustrated in FIG. 9.

FIG. 9 illustrates an example interface 900 for an interactive quote session, according to one or more aspects of the disclosure. As will be discussed in further detail in the examples below, the agent can interact with the customer using the interactive quote session. For example, the agent may present one or more slides to the customer explaining insurance coverage, deductible amounts, types of insurance available, premium calculations, and the like. The agent may also create and share an interactive quote summary by clicking the Create Summary option during the session. This option corresponds to step 520 illustrated in FIG. 5. The quote summary may comprise a one page summary of the entire presentation. For example, each of the presentation slides may be included in the summary. Additionally or alternatively, a computing device may retrieve content from each presentation slide and include the retrieved content in the summary, rather than include entire slides. The customer may view the summary at a future time. Additional details on the interactive quote session will be described in detail in the examples below.

Returning to FIG. 5, the agent may cause a computing device to create a quote magazine in step 522, view the quote magazine in step 524, and/or share the quote magazine in step 526. Similarly, the agent may cause the computing device to create a quote video in step 528, view the quote video in step 530, and/or share the quote video in step 532.

Figure 10:
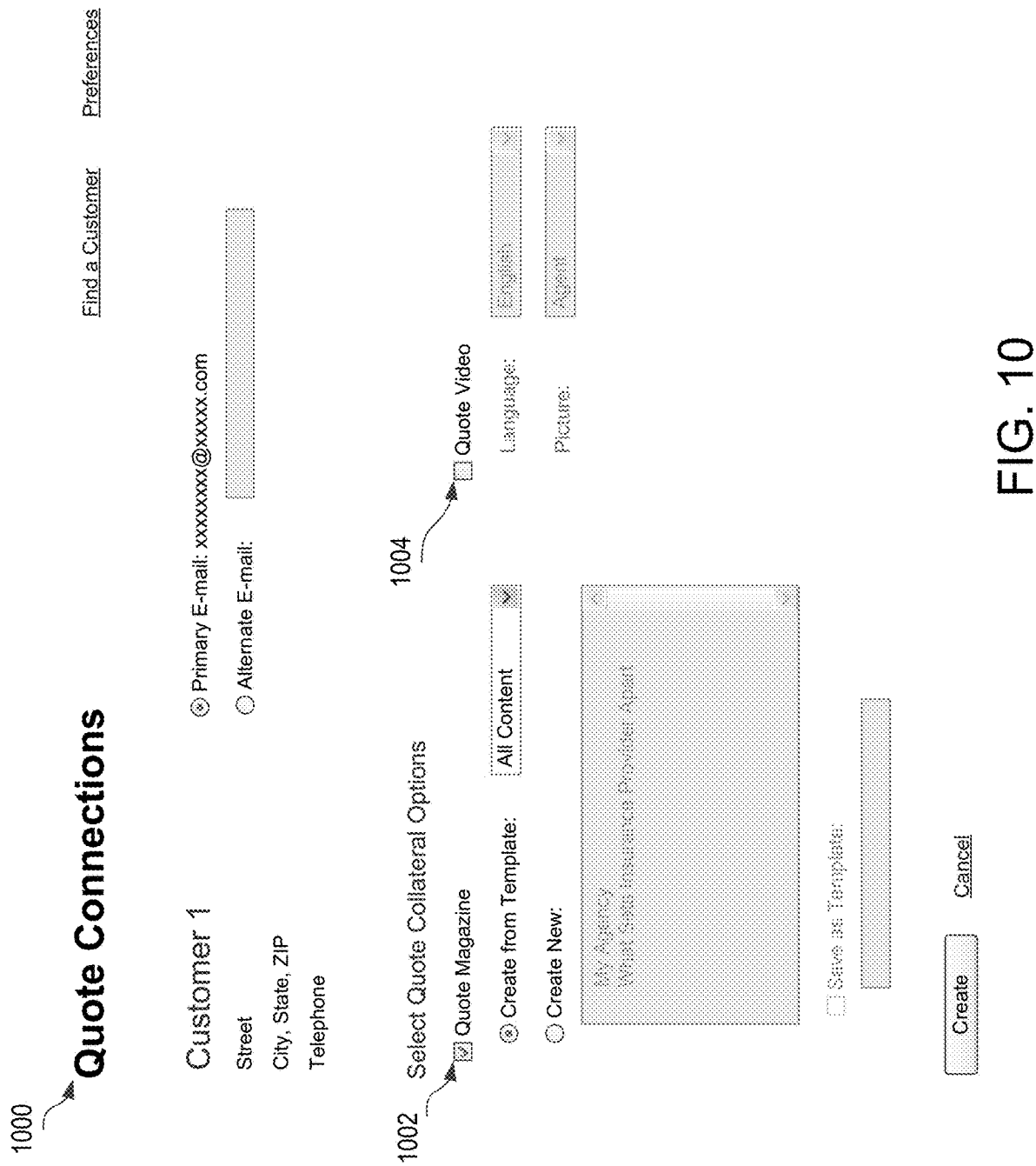
FIG. 10 illustrates an example interface for creating a quote collateral, according to one or more aspects of the disclosure.

FIG. 10 illustrates an example interface 1000 for creating a quote collateral, such as a quote magazine or a quote video, according to one or more aspects of the disclosure. The agent may select the quote magazine option 1002 (e.g., a checkbox, radio button, and the like) to create the magazine. The agent may create the magazine from predefined templates, create a magazine from scratch, or a combination thereof. Additionally or alternatively, the agent may select the quote video option 1004 to create the video. The agent my select the language of the video (e.g., the language spoken in the video or subtitles) and a picture to include in the video, such as a photograph of the agent. If the agent selects the create button, a computing device may create the selected media (magazine and/or video). Alternatively, a request may be sent to a third party vendor with the entered preferences (e.g., create from template, create from new, language, and/or picture) for the vendor to create the magazine or video to the customer or prospect.

Figure 11:
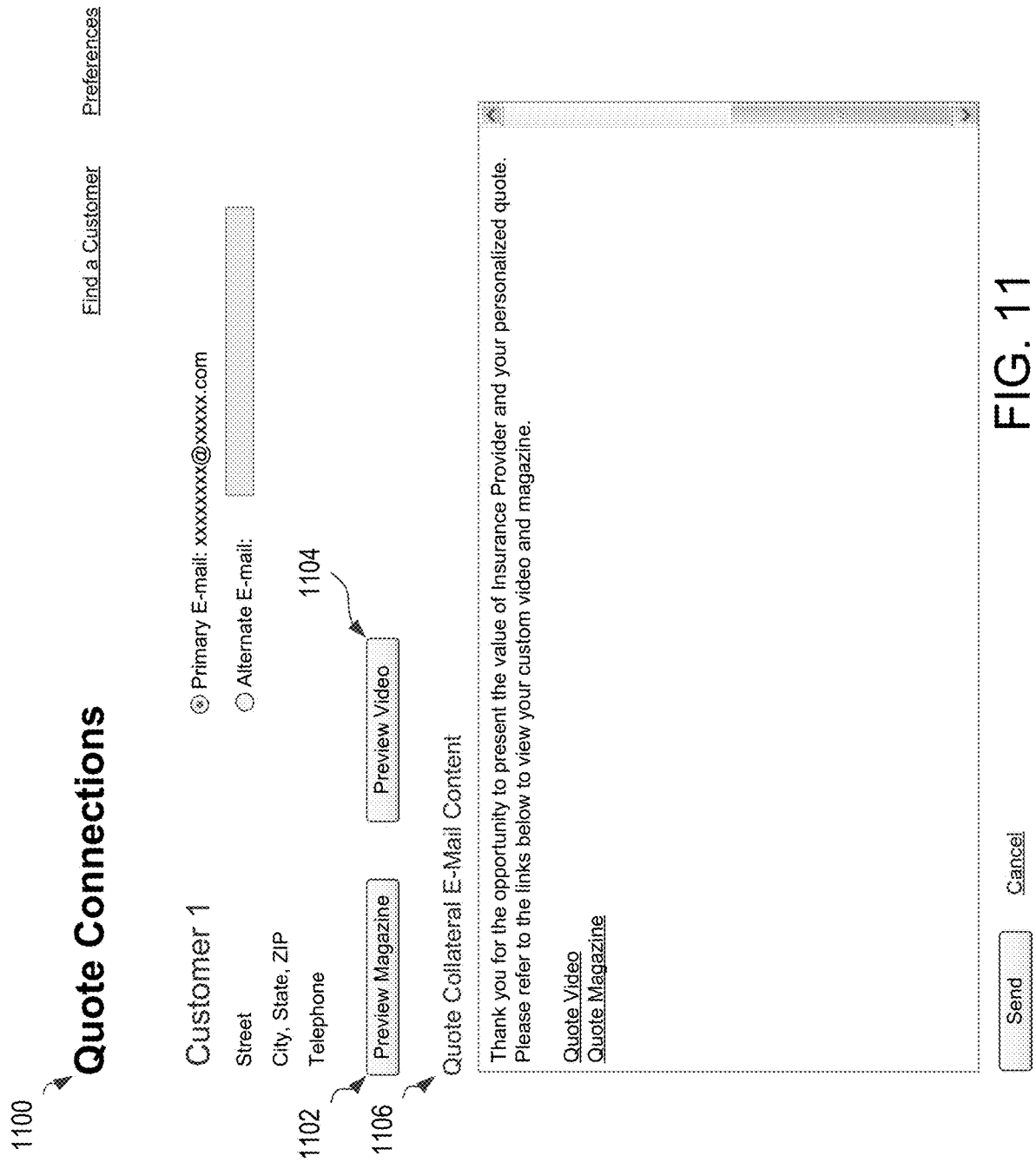
FIG. 11 illustrates an example interface for sharing a quote collateral, according to one or more aspects of the disclosure.

FIG. 11 illustrates an example interface 1100 for sharing a quote collateral, according to one or more aspects of the disclosure. Interface 1100 may be displayed after the magazine and/or video is created or after a request for a vendor to create the magazine and/or video is sent. The agent may preview the magazine by selecting the Preview Magazine button 1102 or preview the video by selecting the Preview Video button 1104. The agent may also send a message 1106, such as an e-mail message or a text message, to the customer. The message 1106 may include a link to the created quote video and/or magazine. Returning to FIG. 5, the agent may be given the option to view a history of media, such as videos, magazines, or interactive quote session requests, sent to the customer in step 534. In step 536, the agent may also instruct the computing device to resend media previously sent to the customer.

Figure 12:
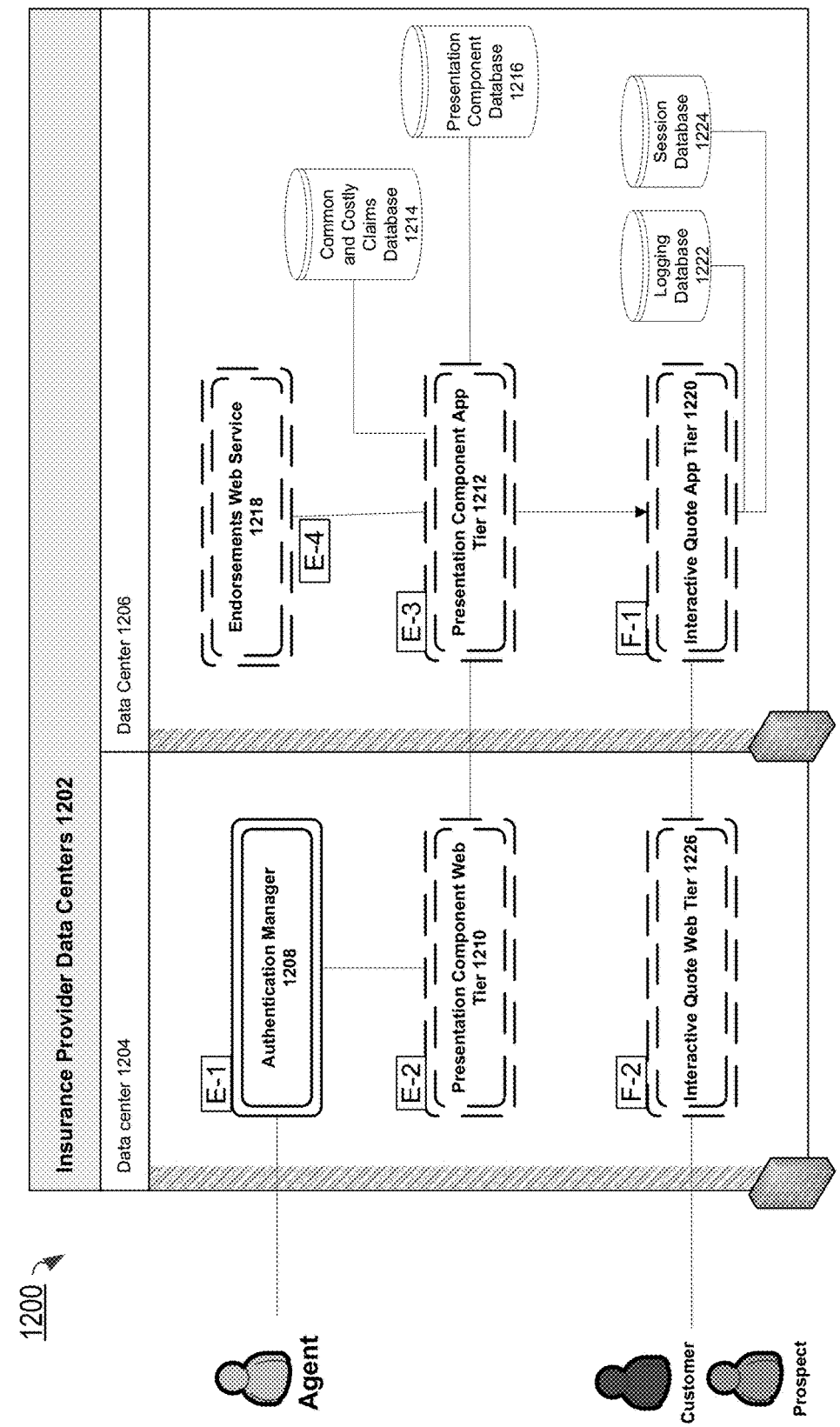
FIG. 12 illustrates various components of an interactive insurance quote system, according to one or more aspects of the disclosure.

Additional details of the interactive insurance quote component of the presentation component system will now be described. FIG. 12 illustrates various components of an interactive insurance quote system 1200, according to one or more aspects of the disclosure. The system 1200 may include data centers 1202, such as data center 1204 and data center 1206, as previously discussed with reference to FIG. 4. The system 1200 may also include an authentication manager 1208 used to authenticate the agent in step E-1, as previously discussed. The system 1200 may include an presentation component web tier 1210, an presentation component 1212, a common and costly claims database 1214, presentation component database 1216, and other databases (not illustrated), as previously discussed. Furthermore, the system 1200 may include an endorsements web service 1218 used to determine potential discounts on insurance premiums or deductibles, as previously discussed.

In step E-2, a web page may request data from app tier 1212 (e.g., via web tier 1210). In particular, the web page may request information indicating the quotes available for an interactive quote session with a customer. In step E-3, the app tier 1212 may determine the quotes available for the requesting agent in order to launch an interactive quote session. For example, the app tier 1212 may retrieve a list of available quotes from the presentation component database 1216. The available quotes may be copied or otherwise stored in one or more databases, such as an app database. Additionally or alternatively, the available quotes may be stored in a master quote system. In step E-4, the app tier 1212 may access the endorsements web service 1218 to determine whether the customer is eligible for one or more discounts, as previously discussed.

The system 1200 may include an interactive quote app tier 1220 and one or more databases, such as logging database 1222 and session database 1224. When an agent launches an interactive quote session, the agent may be directed to the interactive quote infrastructure (including interactive quote app tier 1220) and associated components in step F-1. A link to the interactive quote session initiated by the agent may be sent to the customer. In step F-2, if the customer follows the link, the customer or prospect may be taken to a website hosted by the insurance company or by a third-party vendor via interactive quote web tier 1226. As will be discussed in detail in the examples below, the customer and agent may interact with one another during the interactive quote session. For example, the agent may deliver a presentation to the customer and provide one or more insurance quotes, and the customer may provide personal information such as name and address and/or accept the quotes. The interactive quote app tier 1220 and/or interactive quote web tier 1226 may be implemented on a computing device having a software framework, such as the MICROSOFT .NET framework or any other software framework.

FIGS. 13-39 illustrate example displays during an interactive session between an agent and a customer or prospect, such as during an interactive quote session. As previously discussed, the agent may be authenticated through a data center and access a presentation component application, which may be running on a computing device. After the agent has access to the presentation component application, the agent may initiate a presentation, create a presentation, present the presentation to the customer, or otherwise interact with the customer. The displays (e.g., presentation pages) described herein may display insurance coverage, discount, deductible, and other insurance information in a consumer-friendly language to explain aspects of insurance to the consumer. The computing device may also collect statistics on each agent, presentation, slide, or combination of slides. The statistics may be used by the computing device to recreate successful presentations and/or to identify successful slides or presentations. Agents may reference these statistics to create their presentations. These features will now be described with reference to the example interactive session displays illustrated in FIGS. 13-39.

Figure 13:
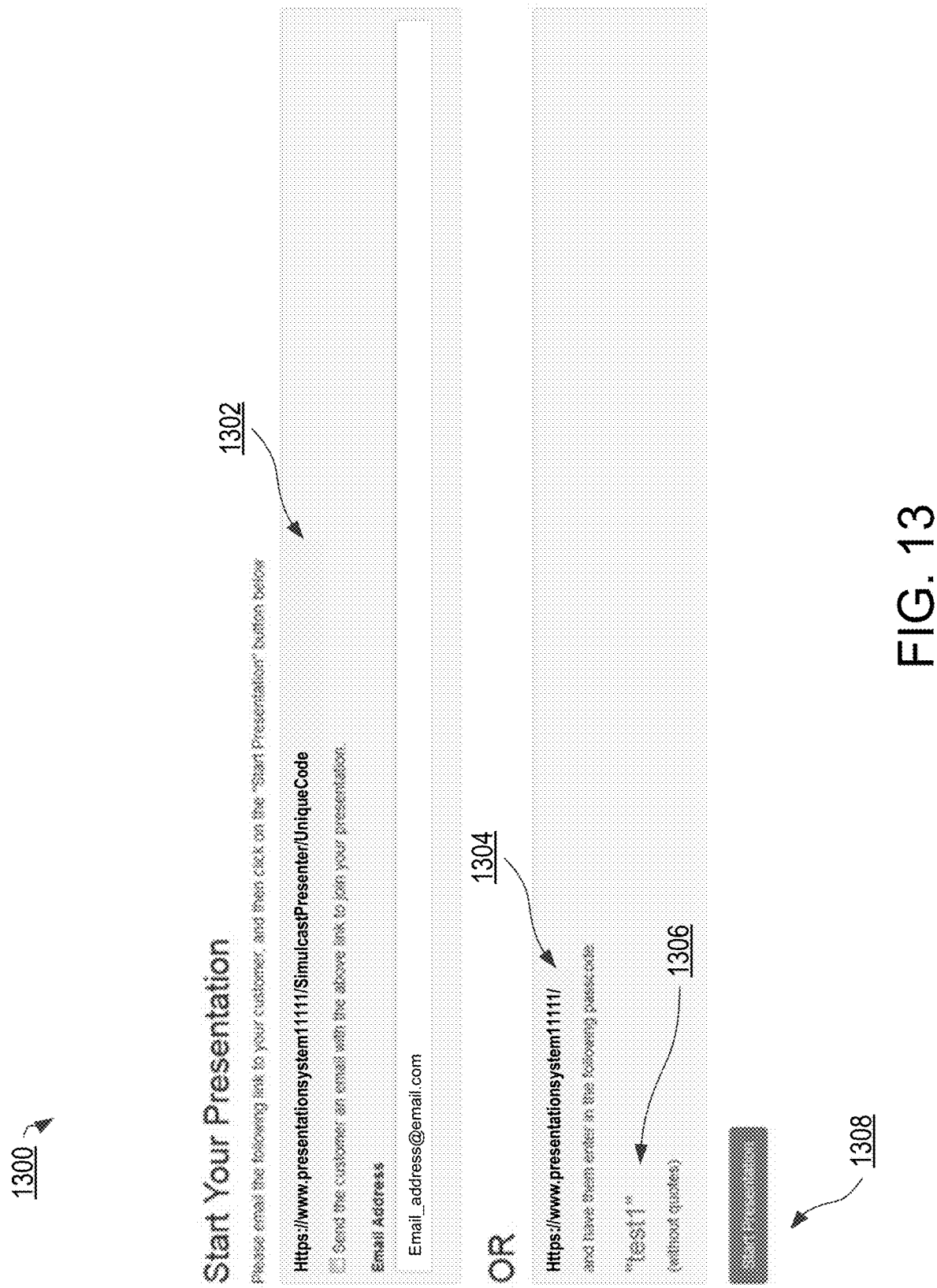
FIG. 13 illustrates an example interface for starting a presentation, according to one or more aspects of the disclosure.

FIG. 13 illustrates an example interface 1300 for starting a presentation, according to one or more aspects of the disclosure. The interface 1300 may be used by the agent to send a link for the presentation to a customer. The computing device may generate (or provide) a unique link 1302 for the presentation. Alternatively, the computing device may generate (or provide) a non-unique link 1304 and a unique passcode 1306 for the presentation. The computing device may send the link and/or passcode to the customer (e.g., via email, text message, or other message format) if, for example, the agent selects the "Start Presentation" option 1308.

Figure 14:
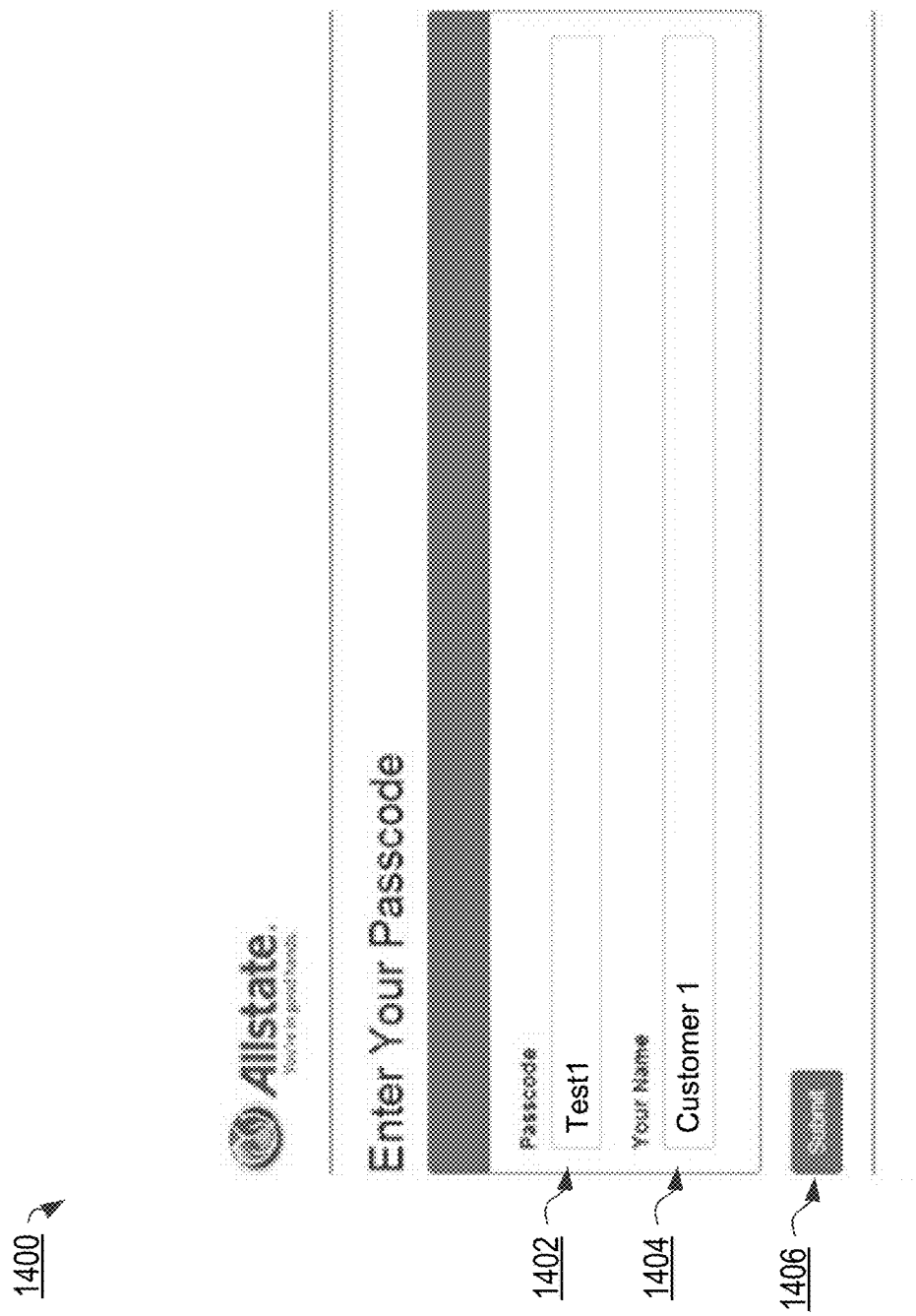
FIG. 14 illustrates an example presentation page for a customer to access a presentation, according to one or more aspects of the disclosure.

FIG. 14 illustrates an example presentation page 1400 for a customer to access a presentation, according to one or more aspects of the disclosure. The presentation page 1400 may be displayed at the customer's computing device, such as a workstation with a display, if a passcode was sent to the customer. The customer may enter the passcode in the passcode input field 1402. The customer may optionally provide his or her name or other identifier in the name input field 1404. After entering the information in the input fields, the customer may select the "Submit" button 1406, which may cause the customer's computing device to notify the agent that the customer has requested an interactive session and/or otherwise send a message to an agency computing device to initiate the interactive session.

Figure 15:
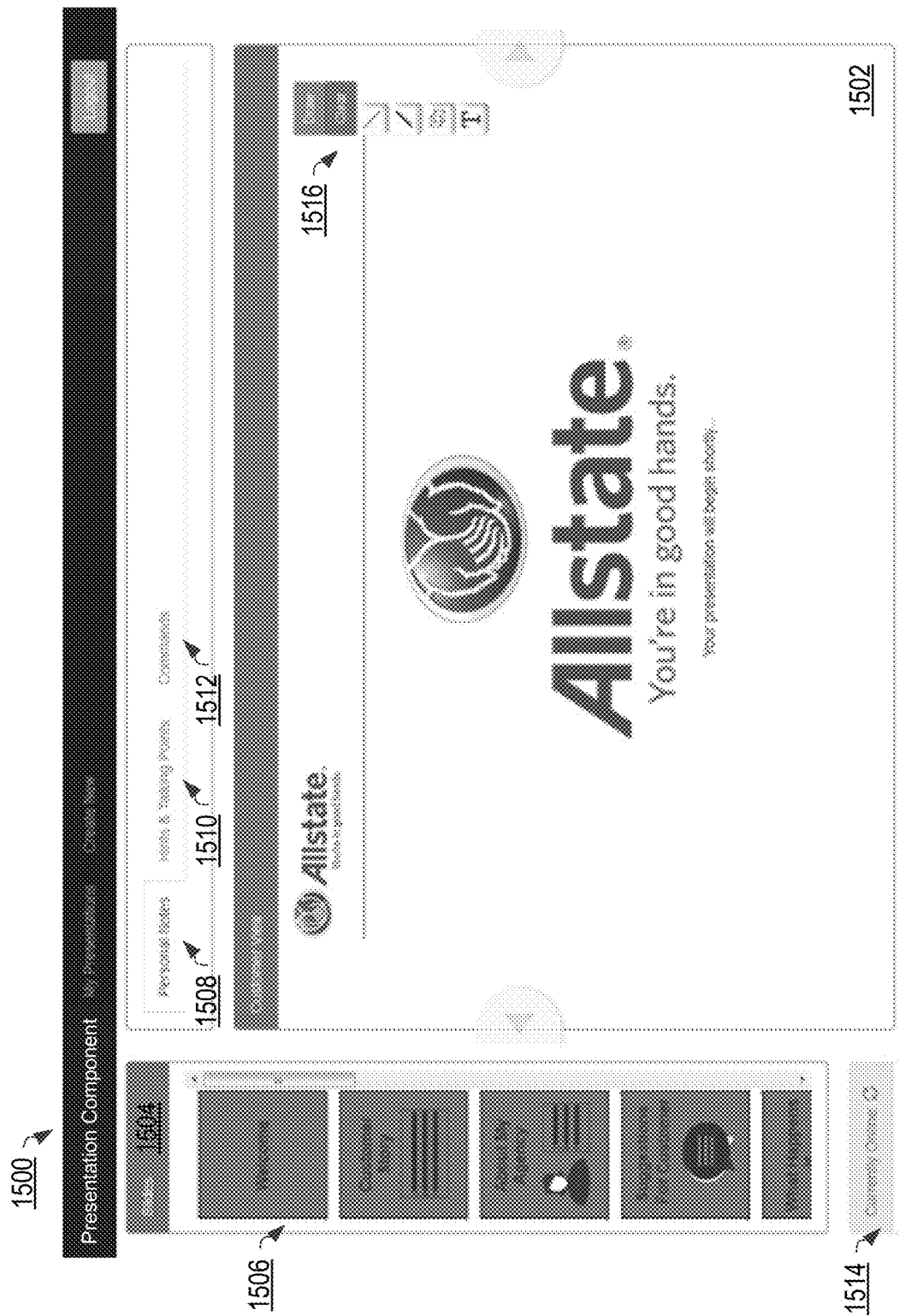
FIG. 15 illustrates an example interface having a presentation start page, according to one or more aspects of the disclosure.

FIG. 15 illustrates an example interface 1500 having a presentation start page 1502, according to one or more aspects of the disclosure. The interface 1500 may be displayed on the agent's computing device. The interface 1500 may display a plurality of slides included in the personalized presentation for the customer in slide pane 1504 (e.g., a master slide listing). In some aspects, the slides included in slide pane 1504 may be representative of the content included in each of the corresponding slides. For example, each slide in slide pane 1504 may summarize the content included in the corresponding page (e.g., presentation start page 1502). As illustrated, the presentation start page 1502 may be represented by the "Welcome" slide 1506 in the slide pane 1504. The agent may input the summary, such as "Welcome," via an I/O device of the computing device, and the computing device may generate the "Welcome" slide 1506 in response to the input. Alternatively, the agent may select from a predetermined list of summary content for each page in the presentation, rather than inputting the summary.

Figure 16:
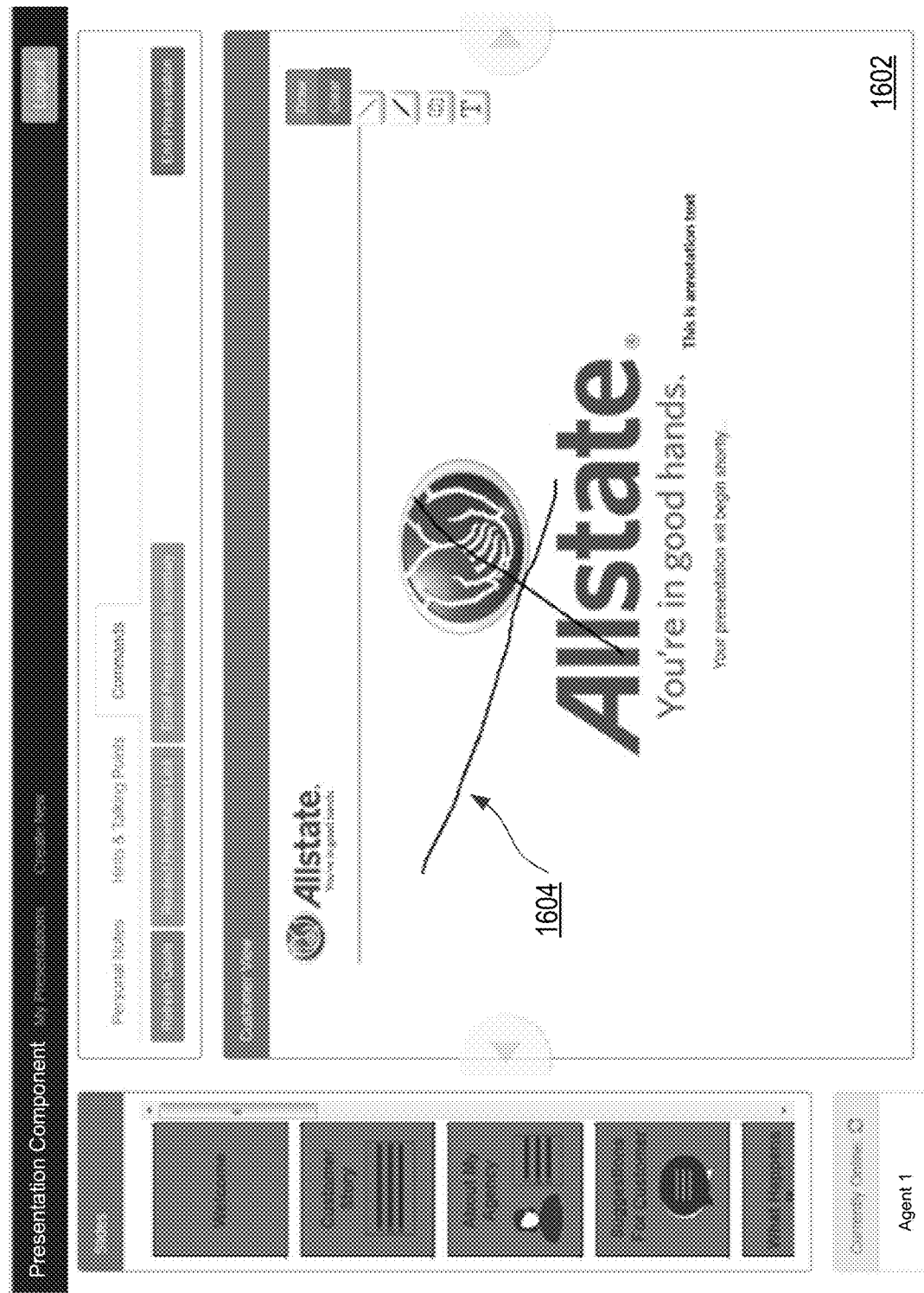
FIG. 16 illustrates an example presentation page having an annotation, according to one or more aspects of the disclosure.

The interface 1500 may also display personal notes 1508, hints and talking points 1510, and/or commands 1512 for the presentation or for each page of the presentation. Personal notes 1508 may comprise notes inputted by the agent. Hints and talking points 1510 might not be inputted by the agent and rather, may be generated by the computing device depending on the page being presented. Commands 1512 may list one or more commands that the agent may issue to the presentation system or computing device. For example, the agent may send a command to refresh a quote, resend a presentation link, email a presentation summary, and/or end a presentation, as will be discussed in further detail in the examples below. The interface 1500 may display the current participants in the presentation 1514. Multiply individuals may connect to the presentation, e.g., based on the link sent by the agent. The participant list may be refreshed each time a new party joins. The interface 1500 may also display annotation tools 1516 that permit the agent (or the customer) to write, draw, or otherwise annotate the pages during the interactive session (e.g., in real time). The agent or customer may also clear the annotations via the "Clear" button. FIG. 16 illustrates an example presentation page 1602 having an annotation 1604 (e.g., lines drawn by an agent), according to one or more aspects of the disclosure.

Figure 17:
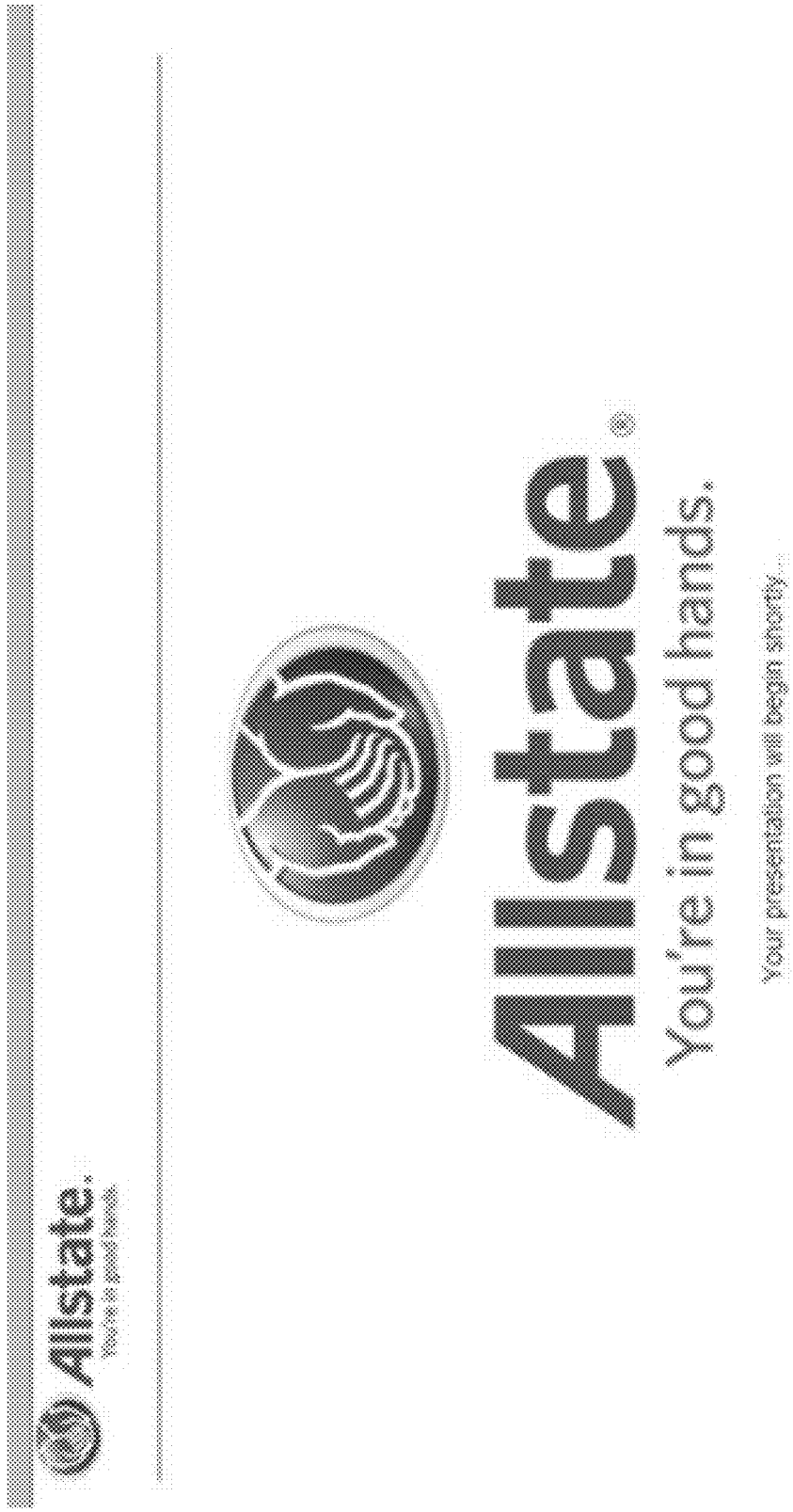
FIG. 17 illustrates another example presentation start page, according to one or more aspects of the disclosure.

FIG. 17 illustrates another example presentation start page 1702, according to one or more aspects of the disclosure. In some aspects, the presentation start page 1702 may correspond to the presentation start page 1502, except that the presentation start page 1702 may be displayed on a display of the customer's computing device. In some aspects, the customer's interface might not display as much content as the agent's interface. For example and as illustrated in FIG. 17, the customer's interface might not display a slide pane 1504, might not display personal notes 1508, hints and talking points 1510, and/or commands 1512. In some aspects, the customer's interface might not display annotation tools 1514. In other aspects, the customer's interface might display annotation tools 1514 to permit the customer to also annotate the presentation pages. In other words, the customer may have access to a subset of the capabilities that the agent has access to.

Figure 18:
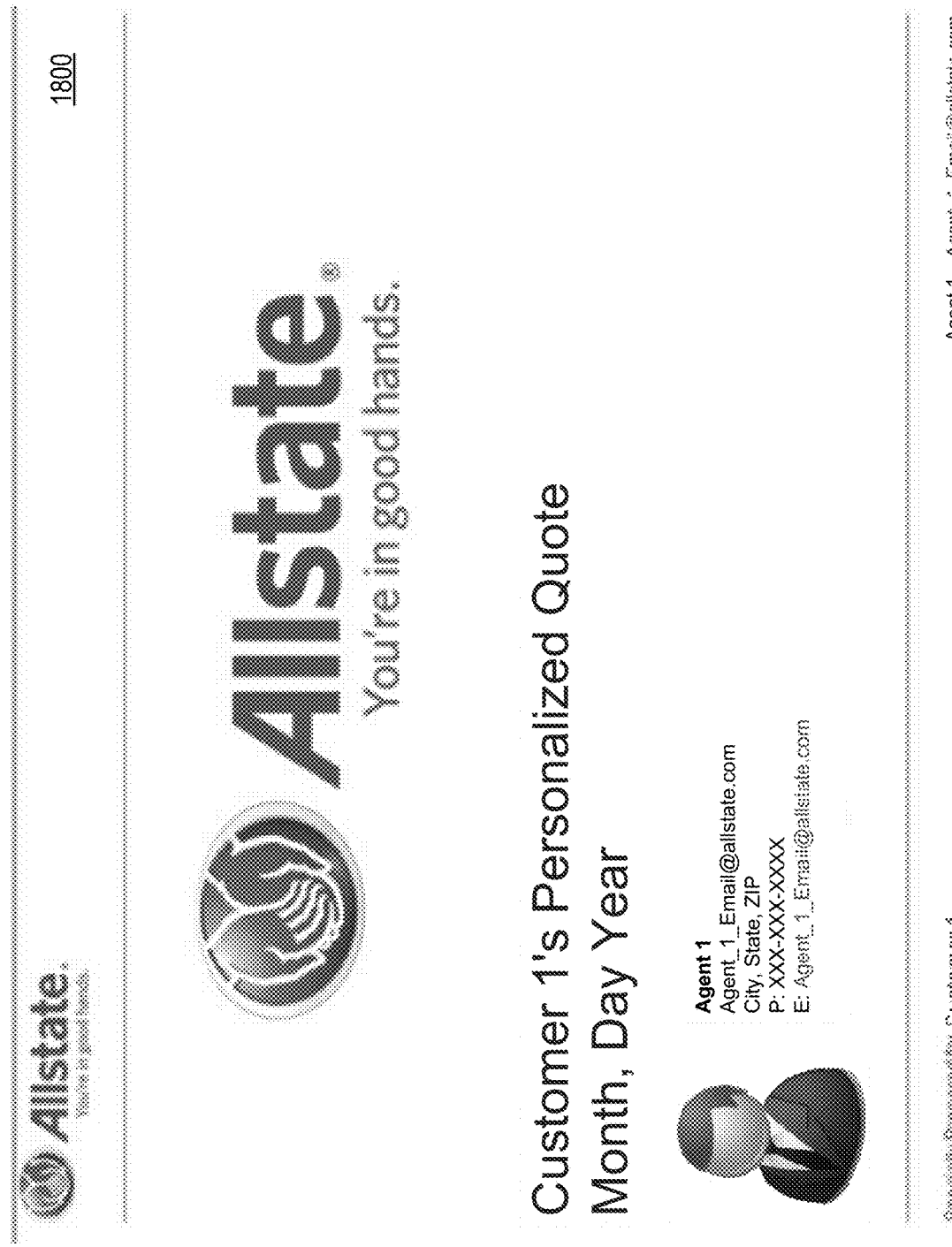
FIG. 18 illustrates an example presentation page displaying a title for the presentation, according to one or more aspects of the disclosure.

FIG. 18 illustrates an example presentation page 1800 displaying a title for the presentation, according to one or more aspects of the disclosure. The presentation page 1800 may be displayed at the customer's computing device. A corresponding presentation page may be displayed at the agent's computing device as well (not illustrated). The presentation page 1800 may include, for example, a photograph of the agent and the agent's contact information. As previously discussed, the agent's photo may be retrieved from an agent information database 424. The computing device may automatically populate one or more predetermined presentation pages with the agent's photograph, such as the title page and/or the conclusion page.

Figure 19:
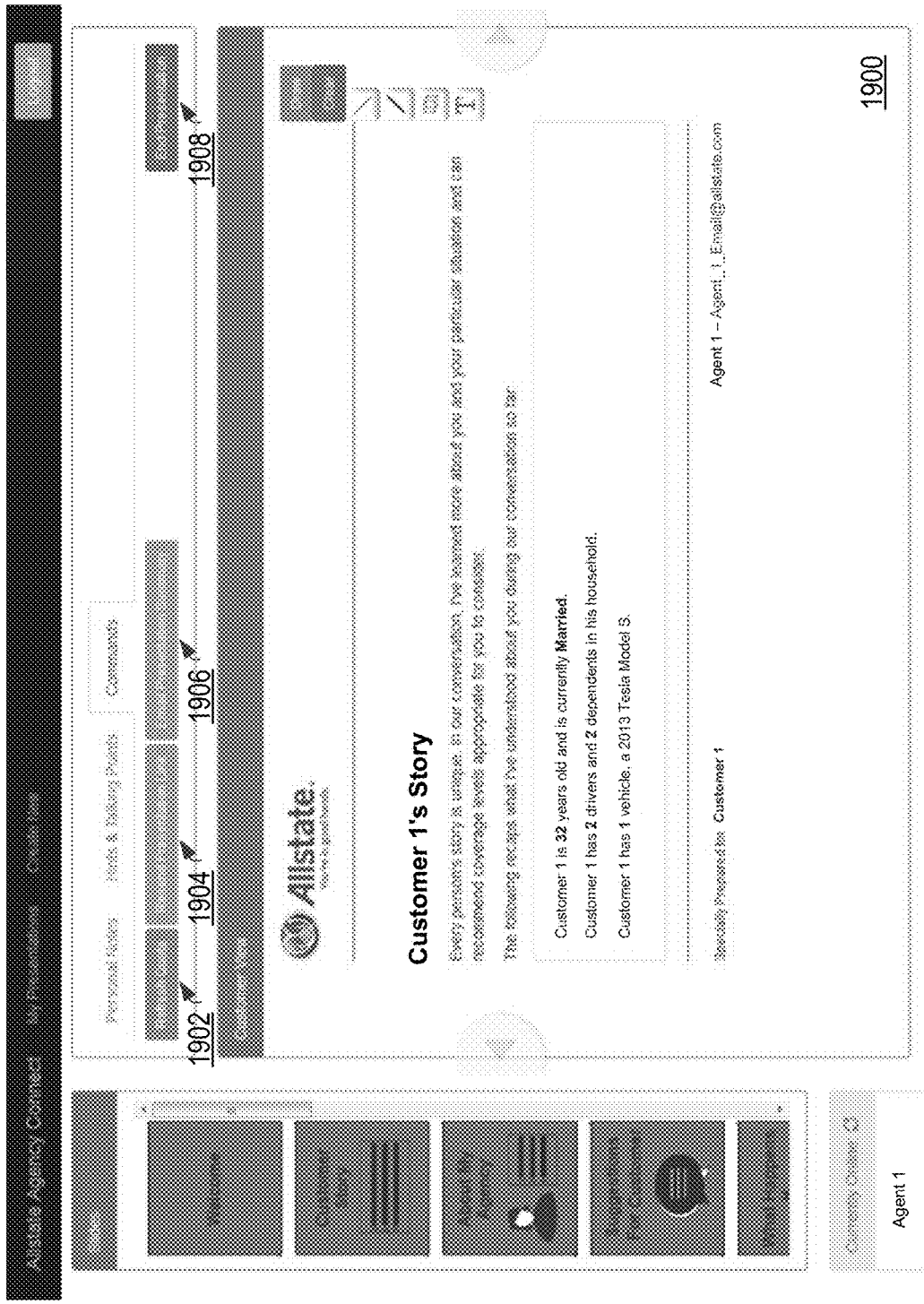
FIG. 19 illustrates an example presentation page displaying customer information, according to one or more aspects of the disclosure.

FIG. 19 illustrates an example presentation page 1900 displaying customer information, according to one or more aspects of the disclosure. For example, the presentation page 1900 may display the customer's age, marriage status, number of drivers in the household, number of dependents in the household, number of vehicles, and the model of the vehicle(s). The customer may input requested information during the course of the interactive session using, for example, a keyboard, mouse, voice recognition, or other input/output device. Additionally or alternatively, the agent may ask for this information from the customer, and manually input the information into the input data fields of the interactive session. Additionally or alternatively, the computing device may retrieve the information from a location, such as a profile stored in a database, if the customer previously provided the information.

Furthermore, as discussed above, the interface may display one or more commands, such as refresh quote 1902, resend presentation link 1904, email presentation summary 1906, and/or end presentation 1908. If the agent selects refresh quote 1902, a computing device may recalculate an insurance quote for the customer. For example, the customer may provide information, such as the number of dependents, age, and other customer information, during the course of the interactive session. When the customer's information has been added or updated, the agent may select refresh quote 1902 to generate new insurance quote(s) for the customer. In some aspects, the computing device running the presentation component session may send the information to a second computing device (e.g., operated by an insurance agency) for the second computing device to recalculate the insurance quote(s). The second computing device may return the recalculated quotes to the computing device to display to the agent and/or customer.

If the agent selects resend presentation link 1904, the computing device may resend the link for the presentation, as previously discussed with reference to FIG. 13 and FIG. 14. For example, a network error may cause the agent and customer to be disconnected, and the agent may resend the link to reestablish the interactive session with the customer. If the agent selects email presentation summary 1906, the computing device may generate a summary of the presentation and send it to the customer. If the agent selects end presentation 1908, the computing device may end the interactive session and disconnect the agent from the user.

Figure 20:
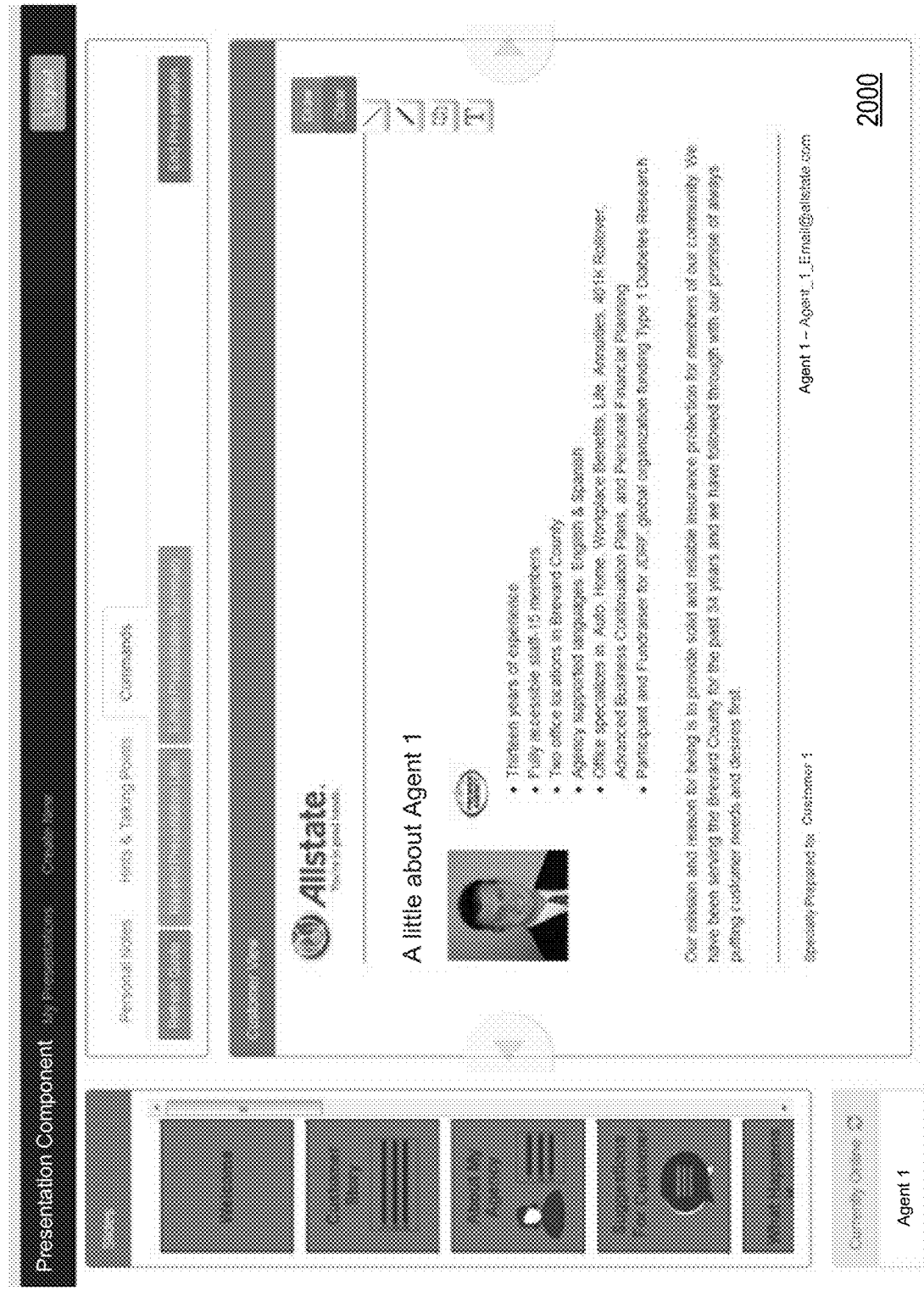
FIG. 20 illustrates an example presentation page displaying agent information, according to one or more aspects of the disclosure.

FIG. 20 illustrates an example presentation page 2000 displaying agent information, according to one or more aspects of the disclosure. The agent may manually input his or her information while creating the presentation. Additionally or alternatively, the computing device may retrieve the agent's information from a database, such as the agent information database 424 previously discussed. Exemplary information include years of experience, number of staff members, office locations, languages supported, specialties, and hobbies or charitable activities.

Figure 21:
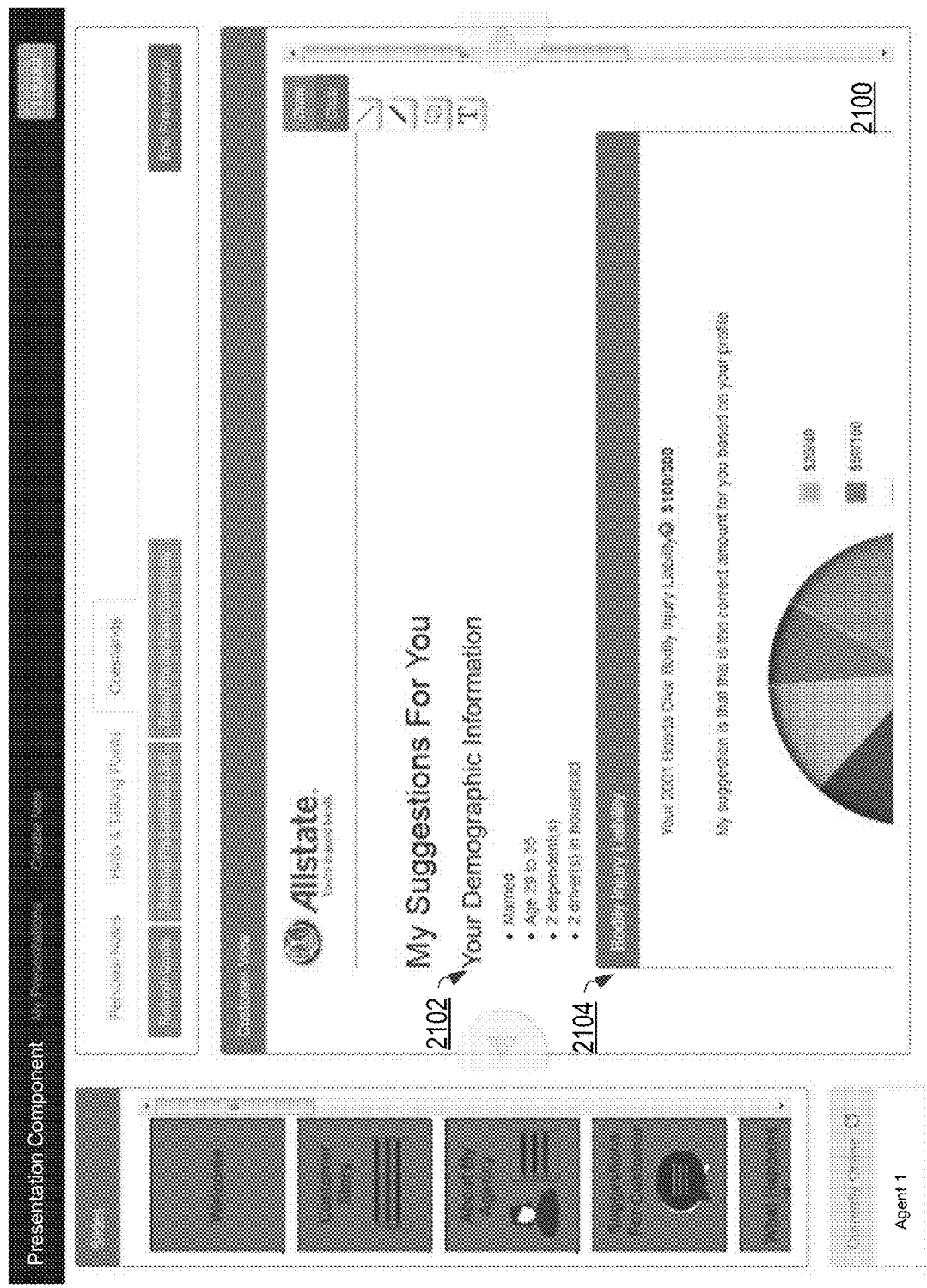
FIG. 21 illustrates an example presentation page displaying insurance suggestions, according to one or more aspects of the disclosure.

FIG. 21 illustrates an example presentation page 2100 displaying insurance suggestions, according to one or more aspects of the disclosure. The presentation page 2100 may display the customer's information, such as demographic information 2102. The presentation page 2100 may also display information for one or more types of insurance coverage. For example, the presentation page 2100 may display information for bodily injury liability for a vehicle 2104.

Figure 22:
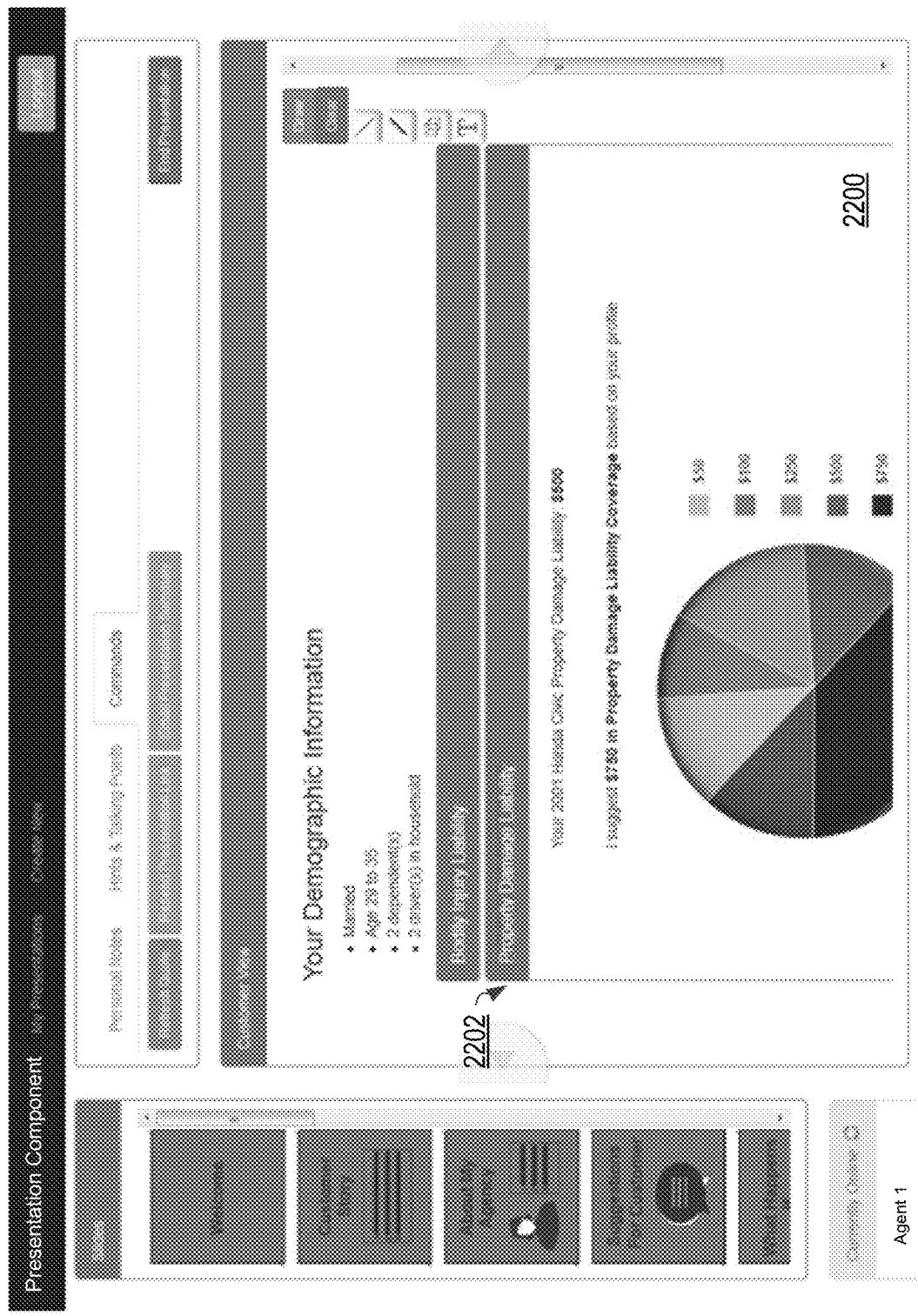
FIG. 22 illustrates another example presentation page displaying insurance suggestions, according to one or more aspects of the disclosure.

FIG. 22 illustrates another example presentation page 2200 displaying insurance suggestions, according to one or more aspects of the disclosure. For example, the presentation page 2200 may display information for property damage liability for the vehicle 2202. For each insurance option, the presentation page 2100 may display the customer's current coverage (e.g., $100/300 for bodily injury liability and $500 for property damage liability) and a suggestion of whether the current coverage is recommended (e.g., currently bodily injury liability is recommended) or not recommended (e.g., suggestion to increase property damage liability from $500 to $750). In some aspects, the agent may send the customer's information to a computing device or database and the computing device or database may generate the suggestion based on the customer's information.

Figure 23:
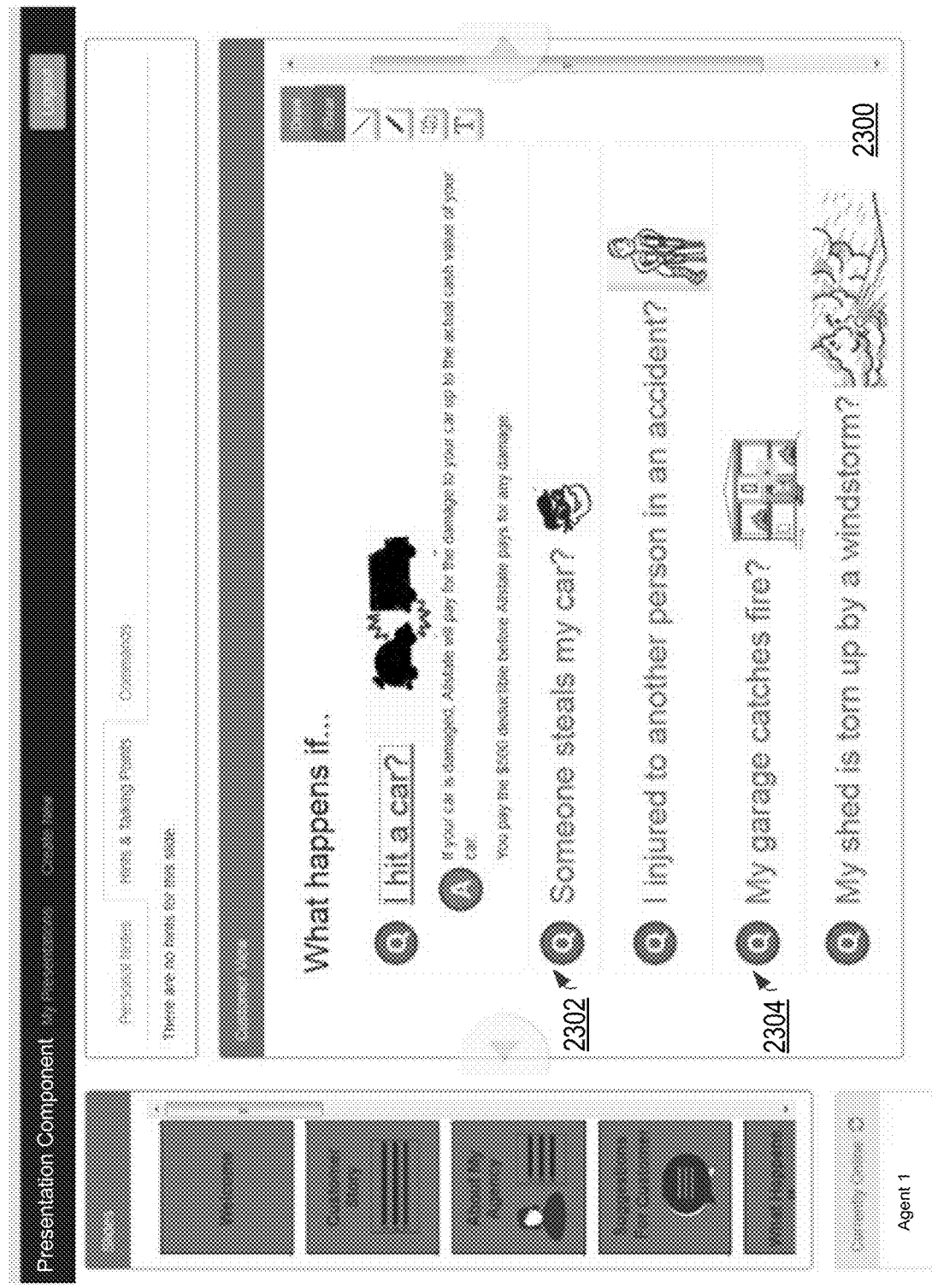
FIG. 23 illustrates an example presentation page displaying customer questions and/or answers, according to one or more aspects of the disclosure.

FIG. 23 illustrates an example presentation page 2300 displaying customer questions and/or answers, according to one or more aspects of the disclosure. The agent may manually select the questions and corresponding answers for those questions during creation of the presentation. For example, the agent's computing device may retrieve a list of questions and answers from a database and display those questions and answers to the agent. The agent may select which ones to include on the presentation page 2300, and the computing device may include the selected questions and answers as instructed by the agent. As another example, the agent may manually input (e.g., type out) the questions and/or answers onto the presentation page 2300.

In some aspects, the computing device may generate a list of recommended questions and answers based on the customer's information (e.g., age, geographical region, income, types of insurance interested in, etc.). Taking geographical region, for example, the computing device may determine that the customer lives in a high crime/theft area based on the customer's address. Based on the determination, the computing device may recommend that the agent includes the question "Someone steals my car?" 2302 (and the corresponding answer). On the other hand, the computing device might not recommend the question "My garage catches fire?" 2304 if few homes (e.g., below a predetermined threshold, such as 10%) in the customer's geographical region have garages. The computing device may search a database of homes and/or home sales to determine the number of homes in the geographical region and the number of homes in the region that have garages.

The list of recommended questions may also factor in the frequency that other agents have included the questions in their presentations. For example, a computing device may count the number of times that a particular question is included in a presentation across a group of agents. The question that is included the most often may be first on the recommendation list, and the question that is included the least often may be last on the recommendation list (or not included at all). The more popular questions may move up the list with time, whereas the less popular questions may move down the list. The order of recommendations may vary, and may also factor in the customer's information, as discussed above.

The list of recommended questions may also factor in the historical success rate for each question. The computing device may determine that a presentation is successful if the presentation resulted in the customer accepting an insurance quote during the presentation (or a predetermined time after the presentation, such as 3 days). Additionally, the computing device may determine that a presentation is successful if the customer responds positively to a customer satisfaction survey given to the customer during or after the presentation. For example, the survey may identify three options for evaluating the presentation or agent: very satisfied, satisfied, or unsatisfied. Any number of options may be used. If the customer selects very satisfied or satisfied, the computing device may count that presentation as a success. Alternatively, the computing device may count the presentation as a success if the customer selects very satisfied and as a partial success if the customer selects satisfied (e.g., a half point). The computing device may determine that the presentation was not successful if the customer selects unsatisfied and/or the presentation does not result in the customer accepting a quote. Zero points or negative points may be awarded if the presentation is unsuccessful.

The list of recommendations may be based on one, some, or all of the factors discussed above. If multiple factors are considered, the computing device may assign a weight to each factor and make a determination whether to recommend the question after the corresponding weight is applied to each factor. Based on the list of the recommended questions and answers, the agent may select questions and answers from the list to include in the presentation page 2300. Additionally or alternatively, the computing device may automatically populate the presentation page 2300 with one or more of the recommended questions and answers. The agent may be given the option to remove one or more of these questions and answers.

Figure 24:
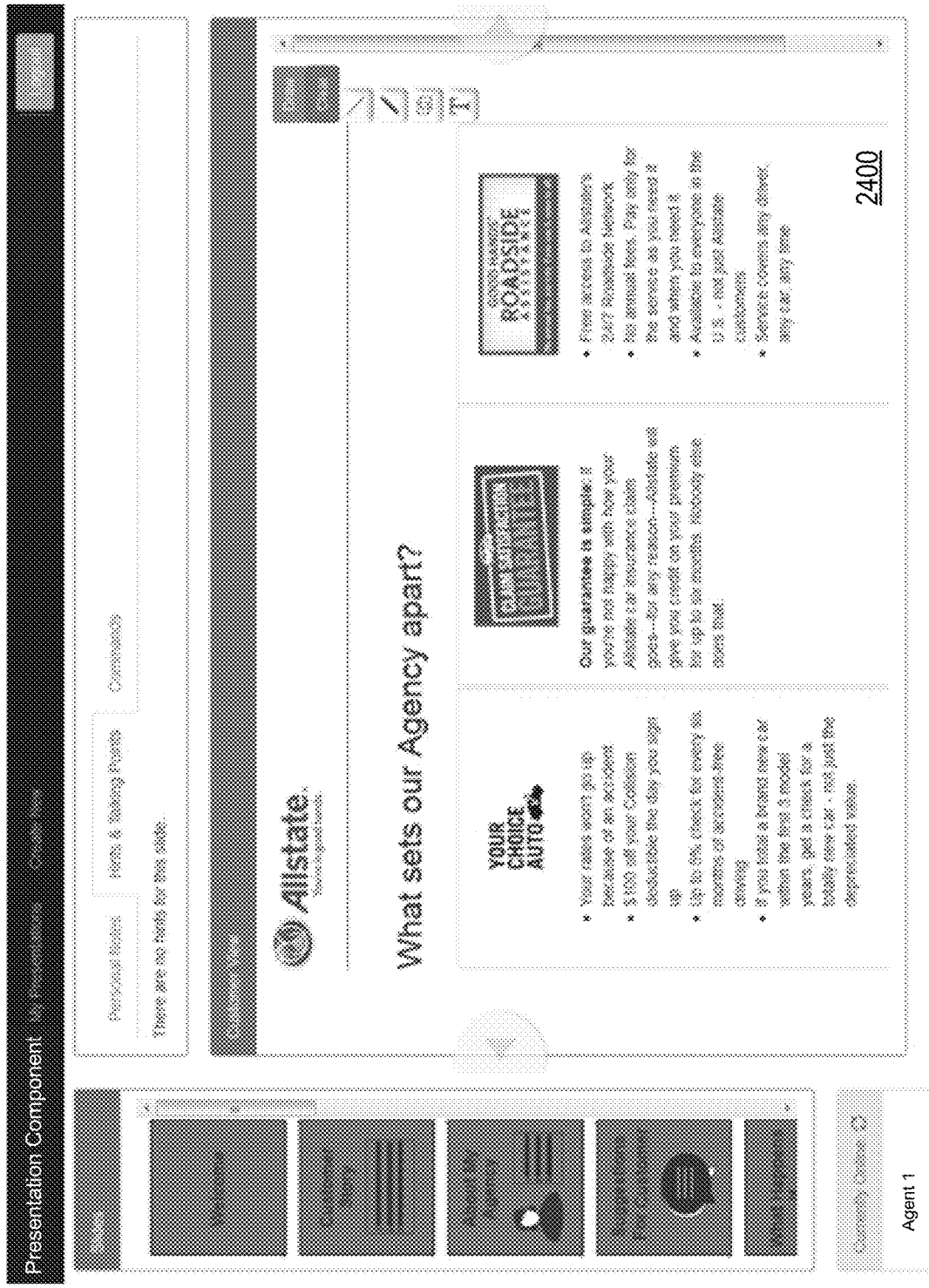
FIG. 24 illustrates an example presentation page displaying insurance agency information, according to one or more aspects of the disclosure.

FIG. 24 illustrates an example presentation page 2400 displaying insurance agency information, according to one or more aspects of the disclosure. For example, the information may explain to the customer what sets the insurance provider apart from other insurance providers (e.g., differentiating factors as compared to other insurance providers). The agent may input this information, or the information may be retrieved from a database and included on the presentation page 2400.

Figure 25:
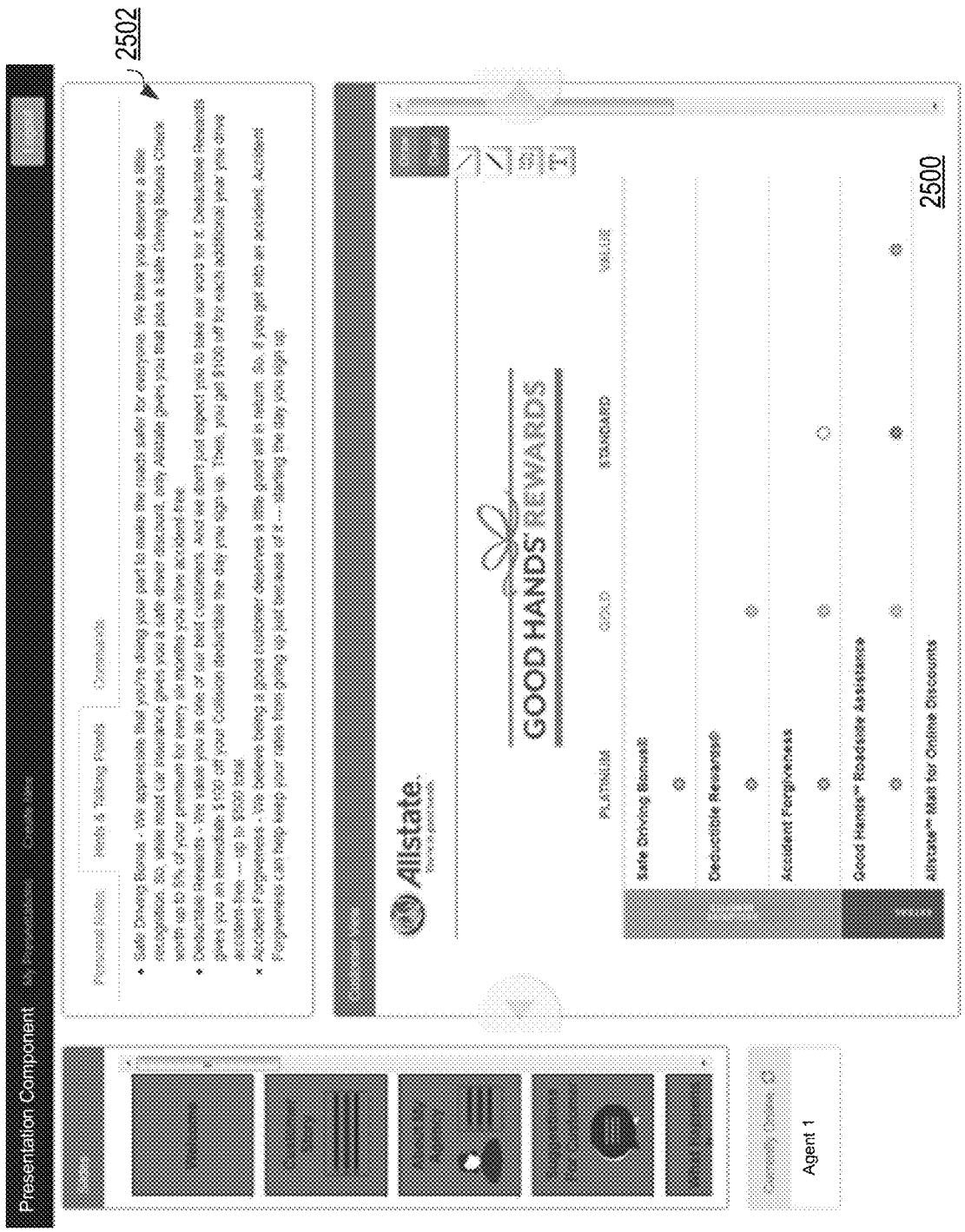
FIG. 25 illustrates an example presentation page displaying promotions, according to one or more aspects of the disclosure.

FIG. 25 illustrates an example presentation page 2500 displaying promotions and/or other information that sets the insurance provider apart from other insurance providers, according to one or more aspects of the disclosure. For example, presentation page 2500 may display insurance discounts available to the customer, including SAFE DRIVING BONUS, DEDUCTIBLE REWARDS, Accident Forgiveness, GOOD HANDS Roadside Assistance, Insurance Provider Mail for Online Discounts, and the like. As previously discussed the computing device may communicate with a database, such as Endorsements Web Service 422, to determine potential discounts the custom is eligible for. The agent's interface may also display hints and talking points 2502, as previously discussed. The hints and talking points 2502 may be automatically included for each presentation page that has corresponding hints and talking points. The hints and talking points 2502 may be helpful in directing the agent to the most pertinent points.

Figure 26:
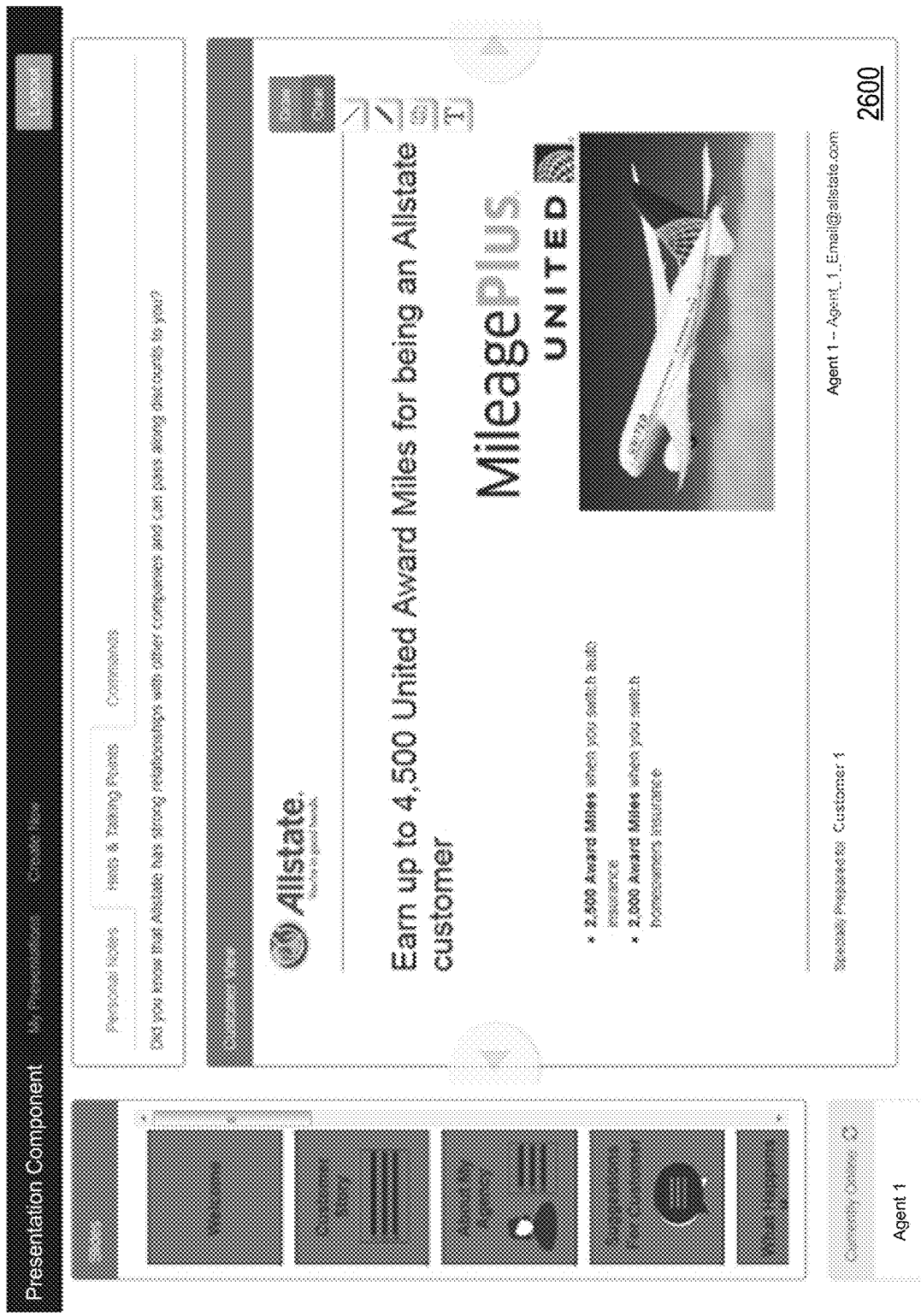
FIG. 26 illustrates another example presentation page displaying promotions, according to one or more aspects of the disclosure.
Figure 27:
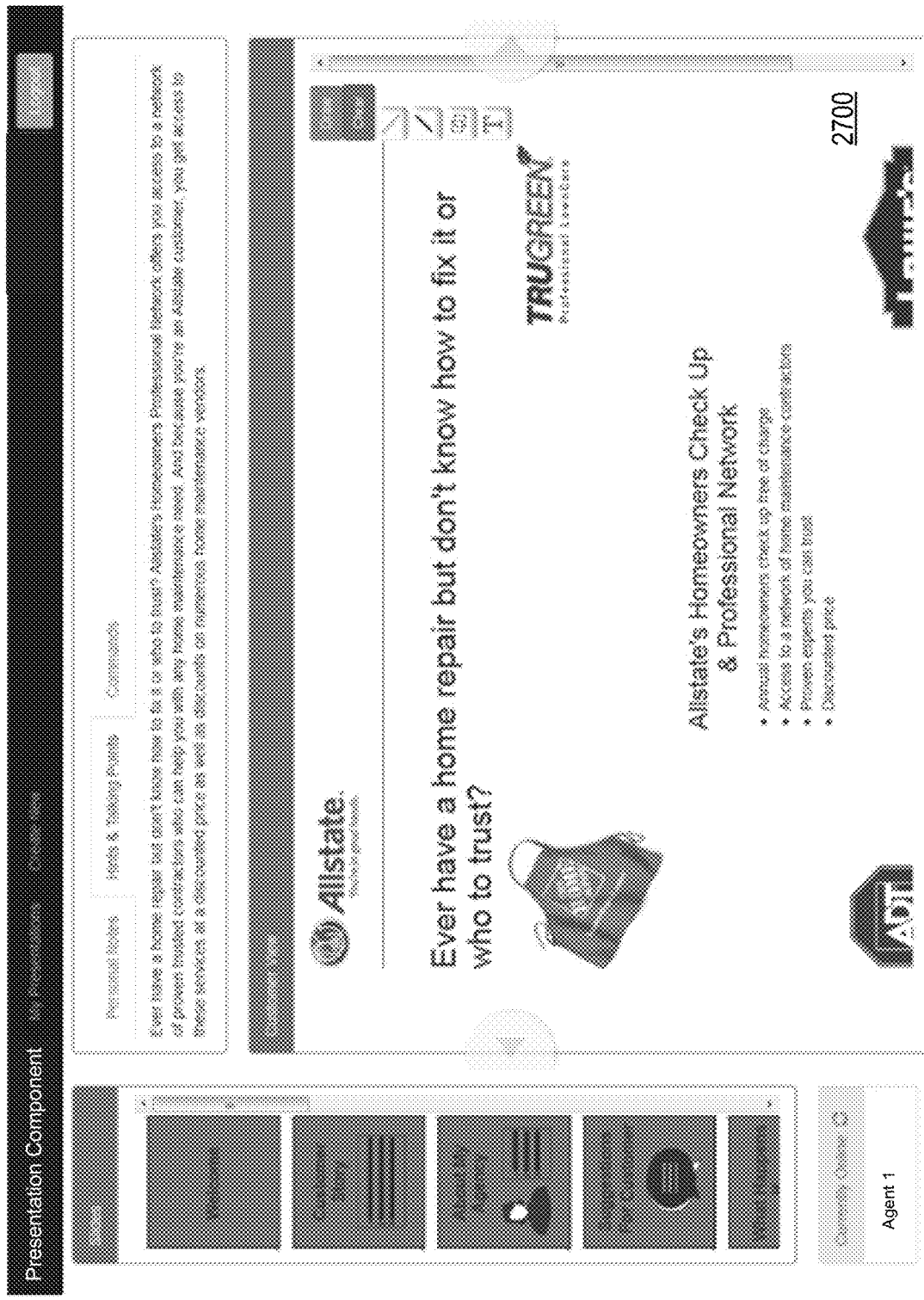
FIG. 27 illustrates an additional example presentation page displaying promotions, according to one or more aspects of the disclosure.

FIG. 26 illustrates another example presentation page 2600 displaying promotions, according to one or more aspects of the disclosure. For example, presentation page 2600 may display a third party promotion for customers of the insurance provider, such as with a third party airline. In particular, the customer may earn up to 4,500 flight award miles for being (or becoming) a customer of the insurance provider. FIG. 27 illustrates an additional example presentation page 2700 displaying promotions, according to one or more aspects of the disclosure. The presentation page 2700 may display promotions for businesses within a network of the insurance provider. The displayed businesses or products may be associated with a particular insurance product, such as homeowner's insurance.

Figure 28:
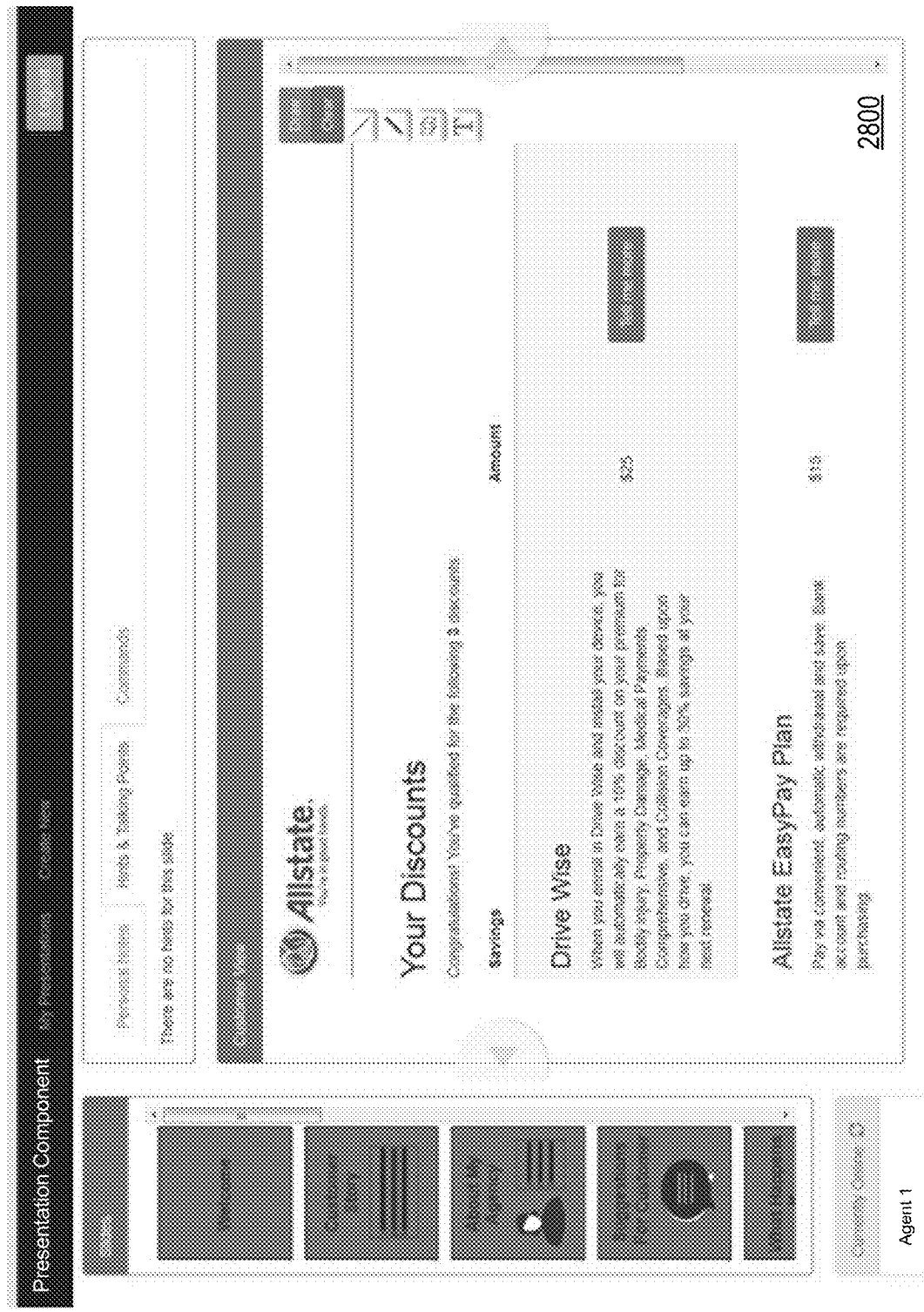
FIG. 28 illustrates an example presentation page displaying insurance discounts, according to one or more aspects of the disclosure.

FIG. 28 illustrates an example presentation page 2800 displaying insurance discounts, according to one or more aspects of the disclosure. The insurance discounts may be similar to the discounts discussed with reference to FIG. 25.

Figure 29:
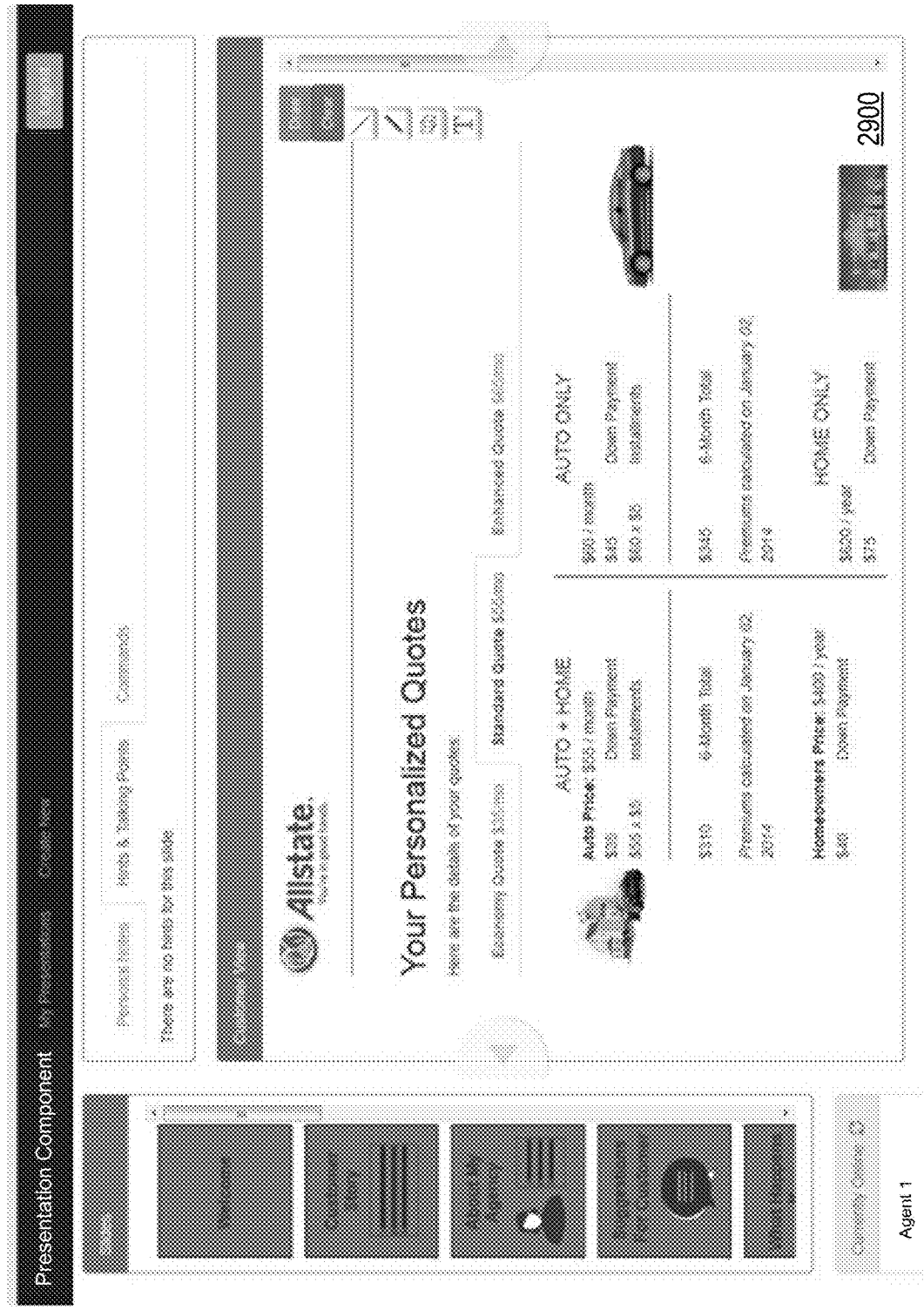
FIG. 29 illustrates an example presentation page displaying personalized insurance quotes, according to one or more aspects of the disclosure.
Figure 30:
FIG. 30 illustrates another example presentation page displaying personalized insurance quotes, according to one or more aspects of the disclosure.

FIG. 29 illustrates an example presentation page 2900 displaying personalized insurance quotes, according to one or more aspects of the disclosure. FIG. 30 illustrates another example presentation page 3000 displaying personalized insurance quotes, according to one or more aspects of the disclosure. The presentation page 2900 illustrated in FIG. 29 may be what the agent sees during the interactive session, whereas the presentation page 3000 illustrated in FIG. 30 may be what the customer sees. These presentation pages may display a comparison of various packages including information on coverages, discounts, deductibles, premiums, payments, and the like that may be available to the customer.

A computing device may generate a personalized insurance quote based on customer information. As previously discussed, the customer may enter his or her information (e.g., name, age, address, driver's license number, credit card or bank information, etc.) into input data fields during the presentation. Additionally or alternatively, the agent may enter the information for the customer. In some aspects, the computing device may prompt the customer to input information from a predetermined list (e.g., information that is often mistyped by agents, such as name spelling, address spelling, and the like) and either request the agent or customer to provide the remaining information used to generate the quote. As previously discussed, customer information may be retrieved from a customer database or third party database.

The customer or agent may enter additional information, such as the types of quotes to generate, manual discounts, coverage amounts, and the like. The customer or other information may be merged into a data package and sent to one or more quote generators (e.g., the quote generators illustrated in FIG. 2 or FIG. 3), and the quote generators may generate the quote based on the received information. In some aspects, the quote generators may generate other comparable quotes and presentations for different packages based upon an initial default standard package (e.g., one selected by the customer or agent). Quotes may be generated in real time and/or updated as the information provided by the agent or customer is changed or otherwise manipulated. This may be helpful to show the customer how each change in information affects the insurance specifics, such as deductible, premium, etc. A history of quotes may be provided to the agent or customer during the presentation, detailing or summarizing each quote generated.

The generated quote may be compared to other quotes and adjusted based on the comparison. For example, a computing device may determine the customer's quote or bind history by, for example, retrieving information on quotes previously provided to the customer. The computing device may compare the current quote to the previous quotes. In some aspects, the computing device may leave the current quote unchanged if it is below one, some, or all of the previous quotes. If the current quote is greater than one, some, or all of the previous quotes, the computing device may adjust the quote to a lower amount before sending it for display during the interactive quote session.

In some aspects, the computing device might not adjust the quote based on the customer's history. Instead, the computing device may send the current quote and a list of the previous quotes to the agent, so that the agent may manually adjust the current quote if desired. The computing device may also send the adjusted quote to the agent and/or an option for the computing device to generate the adjusted quote. If the agent selects the option for the computing device to generate the adjusted quote, the agent's computer may send an instruction to the computing device to generate the adjusted quote. In some aspects, the unadjusted quote may be provided to the customer until the agent instructs the computing device to provide the adjusted quote to the customer.

The computing device may also compare the generated quote to other people's quotes in order to align the generated quote to other quotes. For example, the computing device may determine the customer's demographics (e.g., age range, geographical region, income level, etc.), and compare the quote to quotes of customers in the same demographic group. For example, the customer may be in the age range of 25 to 49 and live in New York City, USA. Based on a determination of the demographic group, the computing device may retrieve one or more quotes or policies for customers in 25 to 49 age range and that live in New York City, USA and compare the generated quote to the retrieved quotes or policies. Adjustments (increases or decreases) may be made to the customer's quote based on the comparison in order to align the quote with people with the same or similar demographics. For example, the customer's quote may be brought to within a threshold amount of the average quote for the demographic group. Additionally or alternatively (and as previously discussed), the computing device may provide the generated quote and the retrieved quotes to the agent for the agent to make the adjustments.

The computing device may also compare the generated quote to quotes of people that the customer might know. For example, the computing device may access a database storing the customer's contacts, such as email contacts, FACEBOOK friends, co-workers, list serves, or any other contacts. The computing device may then determine whether each contact has a policy with the insurance provider associated with the agent or another insurance provider or whether each contact has received a quote from the agent or an insurance provider. If one or more of the contacts has a policy or received an insurance quote for the same type of insurance as the customer (e.g., auto insurance, home insurance, life insurance, etc.), the computing device may compare the customer's quote to the customer's contacts' quotes and make adjustments to the customer's quote as previously discussed. The computing device may also provide the customer's quote and the contacts' quotes to the agent for the agent to make the adjustments.

The customer's quote may be adjusted based on one, some, or all of the factors discussed above (e.g., the customer's previous quotes or binds, quotes or binds of people in the same demographic group as the customer, and/or the customer's contact's quotes). If multiple factors are considered, the computing device may assign a weight to each factor and make a determination whether and how much to adjust the customer's quote after the corresponding weight is applied to each factor. Several non-limiting examples will now be provided. Assume that the customer's unadjusted insurance quote comprises a premium of $100.00/month. Also assume that the customer's previous quote had a premium of $100.00/month; the quote for a person in the same demographic group as the customer had a premium of $110.00/month; the quote for a contact of the customer had a premium of $90.00/month. If the computing device considers each of the three factors equally, the computing device may apply a weight of 1/3 to each factor. Accordingly, the computing device may determine that the customer's adjusted quote is the same as the unadjusted quote (e.g., $100.00*1/3+$110.00*1/3+$90.00*1/3=$100.00). If the computing device applies a weight of 1/4 to each of the first and second quotes and a weight of 1/2 to the third quote, the computing device may determine that the customer's adjusted quote is (e.g., $100.00*1/4+$110.00*1/4+ $90.00*1/2=$97.50). The weights in the examples above are merely exemplary, and the computing device may apply any weight. Furthermore, the insurance agent may provide the weights for the computing device to use. Similar calculations may be performed for other aspects of the insurance quote, such as deductible amount.

The computing device may consider one or more additional factors when making the comparisons previously described. As previously discussed, the computing device may compare policies for related groups of people (e.g., people in the same demographic group or contacts of the customer). As also previously discussed, the computing device may compare policies of the same type (e.g., automobile insurance, homeowner's insurance, life insurance, renter's insurance, and the like). The computing device may also consider the amount of coverage for the insurance policy. For example, if a homeowner's insurance quote for the customer covers $300,000, the computing device may identify other homeowner insurance quotes or policies that also cover $300,000 or near $300,000 (e.g., within a predetermined amount from $300,000). For example, the computing device may use homeowner insurance policies that cover between $280,000 and $320,000 (e.g., $300,000+/− $20,000) as comparisons. Alternatively, the computing device may use homeowner insurance policies that cover between $290,000 and $320,000 (e.g., $300,000-$10,000 and $300,000+$20,000). Any other coverage range may be used.

In some aspects, the customer may be notified that the quote has been adjusted to match (e.g., within a predetermined amount of another insurance quote) the customer's previous quote or bind, quotes or binds of individuals in the same demographic group as the customer, and/or the quotes or binds of the customer's contacts (e.g., FACEBOOK friends or email contacts). For example, the presentation page 2900 may display an indication that the customer's quote has been adjusted to match another quote or bind. The presentation page 2900 may also display to the customer the identity of the relevant demographic group (e.g., auto insurance, age range of 25 to 49, and residence of New York City, N.Y.) and/or the identity of the relevant contact (e.g., FACEBOOK friend John Doe).

The computing device may also factor in the items or individuals covered under each insurance policy. For example, if the customer is married and has two dependents that are covered under the quoted insurance policy, the computing device may search for other quotes or policies for individuals whom are also married and have two dependents whom are covered. Similarly, if the customer's fine art collection is covered up to $500,000 under the quoted policy, the computing device may search for other quotes or policies that cover fine art collections or that cover fine art collections up to $500,000 (plus or minus a predetermined amount).

The customer may be provided with an option to agree and be bound to the insurance quote during the presentation and/or at the end of the presentation. The customer may select, for example, an Agree button and/or sign one or more documents through the interactive quote session interface to be bound. Alternatively, the customer may be sent a message containing the quote, such as via email, text message, physical mail, etc. Additionally, the presentation slides and/or a summary of the presentation may be sent with the quote. This may give the customer more time to decide whether to accept the quote.

Figure 31:
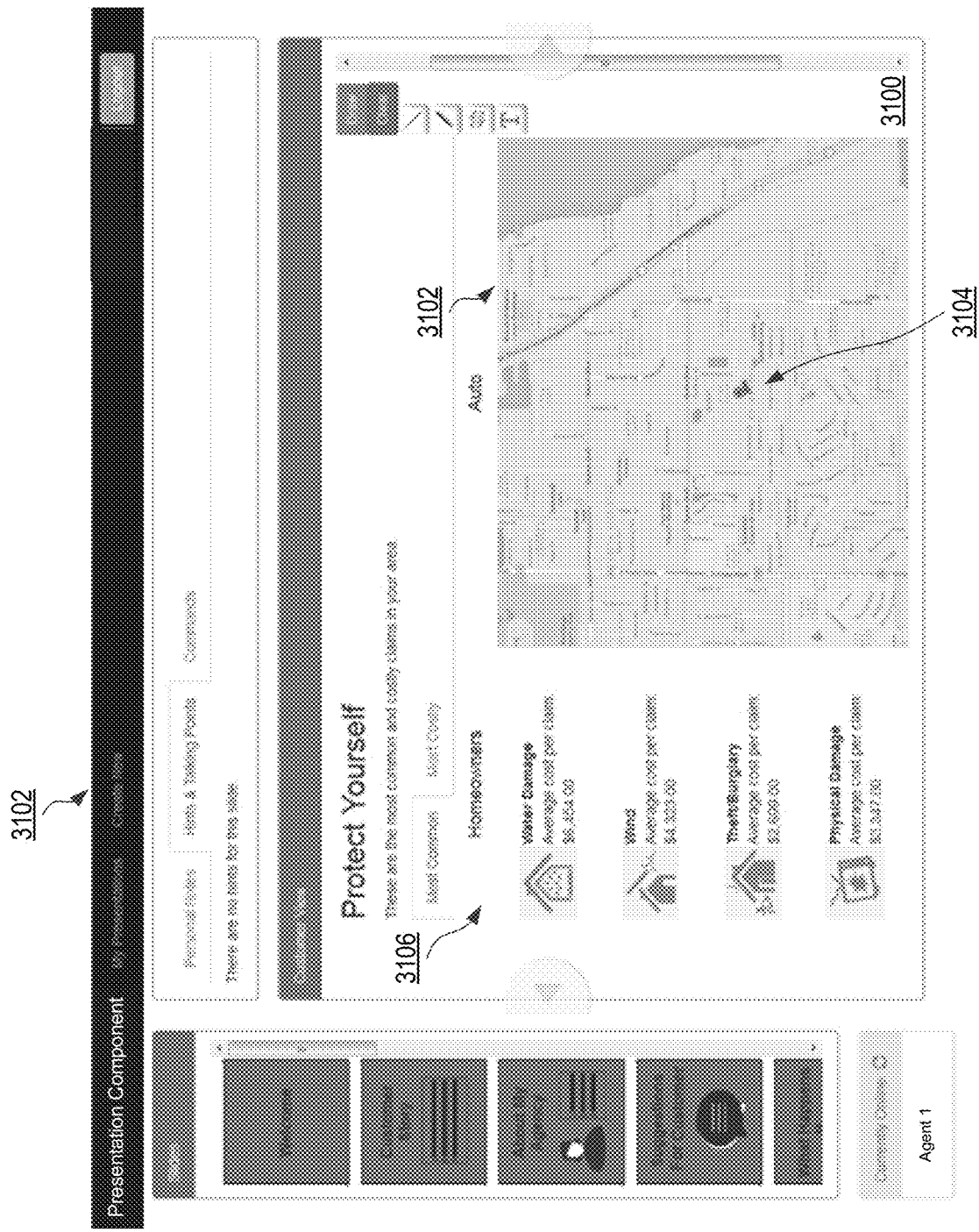
FIG. 31 illustrates an example presentation page displaying insurance claims in an area, according to one or more aspects of the disclosure.

FIG. 31 illustrates an example presentation page 3100 displaying insurance claims in a particular area, according to one or more aspects of the disclosure. The presentation page 3100 may display a map 3102 of a geographical area. The geographical area may comprise the area displayed on the map, an area within a predetermined radius from a point 3104 on the map, a predefined area (e.g., an area manually selected by the agent), or any other area. The presentation page 3100 may also display insurance claims 3106 within the geographical area. In particular, a computing device may retrieve claim information from a claims system or database. The claim information may include home damage claims, auto claims, theft claims, or any other type of insurance claim. For example, losses caused by fires, such as forest fires, may be displayed on the map 3102. Display of these claims may encourage the customer to obtain higher coverage than others in areas with fewer forest fires.

The claim information may also include the amount of the claim, such as the amount paid out or the amount claimed by the policyholder. From the claims amounts, the computing device may determine the average (and/or median) cost per claim for each type of claim in the geographical area. In the example illustrated in FIG. 31, the computing device calculated the average cost per claim for water damage as $6,454.00. A similar computation may be made for wind damage, theft/burglary, physical damage, or any other type of claim. The claims may be displayed during the interactive session to encourage or discourage the customer to purchase or not to purchase certain types of insurance or suggest an amount of coverage. For example, the location and/or cost of each claim or a representative number of claims in the geographical area could be displayed on the map 3102. The presentation page 3100 may also include future content for protecting the customer from types of claims typical in the customer's geographic area.

The map may be interactive, and both the agent and customer may interact with the map. For example the agent and/or customer may select the map area to be displayed. The agent and/or customer may also select the type(s) of claims to be displayed on the map (e.g., water damage, wind, theft/burglary, and/or physical damage) or whether to display the most common claims or the most costly claims. As previously discussed, the agent and/or customer may interact with the map by using the drawing tools to add lines, shapes, text, etc. to the presentation or map area.

The computing device may also identify automobile claims (which may be indicative of automobile accidents or thefts) and cause these claims to be displayed on the map 3102 (e.g., as individual points on the map). This may be helpful for identifying dangerous locations, such as intersections or roads, for the customer to avoid. In some aspects, claims above a predetermined threshold amount, such as $500, might be displayed, whereas claims below the threshold might not be displayed. The agent and/or customer may adjust the threshold during the interactive session, and the map may be refreshed to add or remove claims based on a change in the threshold. The amount of each claim may also be displayed on the map 3102. Additionally or alternatively, each claim may be color coded based on the amount of the claim. For example, claims above a predetermined threshold, such as $10,000 may be red; claims between $2,000 and $10,000 may be yellow; claims below $2,000 may be green.

The map of automobile claims may also be used to determine safer routes between two locations, such as between the customer's home and the customer's work. The addresses for the locations may be provided by the customer during the interactive session. The computing device may determine one or more driving, biking, or other transportation routes for the customer that avoid all or some (e.g., a predetermined number) of the automobile claims or other related claims (e.g., bike theft claims). The computing device may also factor in time, traffic, distance, statistically safer streets or neighborhoods, and other information to compute the route(s).

Additionally or alternatively, the agent, the customer, or a third-party service (e.g., GOOGLE MAPS) may provide the computing device with a route. The computing device may display the claims along that route along with the cost of those claims. The computing device may also determine the average cost of the claims along each route. For example, the average cost of the claims along route 1 may be $545; the average cost of claims along route 2 may be $210; and the average cost of claims along route 3 may be $620. As described herein, the cost displayed on the map may comprise the cost of each claim, the overall cost, the out of pocket cost to the customer (e.g., deductible), or any other cost. The map, claims, cost, and/or route information may be sent to the customer, such as via email, text, or physical mail for future reference.

In some aspects, the insurance provider may encourage the customer to take the safer routes (e.g., routes with lower calculated costs) by providing the customer with discounts if the customer takes these routes with regularity (e.g., at least 3 times per week for travelling between home and work). The customer's location may be tracked, such as via cellular triangulation, GPS, Wi-Fi connections, etc., if the customer gives permission to be tracked.

The map of automobile claims may also be used to determine safer areas for the customer to park his or her car. In particular, the computing device may display vandalism and/or theft claims (which may be claims specific to vehicle vandalism and theft or may be general vandalism and theft claims) on the map 3102. As previously discussed, the information displayed may include the claim type and claim amount, or any other information about the claim. Based on the displayed claims, the computing device may recommend safer parking areas (e.g., areas, such as neighborhoods or streets, with fewer vandalism and theft claims) to the customer.

Figure 32:
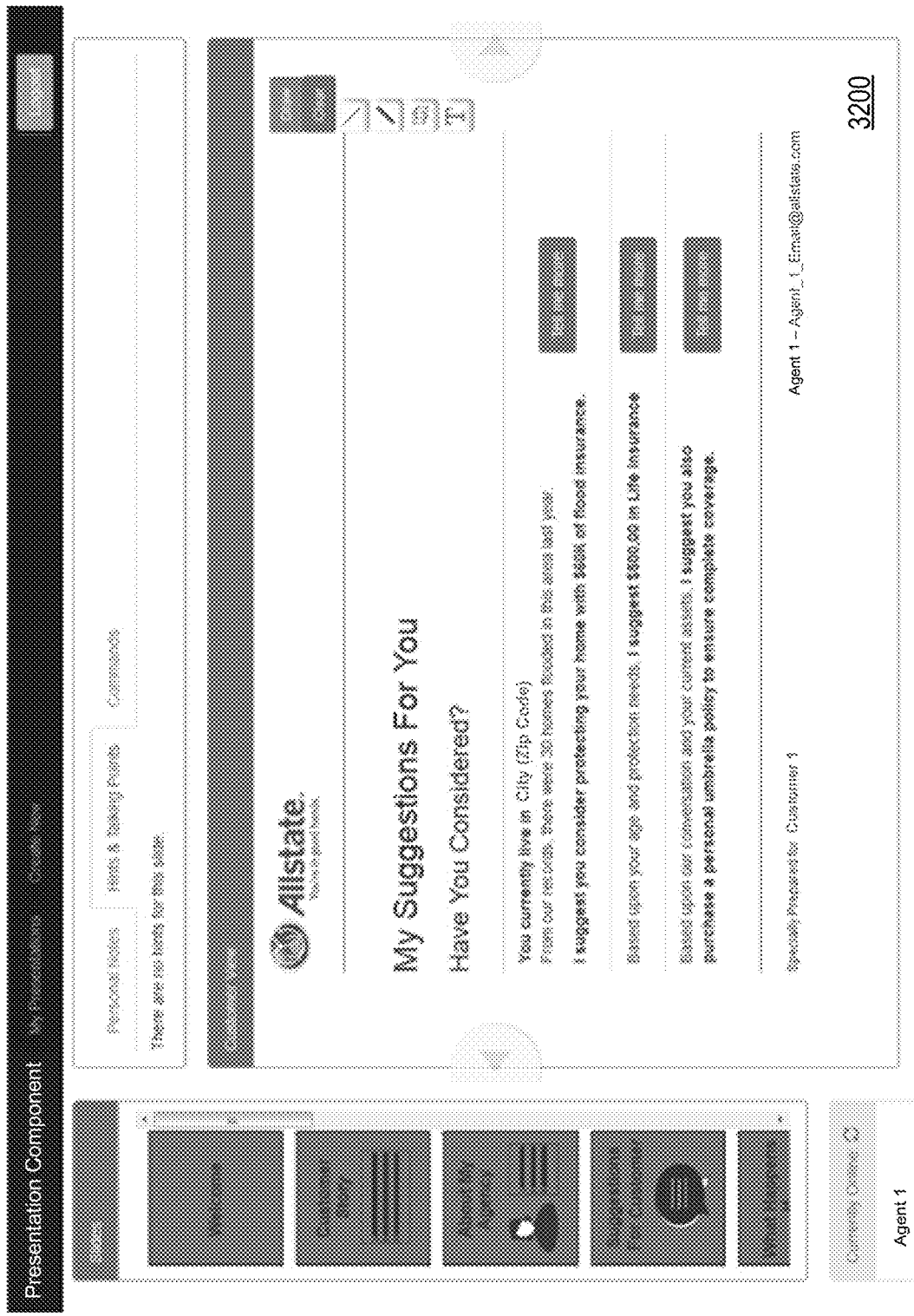
FIG. 32 illustrates an example presentation page displaying insurance coverage suggestions, according to one or more aspects of the disclosure.

FIG. 32 illustrates an example presentation page 3200 displaying insurance coverage suggestions, according to one or more aspects of the disclosure. The presentation page 3200 may be populated with information inputted by the customer, inputted by the agent, or from various databases. Example information displayed include the city and zip code of the customer's residence (provided by the customer), the number of homes that flooded in the zip code last year (from insurance claims databases), and a suggestion for the amount of flood insurance (from one or more quote generators).

Figure 33:
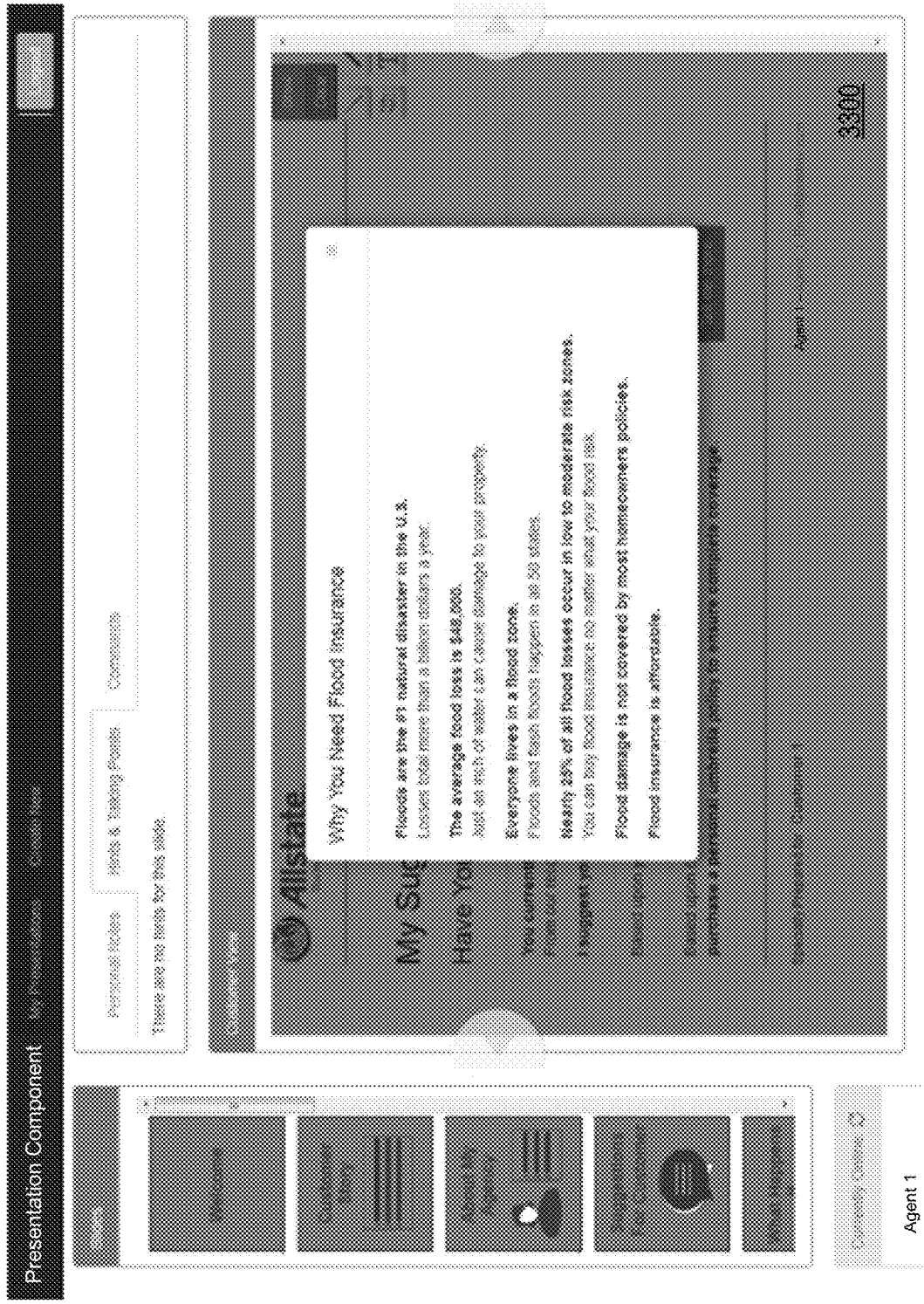
FIG. 33 illustrates another example presentation page displaying insurance coverage suggestions, according to one or more aspects of the disclosure.

FIG. 33 illustrates another example presentation page 3300 displaying insurance coverage suggestions, according to one or more aspects of the disclosure. The presentation page 3300 may further explain a particular type of coverage (e.g., flood insurance) and why the customer should purchase flood insurance. In some aspects, the information may be pre-populated in a slide template or provided by the agent.

Figure 34:
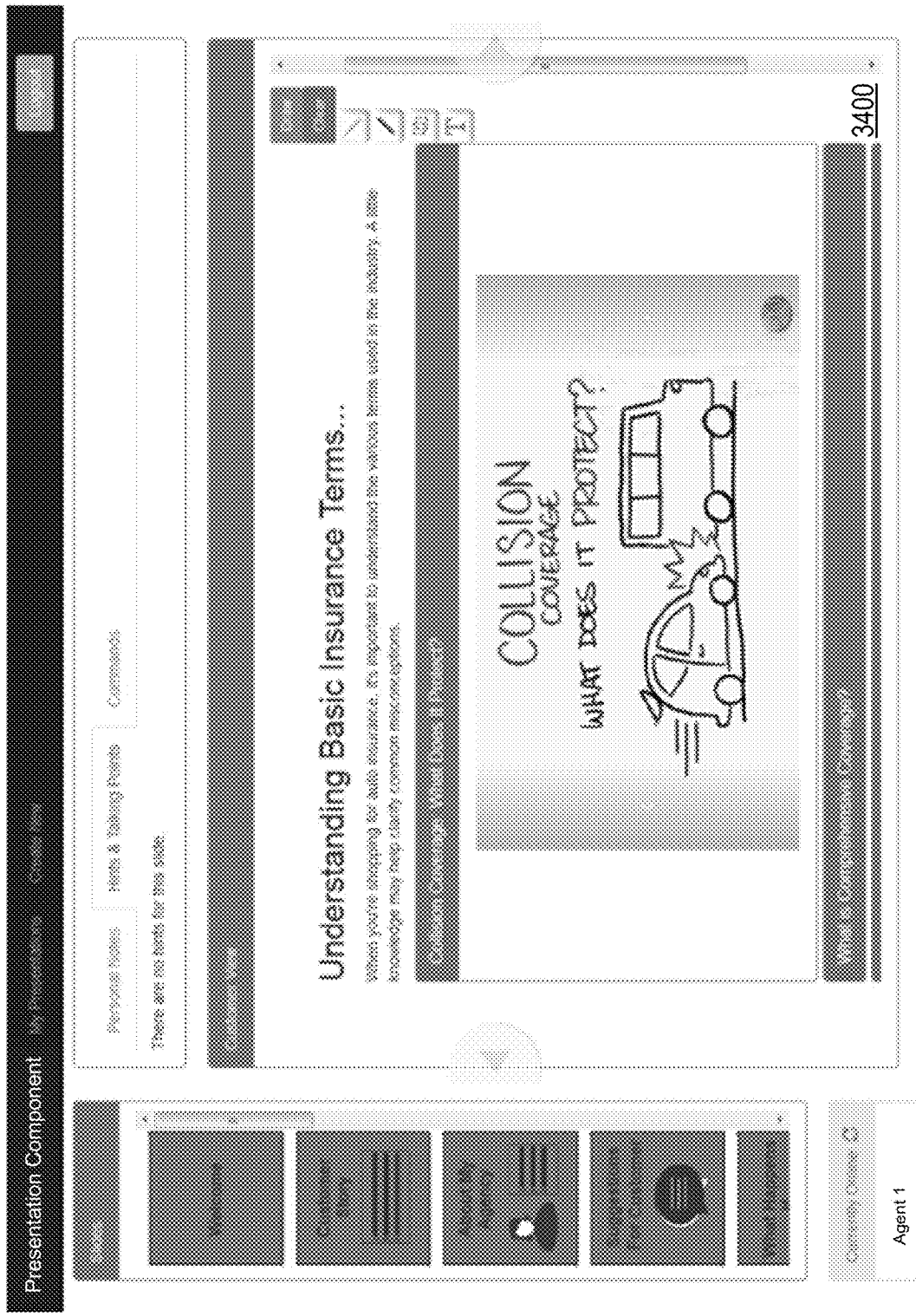
FIG. 34 illustrates an example presentation page displaying an explanation of insurance coverage, according to one or more aspects of the disclosure.
Figure 35:
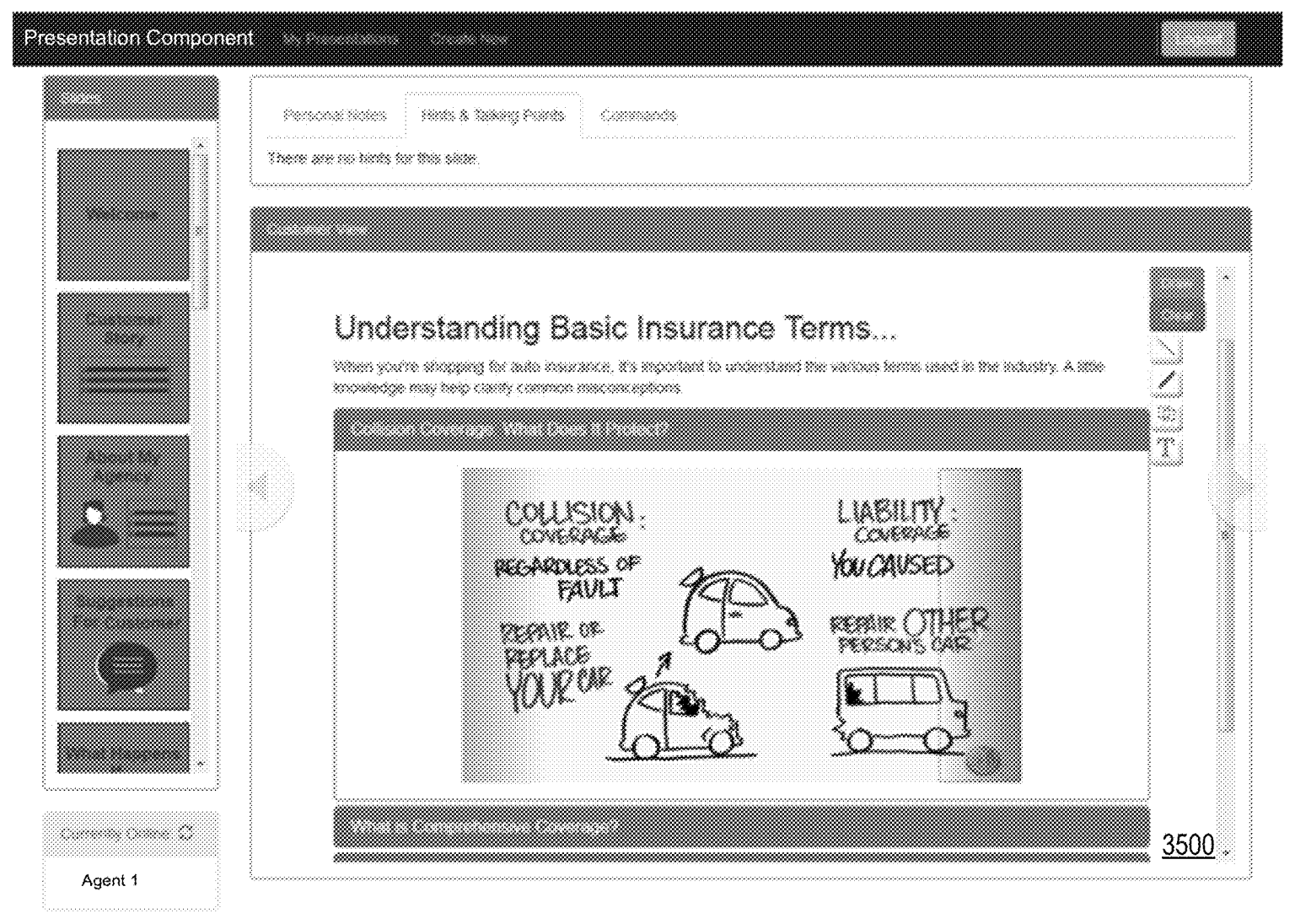
Figure 36:
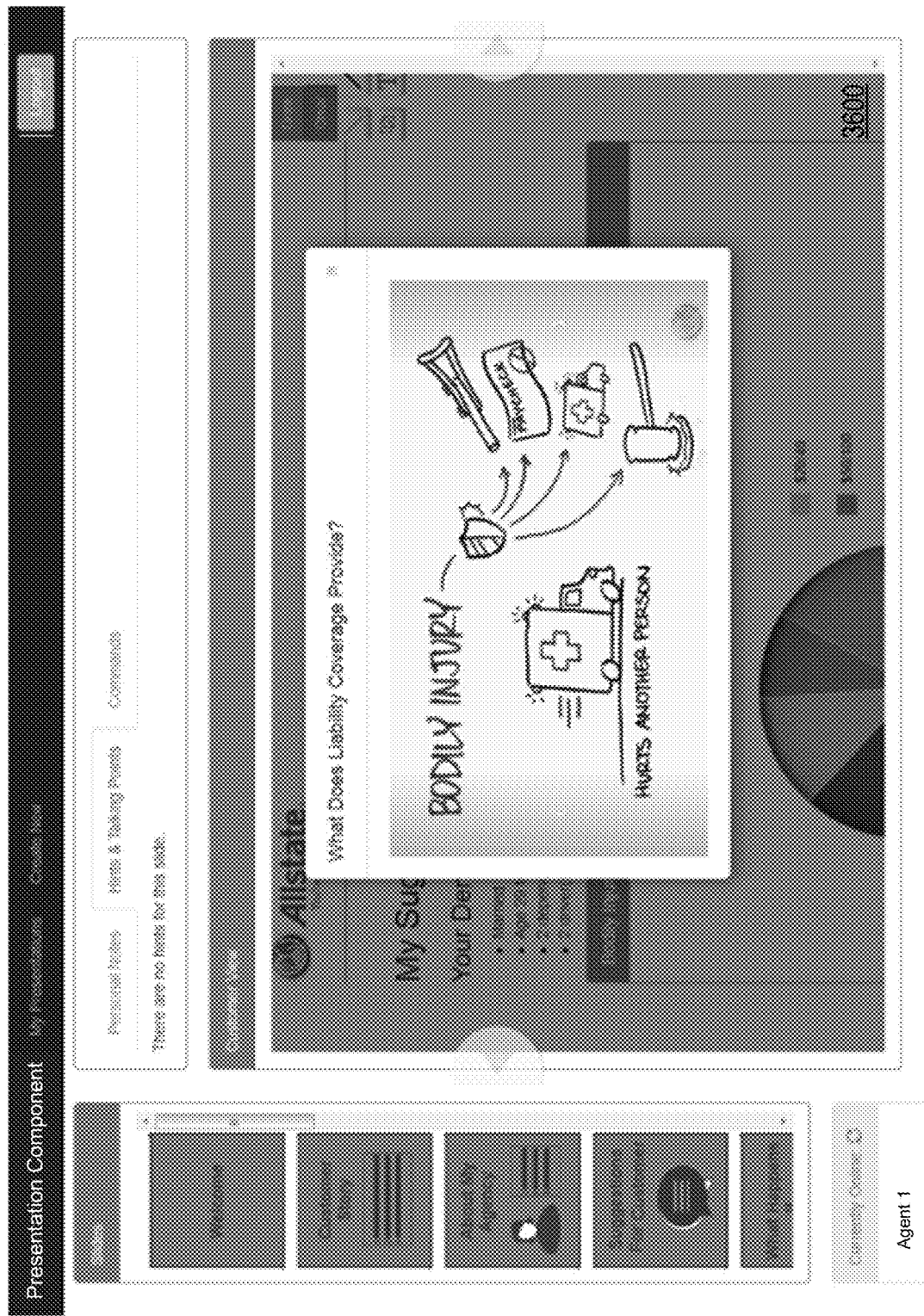
FIG. 36 illustrates an additional example presentation page displaying an explanation of insurance coverage, according to one or more aspects of the disclosure.

FIG. 34 illustrates an example presentation page 3400 displaying an explanation of insurance coverage, according to one or more aspects of the disclosure. FIG. 35 illustrates another example presentation page 3500 displaying an explanation of insurance coverage, according to one or more aspects of the disclosure. FIG. 36 illustrates an additional example presentation page 3600 displaying an explanation of insurance coverage, according to one or more aspects of the disclosure. The presentation pages 3400, 3500, and 3600 may further explain, for example, insurance terms, such as vehicle collision coverage, vehicle comprehensive coverage, vehicle liability coverage, etc. In some aspects, the content provided to the customer may comprise a video explaining the insurance terms.

Figure 37:
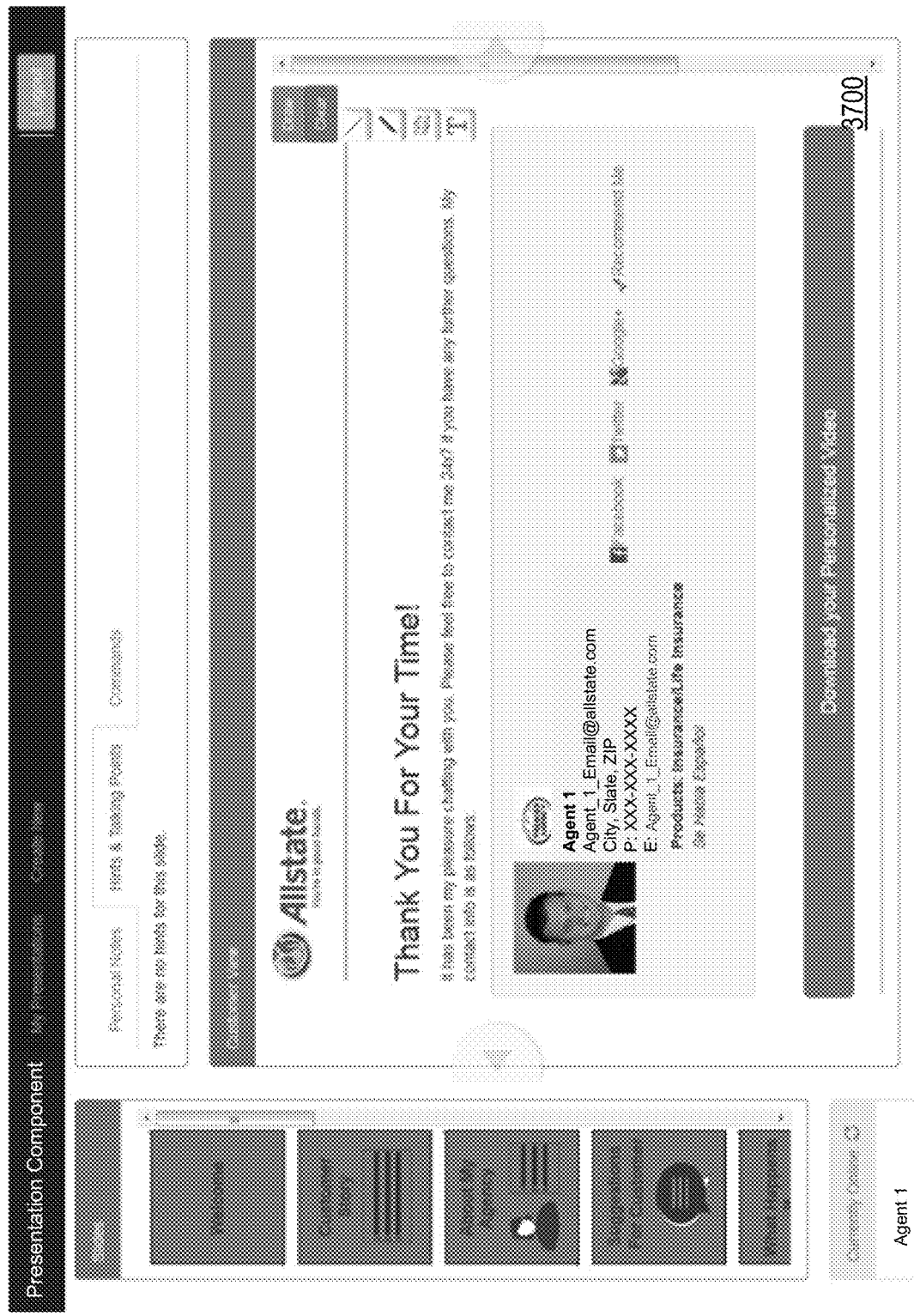
FIG. 37 illustrates an example presentation page displaying an agent's contact information, according to one or more aspects of the disclosure.

FIG. 37 illustrates an example presentation page 3700 displaying an agent's contact information, according to one or more aspects of the disclosure. The information may include, for example, the agent's name, email address, physical address, phone number, languages spoken, products provided, and photograph. As previously discussed the agent's information may be retrieved by the computing device from an agent information database 424. Pages for presenting agents' information may be made consistent by the presentation creation application (e.g., API). For example, the agent may select a slide having the agent's information while the agent creates his or her presentation. The system may retrieve the agent's information and incorporate the agent's information onto the presentation page based on a template.

Figure 38:
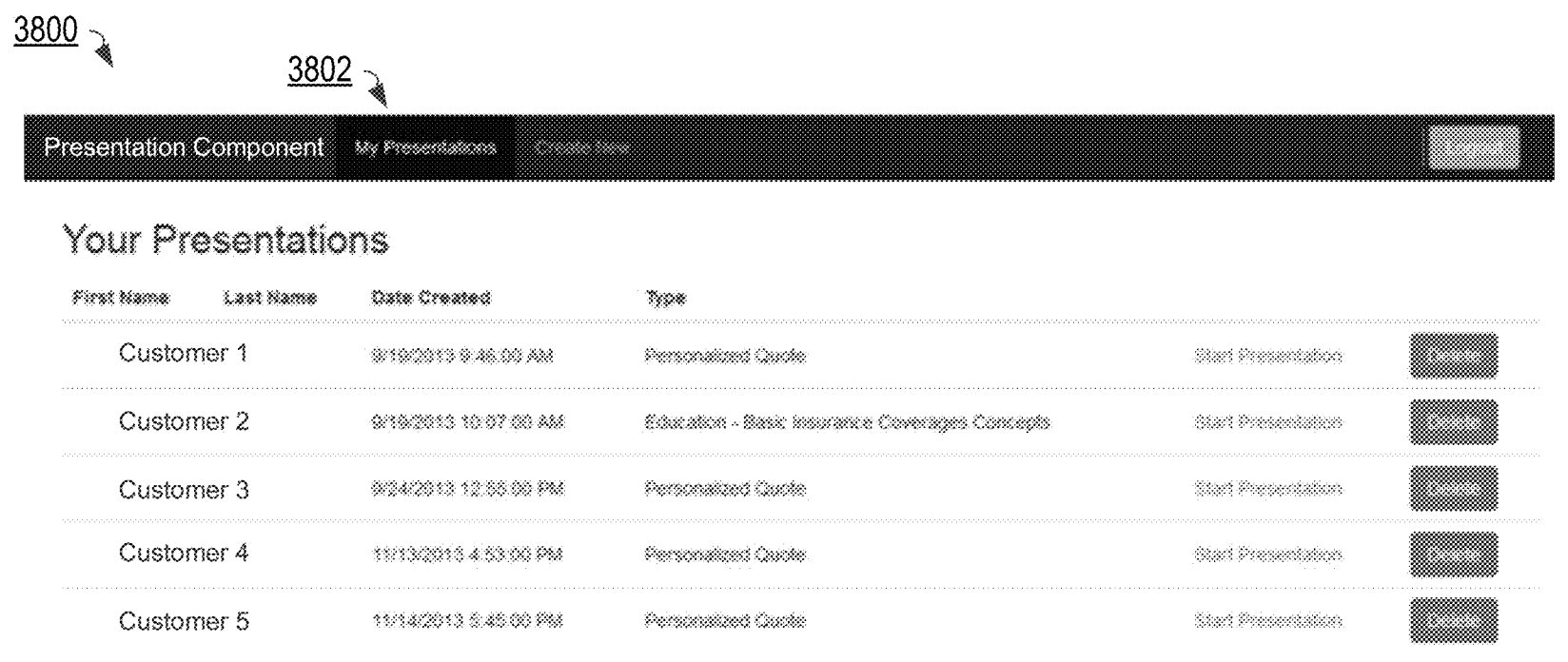

FIG. 38 illustrates an example interface 3800 listing a plurality of presentations, according to one or more aspects of the disclosure. The interface 3800 may be displayed on the agent's workstation if the agent, for example, selects My Presentations 3802 before, during, or after the presentation. The list of presentations may comprise presentations that the Agent created. The list may also identify the customer, the type of presentation, and provide options to start or delete the presentation. The presentations may include, but are not limited to, presenting new quote(s), reviewing existing policies, presentation of materials at renewal, educational content, etc.

Figure 39:
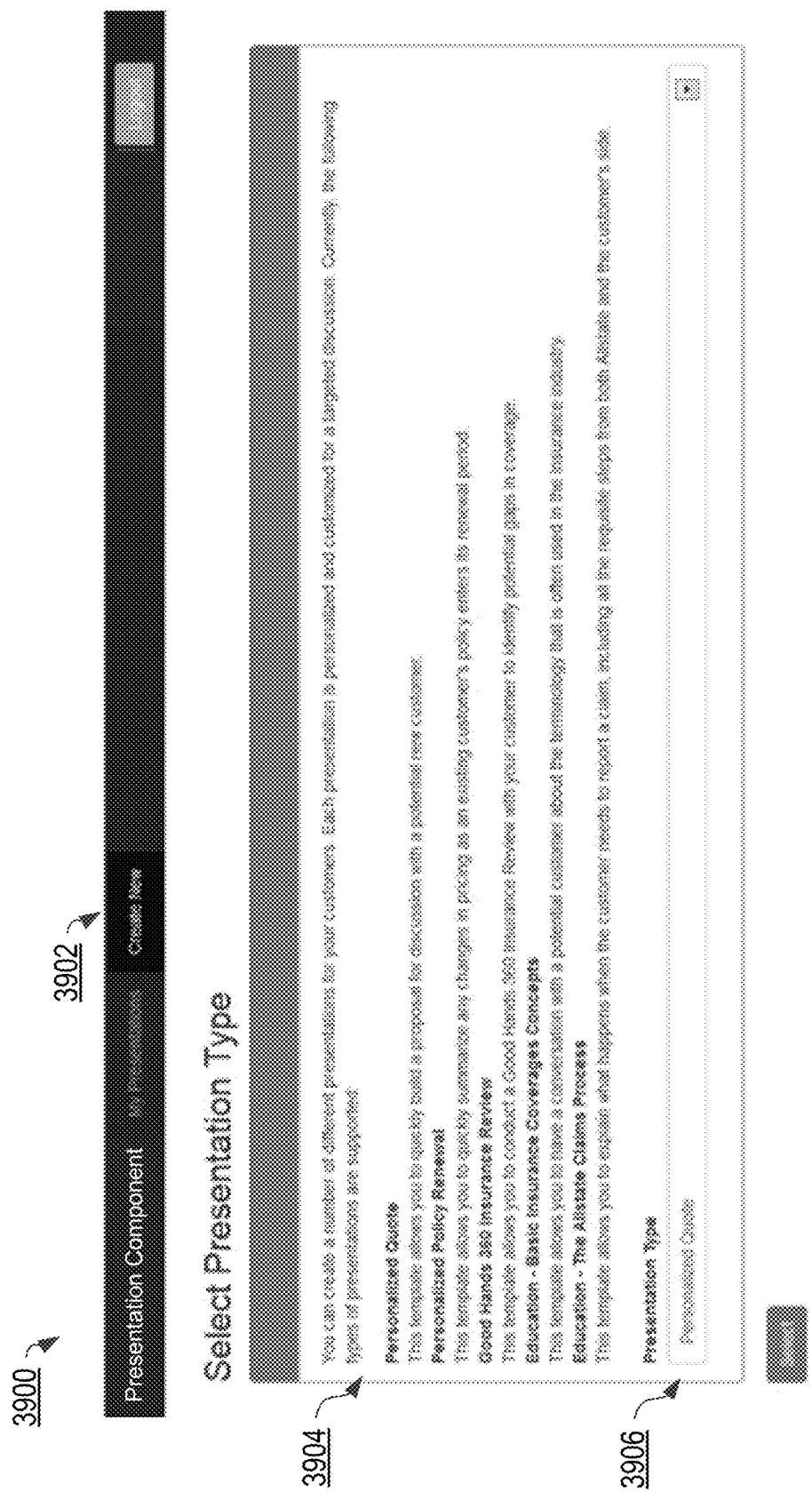
FIG. 39 illustrates an example interface for selecting a presentation type, according to one or more aspects of the disclosure.

As previously discussed and as will be discussed now in further detail, the agent may create one or more presentations, and one or more pages of the presentations (e.g., slides) may be based on templates provided by the insurance agency or an entity associated with the insurance agency, such as a third-party vendor. FIG. 39 illustrates an example interface 3900 for selecting a presentation type, according to one or more aspects of the disclosure. The interface 3900 may be displayed if, for example, the agent selects the Create New option 3902. Numerous presentation types 3904 exist, such as a personalized quote, personalized policy renewal, GOOD HANDS 360 Insurance Review, Education—Basic Insurance Coverages Concepts, and Education—The Insurance Provider Claims Process. The agent may select one of these presentation types from the dropdown menu 3906. The presentation type may be helpful for the agent to identify the presentation from a list of presentations, as illustrated in FIG. 38.

Furthermore, selection of the presentation type may determine the slide templates available during presentation creation. For example, if the agent selects a first presentation type (e.g., personalized quote), a predetermined group of template slides may be displayed by default, such as template slide numbers 1-8, 10, and 24-30. If the agent selects a second different presentation type (e.g., personalized policy renewal), a second predetermined group of template slides may be displayed by default, such as template slide numbers 5-8 and 24-30. If the agent selects a third different presentation type (e.g., Education—Basic Insurance Coverages Concepts), a third predetermined group of template slides may be displayed by default, such as template slide numbers 24-50. An interface for creating presentations will now be described with reference to FIGS. 40A-D.

FIGS. 40A-D illustrate example interfaces for creating a presentation, according to one or more aspects of the disclosure. As illustrated, FIGS. 40A-D may comprise a single presentation creation display. If all of the content in the interface does not fit in a single display screen of the agent's computing device, the computing device may provide scrolling capabilities for the presentation creation display that allows the agent to scroll to various portions of the display. Alternatively, the displays illustrated in FIGS. 40A-D may comprise multiple presentation creation display pages, and the computing device may provide the agent the ability to navigate between the separate pages.

Figure 40A:
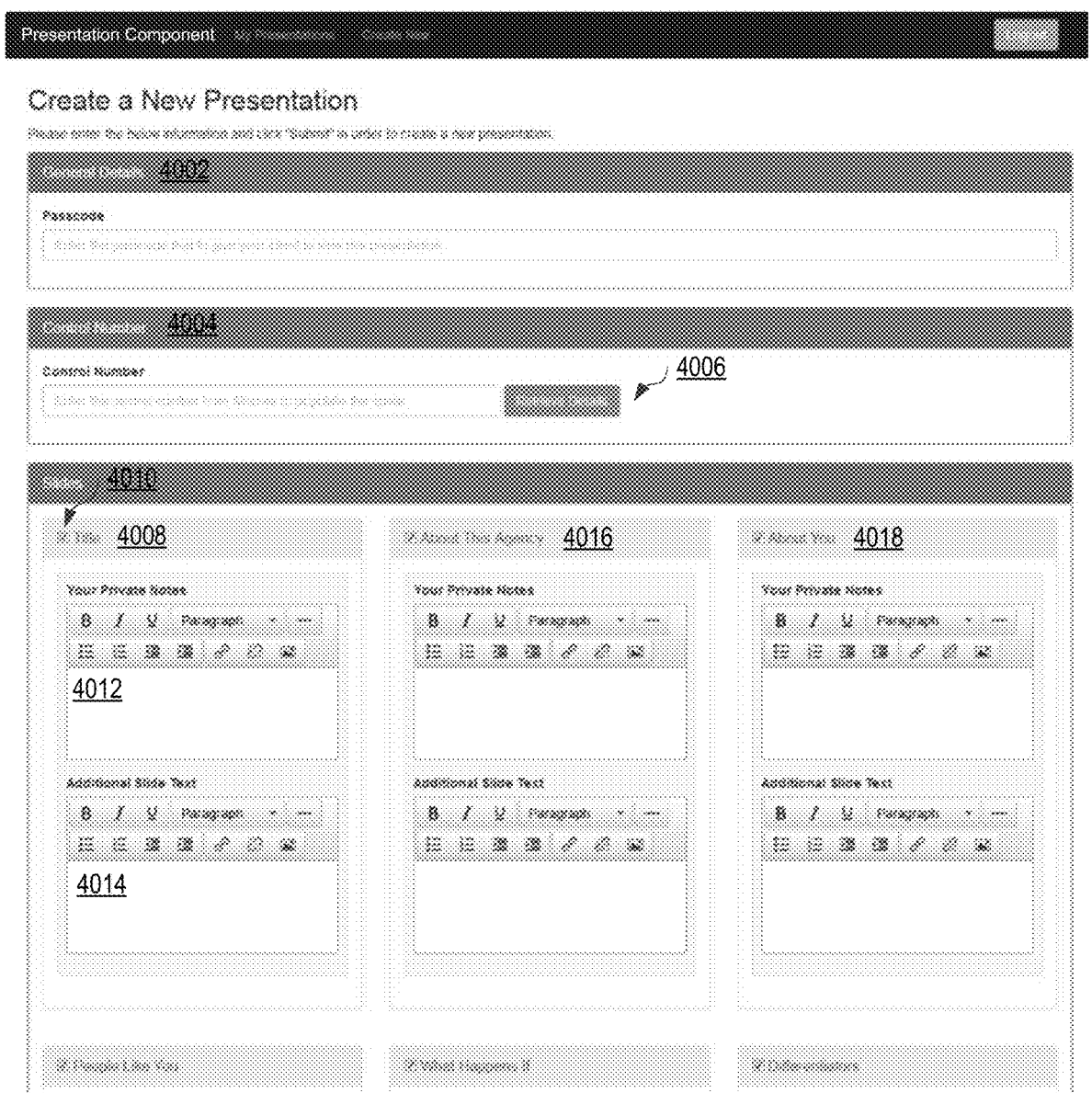
FIGS. 40A-D illustrate example interfaces for creating a presentation, according to one or more aspects of the disclosure.

Referring to FIG. 40A, the presentation creator application may request general information 4002 from the agent, such as a passcode for the presentation. The passcode may be used by customers that receive invitations from agents to access the presentation, as previously discussed. The presentation application may also request a control number 4004 (or other unique identifier for a quote or policy) from the agent. As previously discussed, the control number may identify a particular insurance quote and/or customer. In some aspects, the presentation application may retrieve available information for the quote (e.g., deductible amount, coverage amount, premium amount, date of quote, etc.) and/or customer (e.g., name, age, address, etc.) based on the control number provided by the agent and the agent selecting the Retrieve Details option 4006. One or more presentation pages may be populated with the retrieved information, as previously discussed.

The presentation application may display one or more template slides based on the selected presentation type. Examples of templates will now be provided. The "Title" slide 4008 may correspond to the presentation page displayed in FIG. 18. If the agent desires to include the title slide 4008 in his or her presentation, the agent may select the checkbox (or other U/I component, such as a radio button) 4010. As previously discussed, each template slide may comprise information that will be populated on the slide by default. In other words, the agent might not have to input default information. Rather, the system may automatically retrieve the information from one or more databases and populate the slides with the information without requiring a command from the agent. For example, the title page may include, for example, the agent's photograph and the agent's contact information by default, as previously discussed with reference to FIG. 18. Furthermore, the text that appears in the "Hints and Talking Points" section of each slide may also be default information.

The agent may have the option to add personal/private notes via data entry field 4012. These notes may appear in the "Personal Notes" section of each slide, as previously discussed. These personal notes may be saved off as important follow up information. Date/time may also be added to the notes for following up, and the agent may be alerted with the specified note at the specified date/time. The specified date/time may be during the presentation or at a future date/time. The agent may also have the option to add additional slide text via data entry field 4014. The additional slide text may appear in the presentation slide, with the default presentation text.

The "About this Agency" slide 4016 may correspond to the presentation page displayed in FIG. 20. The "About You" slide 4018 may correspond to the presentation page displayed in FIG. 19.

Figure 40B:
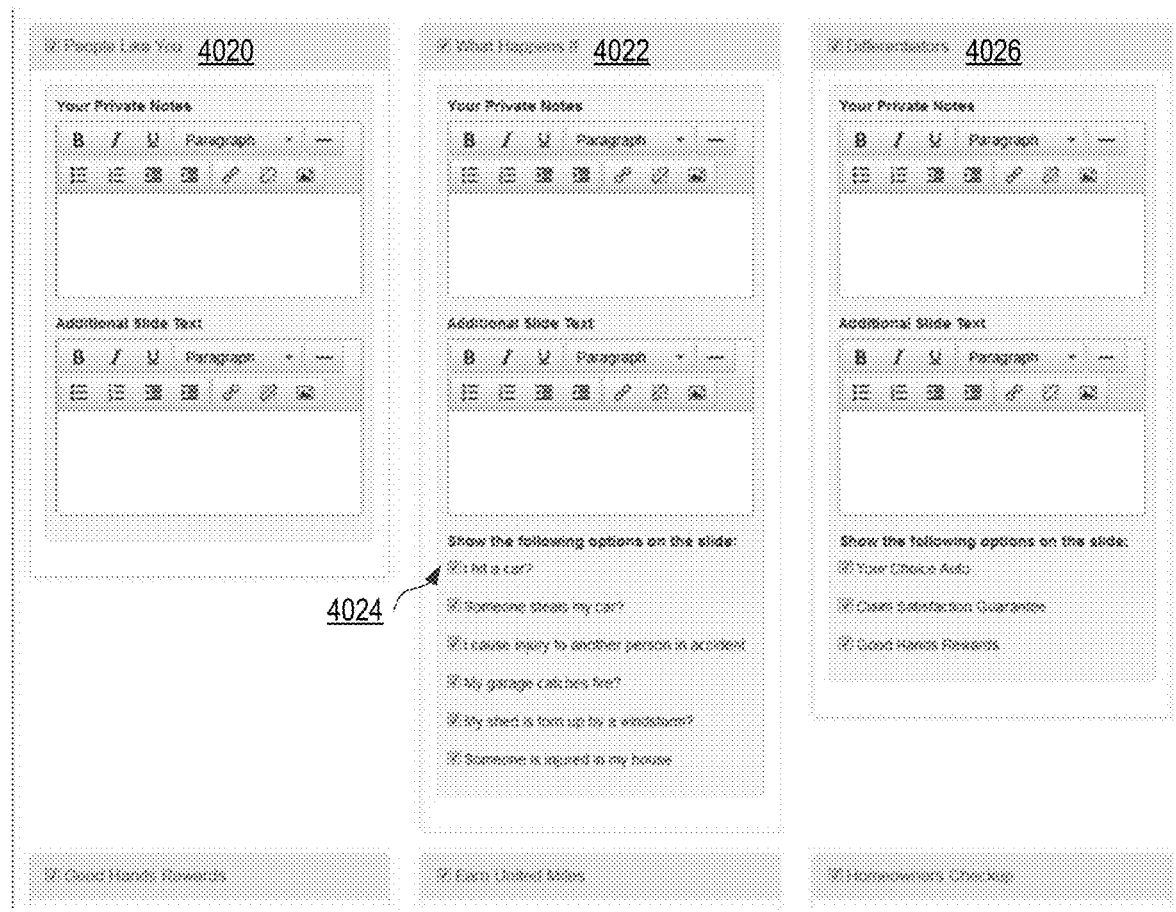

With reference to FIG. 40B, the "People Like You" slide 4020 may correspond to the presentation pages displayed in FIG. 21 and FIG. 22. The "What Happens If" slide 4022 may correspond to the presentation page displayed in FIG. 23, which may display one or more questions and answers. The agent may select one or more default questions (and answers) to include on the slide by selecting one of the options 4024 (e.g., "I hit my car?", "Someone steals my car?", etc.). In some aspects, the default questions may be a list of recommended questions based on one or more of the customer's information (e.g., age, geographical region, income, types of insurance interested in, etc.), the frequency that other agents have included the questions in their presentations, and the success rate for each question, as previously discussed with reference to FIG. 23.

The presentation application may also display, next to each question, an indication of the frequency of inclusion and/or the success rate (not illustrated). For example, the indication for the "I hit a car?" question may include a percentage number (e.g., 62%) that indicates that 62% of presentations created using the presentation application have included that question. Similarly, the indication for the "Someone steals my car?" question may comprise a number indicating the success rate for that question. For example, the indication may be 27% if the percent success rate of presentations including the "Someone steals my car?" question is 27% (e.g., presentations that result in a quote bind or any other measurement of success). Each question may include one or more of the above-described indications. In some aspects, an option may be presented to the agent to display only the frequency of inclusion indication, only the success rate indication, or both the frequency of inclusion indication and the success rate indication.

The default list of questions and answers may dynamically change. For example, as a question becomes more frequently included in presentations and/or result in more quote binds, the questions may be pushed up the list. The opposite may be true for questions that become less frequently included or do not result in quote binds. The list may comprise a predetermined number of questions (e.g., 6 questions as illustrated in FIG. 40B). Accordingly, a question that is at the bottom of the list (e.g., question 6) may be removed from the list if another question not on the list becomes more frequently included in presentations and/or results in more quote binds than question 6. The template slide 4022 may also include a data entry field for the agent to manually add one or more questions and answers. For example, the agent may manually input these questions and answers into the additional slide text data entry field.

The "Differentiators" slide 4026 may correspond to the presentation page displayed in FIG. 24. Similar to the "What Happens If" slide 4022, the agent may select from a list of differentiators to include in the presentation.

Figure 40C:
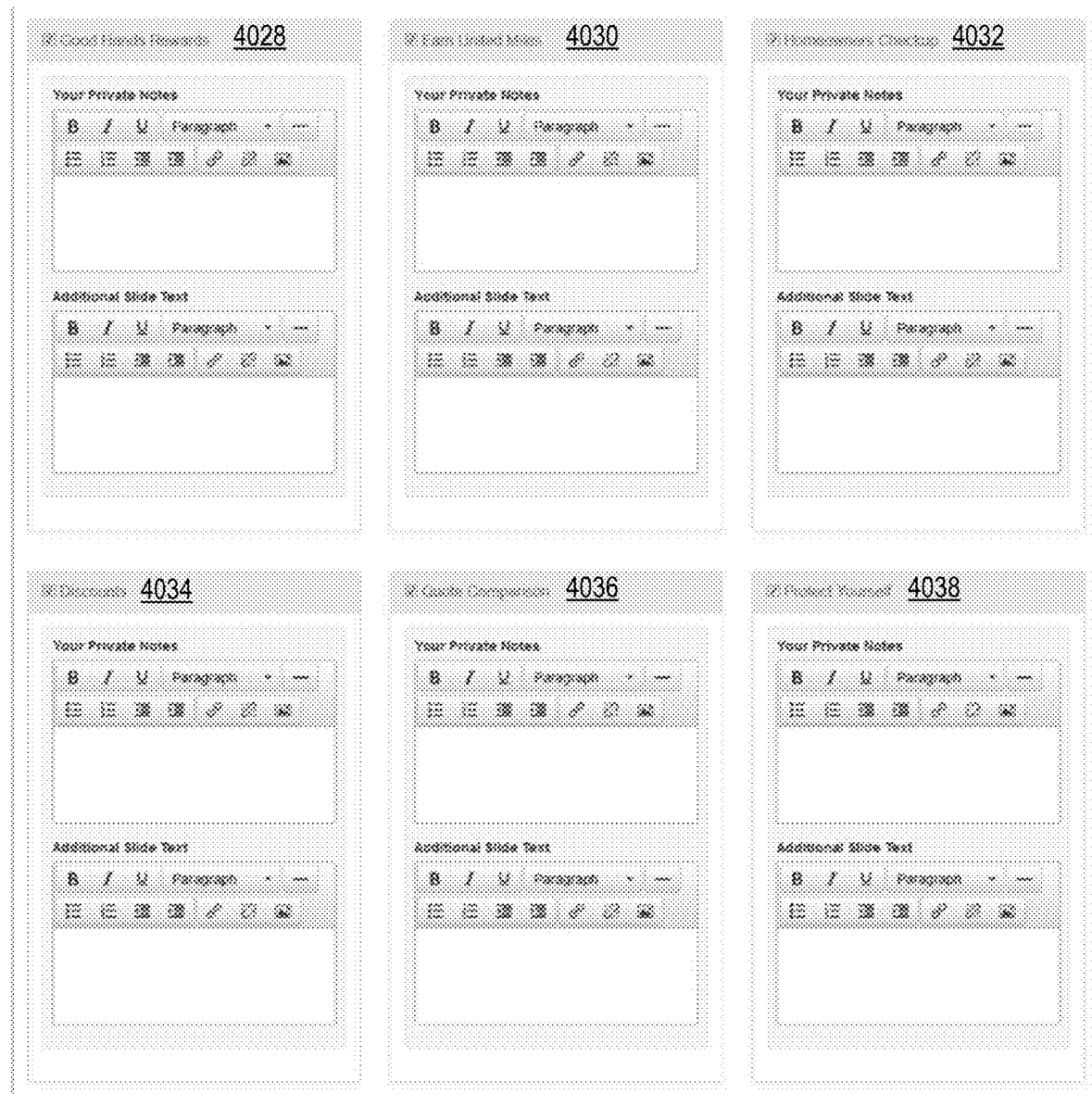

With reference to FIG. 40C, the "Good Hands Rewards" slide 4028 may correspond to the presentation page displayed in FIG. 25. The "Earn United Miles" slide 4030 may correspond to the presentation page displayed in FIG. 26. The "Homeowners Checkup" slide 4032 may correspond to the presentation page displayed in FIG. 27. The "Discounts" slide 4034 may correspond to the presentation page displayed in FIG. 28.

The "Quote Comparison" slide 4036 may correspond to the presentation pages displayed in FIG. 29 and FIG. 30. In some aspects, the slide 4036 may include one or more option (not illustrated) for generating and/or displaying quote adjustments based on quotes previously provided to the customer, quotes provided to other customers in the same demographic group as the customer, and/or quotes provided to the customer's contacts, as previously discussed with reference to FIG. 29 and FIG. 30. The option may include a checkbox, radio button, or other UI component. The agent may select an option for the quote generators to generate quote adjustments or for the quote generators to send the quote adjustments for display to the agent (and subsequent manual quote adjustment by the agent). There may also be separate options for quote alignment based on (1) quotes previously provided to the customer, (2) quotes provided to the customer's demographic group, and (3) quotes provided to the customer's contacts.

The "Protect Yourself" slide 4038 may correspond to the presentation page displayed in FIG. 31. The slide 4038 may include one or more option to include the map and/or claims, dollar amounts, and other information on the map, as previously described with reference to FIG. 31.

Figure 40D:
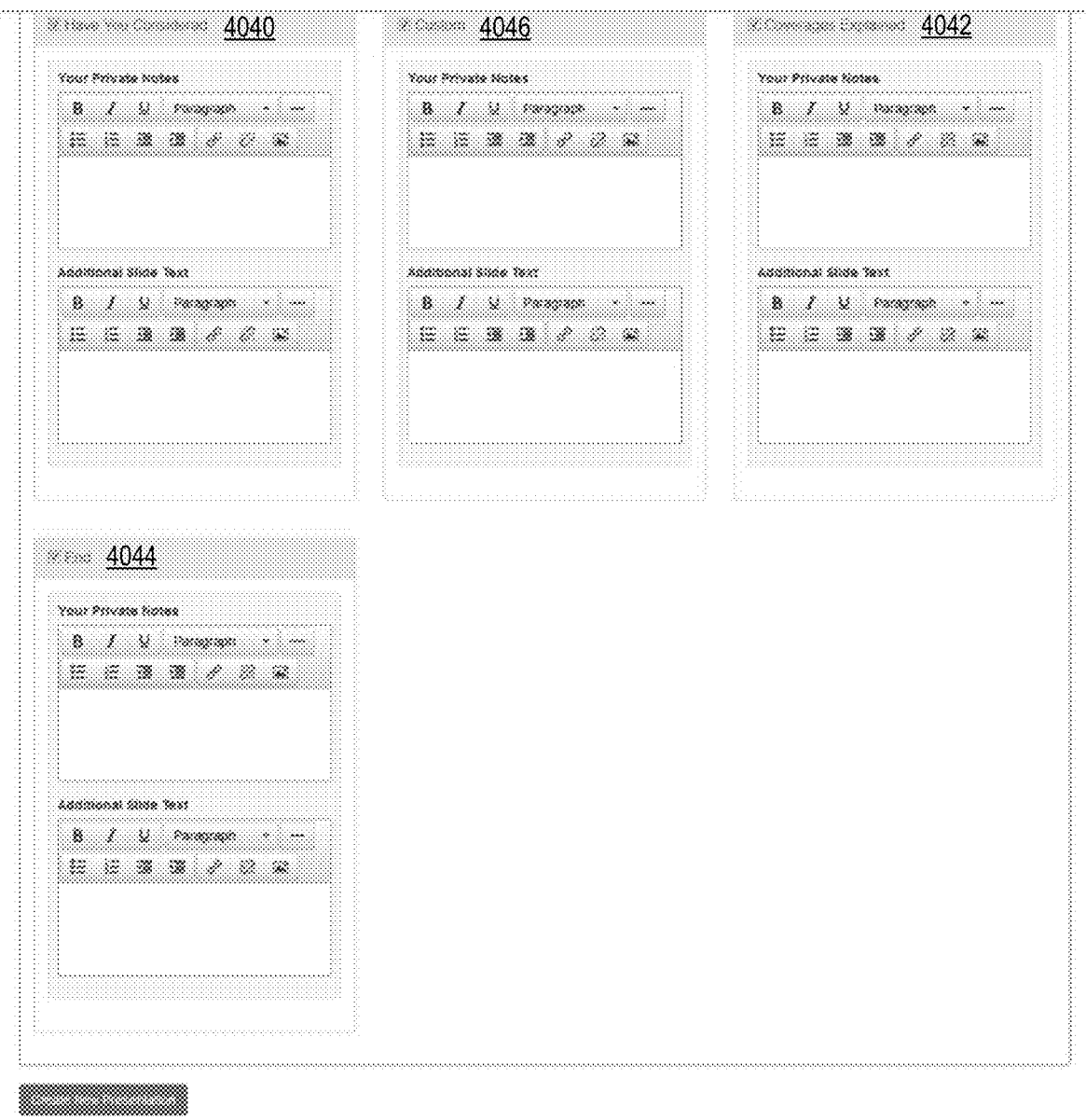

With reference to FIG. 40D, the "Have You Considered" slide 4040 may correspond to the presentation pages displayed in FIG. 32, FIG. 33, and FIG. 36. The "Coverages Explained" slide 4042 may correspond to the presentation pages displayed in FIG. 34 and FIG. 35. The "End" slide 4044 may correspond to the presentation page displayed in FIG. 37.

The presentation application may also permit the agent to generate one or more custom slides 4046. In some aspects, the custom slides might not include any default information. Rather, the agent may manually provide all of the information included in the custom slides. Alternatively, the custom slides might include a limited amount of default information (e.g., less default information than the template slides). The agent may manually provide the remaining information. The custom slides may also retrieve information from one or more databases, such as a customer database, an agent database, a claims history database, or any other database. In these examples, the agent might include a reference to the information (e.g., a URI, such as a URL or URN), and the presentation application might include that information on the slide. The custom slides may be made available to other agents for use. If the custom slides are successful (e.g., based on positive custom reviews or quote binds), they may be converted into template slides and included in the presentation application by default.

Similar to frequently asked questions and answers, a computing device may track the frequency of use and/or the success rates of each presentation slide. An indication of these numbers may be displayed next to the template slides illustrated in FIGS. 40A-D. Take the "Coverages Explained" slide 4042 for example. The presentation application may display a frequency that slide 4042 is included in presentations created using the presentation application. For example, if slide 4042 is included in 73% of presentations, the presentation application my display 73% frequency of use corresponding to slide 4042. Additionally or alternatively, the presentation application may display a success rate for slide 4042, such as the frequency that presentations that include slide 4042 result in a quote bind and/or result in favorable customer surveys. For example, if slide 4042 is included in 35% of successful presentations, the presentation application my display 35% success rate corresponding to slide 4042. Other indications, such as colors, symbols, and the like may be used in lieu of or in addition to the numbers to identify frequency of use or success rate. The indicators may be displayed for any of the slides. The indications may assist the agent in determining which slides to include in his or her presentation.

A computing device may track other slide metrics that may be useful to agents. For example, the computing device may track the aggregate or average amount of time spent by the agent (and correspondingly by the customer viewing the presentation) on a particular slide (e.g., eight minutes on average for the "Coverages Explained" slide). The amount of time information may be displayed for the corresponding slide in the presentation application. The agent may use the amount of time information to determine, for example, that the slide is a popular slide and that the agent should consider including it in his or her presentation. Alternatively, if the amount of time spent on a slide is too high (e.g., above a predetermined threshold), the agent may consider steps to reduce the amount of information included in the slide. For example, the agent might consider including fewer questions and answers in the "What Happens If" slide if agents historically spend too much time on that slide. The computing device may notify the agent that the amount of time is too high.

The computing device may also track the aggregate or average number or percentage of customers that interact with a particular slide (e.g., 24% of customer clicked on a U/I element in slide 1). The computing device may also track how many times customers interact with a slide (e.g., customers on average clicked on a U/I element in slide 2 4.3 times). Example interactions including, but are not limited to, clicking buttons, opening links, opening sections, opening pop-ups or pop-overs, scrolling, entering information, hovering over a display element, and the like. During the presentation, the agent may be notified if the customer interacts with the slide and what type of interaction it is. The customer may also be given the option to upload information, such as documents, through the presentation application. The document may then be displayed to the agent. The uploaded document may comprise a quote from a competitor of the insurance provider, and the agent may use the uploaded document to compare quotes and/or to adjust the customer's quote (e.g., decreasing the premium amount if the competitor's premium amount is lower). The customer may also be permitted to upload the information prior to starting the presentation, such as in response to the link sent by the agent to initiate the presentation. The agent may review the uploaded information prior to the presentation.

In addition to displaying the slide metrics when agents are creating presentations, the slide metrics may be displayed to the agent during the presentation (e.g., in real time). The agent may use these metrics to change slides, add slides, and/or remove slides in response to these metrics. The system may suggest a talk path for the agent based on saved data on what the optimal outcome would be based on a customer's interaction with the presentation. Furthermore, the system may place the customer into a demographic group based on the customer's interactions with the presentation. The system may proceed to track the success for that user as well as the user's demographic group. Furthermore, if a significant amount of time (e.g., greater than a threshold amount of time) is being spent on a particular slide, the system may determine the topic of the slide, determine additional slides of the same topic (or related topics), and provide suggestions to the agent to add one or more of the additional slides to the presentation.

The success rates for each agent may also be tracked. As previously described, a successful presentation may occur when, for example, the customer accepts a quote, responds favorably to the agent's presentation (e.g., in a survey), etc. For example, assume that the most-successful agent with the insurance provider is a 78% success rate. The computing device may provide the presentations for the most-successful agent (or top 10% of agents) to other agents. The other agents may use the successful presentations (modified with the appropriate customer, agent, and quote information) or base their presentations off the successful presentations.

A computing device may track success rates and/or otherwise store information indicating success rates for each agent, presentation, presentation page, and/or question and answer pair. For example, each agent, presentation, presentation page, and/or question and answer pair may have an identifier, such as a unique alphanumeric code. Any other identifiers may be used. For example, agents may be identified by name, employee ID, and the like. A presentation may be identified by the name of the agent that created the presentation, the title of the presentation, the customer for whom the presentation is directed, or any other identifier. A presentation page may be identified by the title of the presentation page, a unique code assigned to the presentation page, and the like. A question and answer pair may be identified by a word or phrase that describes the question and answer pair, a unique identifier for the pair, or any other identifier. The identifiers previously listed are merely exemplary, and any identifier used to identify and track success rates of each agent, presentation, presentation page, and/or question and answer pair may be used.

By using the identifiers described above, the computing device may track success rates for each agent, presentation, presentation page, and/or question and answer pair and store the success rate information in one or more databases for later retrieval. The computing device may store the identifier for the agent, presentation, presentation page, and/or question and answer pair and a success counter for the identifier. If a success event (e.g., a positive customer review or a quote acceptance) occurs, the computing device my increment the counter for the identifier. Optionally, the computing device may decrement the counter if an unsuccessful event occurs. For example, if a customer accepts a quote during a presentation, success counters for the agent, the presentation, each of the presentation pages in the presentation, and/or each of the question and answer pairs may be incremented. Success counters may similarly be incremented if the customer accepts the quote after the presentation has ended, such as if the agent forwards the presentation information to the customer to give the customer more time to decide. Identifiers for the agent, presentation, presentation pages, and/or question and answer pairs may also be sent to the customer. When the customer decides later to accept the quote, the computing device may receive an indication of one or more identifiers with the customer's acceptance and increment the corresponding success counters. The computing device may increment or decrement counters based on whether the agent or presentation received a favorable customer review or an unfavorable customer review in a similar manner.

The computing device may additionally or alternatively correlate the identifier for each agent, presentation, presentation page, and/or question and answer pair with a quote ID (e.g., a control number). When the customer accepts a quote, the computing device may receive an indication that the customer accepted the quote along with the quote ID. The computing device may correlate the quote ID with the identifier for the agent, presentation, presentation page, and/or question and answer pair and increment the corresponding success counters. For example, the display 3802 in FIG. 38 may include another column for the presentation or agent identifier and/or for the quote ID.

The computing device may similarly track the frequency that each presentation page is used (or any other metric previously discussed). For example, the computing device may maintain, such as in a database, a frequency counter for each presentation page and/or question and answer pair. The counter may be incremented each time the presentation page and/or question and answer pair is included in a presentation. The counter may optionally be decremented each time the presentation page and/or question and answer pair is not included in a presentation.

By directing the agent to focus on particular types of content to include in presentations, videos, and/or magazines, the computing device may assist the agent to be elevated to a higher level, such as from an advisor to a trusted advisor. The types of content to be displayed may be content that show that the agent has knowledge of the customer's circumstances and/or can help the customer become aware and smarter about the decisions the customer makes in his or her life. This content may point the customer to information or coverages that protect the customer and the things or people that matter the most to the customer. The content may also point the customer to information or coverages that help the customer recover from any unexpected losses and assist with preventing losses from occurring.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A method comprising:
   determining, by a computing device and based on a quantity of previous successful insurance presentations that comprised insurance quotes accepted by one or more customers, a success rate for a first presentation page, wherein the previous successful insurance presentations included the first presentation page;
   determining, by the computing device, in response to an insurance agent being authenticated, and based on real-time information provided by a customer device of a current customer during a handshake session, capabilities of the customer device of receiving an interactive quote session facilitating a live video chat, wherein the customer device is remote from the computing device;
   initiating, by the computing device, in response to an instruction to initiate the interactive quote session, and based on a determination that the customer device has the capabilities of receiving the interactive quote session, the interactive quote session, during which a current insurance presentation is presented to the current customer via the customer device, wherein the current insurance presentation comprises a current insurance quote for the current customer;
based on the success rate for the first presentation page, generating a display of a recommendation for the insurance agent to include the first presentation page in the current insurance presentation;
receiving a selection of an option to include the first presentation page in the current insurance presentation;
based on historical data indicating that an amount of time that insurance agents spent on the first presentation page in one or more of the previous successful insurance presentations exceeded a first time threshold, causing, by the computing device, and while the current insurance presentation is being presented to the current customer during the interactive quote session, update of the first presentation page to reduce an amount of information included in the first presentation page;
causing, by the computing device, and while the current insurance presentation is being presented to the current customer during the interactive quote session, display of the updated first presentation page during the current insurance presentation; and
causing, by the computing device, while the current insurance presentation is being presented to the current customer during the interactive quote session, and based on determining that an amount of time spent, by the insurance agent, on the updated first presentation page during the current insurance presentation exceeds a second time threshold, display of one or more additional presentation pages having a same topic as the updated first presentation page during the current insurance presentation.

2. The method of claim 1, wherein the display of the recommendation for the insurance agent to include the first presentation page comprises a display of the first presentation page and a display of the success rate for the first presentation page.

3. The method of claim 1, wherein the success rate comprises one or more of the following:
a frequency that a plurality of previous insurance presentations resulted in an acceptance of an insurance quotation, or
a frequency that insurance agents presenting a plurality of previous insurance presentations received positive reviews from customers.

4. The method of claim 1, further comprising:
sending a notification that the amount of time spent by insurance agents on the first presentation page in one or more of the previous successful insurance presentations exceeded the first time threshold.

5. The method of claim 1,
wherein the display of the recommendation for the insurance agent to include the first presentation page comprises a display of the first presentation page and a display of the amount of time spent by insurance agents on the first presentation page in one or more the previous successful insurance presentations.

6. The method of claim 1, further comprising:
determining, by the computing device, a number of customers that interacted with the first presentation page during presentations of a plurality of previous insurance presentations,
wherein generating the display of the recommendation for the insurance agent to include the first presentation page in the current insurance presentation is based on the number of customers that interacted with the first presentation page.

7. The method of claim 1, further comprising:
providing, based on demographics information of the current customer, a question and answer pair on the first presentation page in response to a selection by the insurance agent of the question and answer pair;
determining a frequency that a plurality of previous insurance presentations including the question and answer pair resulted in an acceptance of an insurance quotation; and
based on the frequency that the plurality of previous insurance presentations including the question and answer pair resulted in an acceptance of an insurance quotation, generating a display of a recommendation for the insurance agent to include the question and answer pair on the first presentation page.

8. The method of claim 1, wherein the interactive quote session is supported by one or more microphones or cameras.

9. A system comprising:
an agent display device;
a customer device of a current customer; and
a computing device, the computing device comprising:
a processor; and
a memory device communicatively coupled to the processor, the memory device storing instructions that, when executed by the processor, cause the computing device to:
determine, based on a quantity of previous successful insurance presentations that comprised insurance quotes accepted by one or more customers, a success rate for a first presentation page, wherein the previous successful insurance presentations included the first presentation page;
determine, in response to an insurance agent being authenticated, and based on real-time information provided by the customer device during a handshake session, capabilities of the customer device of receiving an interactive quote session facilitating a live video chat, wherein the customer device is remote from the computing device;
initiate, in response to an instruction to initiate the interactive quote session, and based on a determination that the customer device has the capabilities of receiving the interactive quote session, the interactive quote session, during which a current insurance presentation is presented to the current customer via the customer device, wherein the current insurance presentation comprises a current insurance quote for the current customer;
based on the success rate for the first presentation page, send an instruction for the agent display device to display a recommendation for the insurance agent to include the first presentation page in the current insurance presentation;
receive an agent selection of an option to include the first presentation page in the current insurance presentation;
based on historical data indicating that an amount of time that insurance agents spent on the first presentation page in one or more of the previous successful insurance presentations exceeded a first time threshold, cause, while the current insurance presentation is being presented to the current customer during the interactive quote session, update of the first presentation page to reduce an amount of information included in the first presentation page;

cause, while the current insurance presentation is being presented to the current customer during the interactive quote session, display of the updated first presentation page during the current insurance presentation; and based on determining that an amount of time spent, by the insurance agent, on the updated first presentation page during the current insurance presentation exceeds a second time threshold, cause, while the current insurance presentation is being presented to the current customer during the interactive quote session, display of one or more additional presentation pages having a same topic as the updated first presentation page during the current insurance presentation.

10. The system of claim 9, wherein the success rate comprises one or more of the following:
 a frequency that a plurality of previous insurance presentations resulted in an acceptance of an insurance quotation, or
 a frequency that insurance agents presenting a plurality of previous insurance presentations received positive reviews from customers.

11. The system of claim 9, wherein the interactive quote session is supported by one or more microphones or cameras.

12. The system of claim 9, wherein the display of the recommendation for the insurance agent to include the first presentation page comprises a display of the first presentation page and a display of the success rate for the first presentation page.

13. A non-transitory computer readable medium storing instructions that, when executed by a processor, cause the processor to:
 determine, based on a quantity of previous successful insurance presentations that comprised insurance quotes accepted by one or more customers, a success rate for a first presentation page, wherein the previous successful insurance presentations included the first presentation page;
 determine, in response to an insurance agent being authenticated, and based on real-time information provided by a customer device of a current customer during a handshake session, capabilities of the customer device of receiving an interactive quote session facilitating a live video chat, wherein the customer device is remote from the processor;
 initiate, in response to an instruction to initiate the interactive quote session, and based on a determination that the customer device has the capabilities of receiving the interactive quote session, the interactive quote session during which a current insurance presentation is presented to the current customer via the customer device, wherein the current insurance presentation comprises a current insurance quote for the current customer;
 based on the success rate for the first presentation page, generate a display of a recommendation for the insurance agent to include the first presentation page in the current insurance presentation;
 receive a selection of an option to include the first presentation page in the current insurance presentation;
 based on historical data indicating that an amount of time that insurance agents spent on the first presentation page in one or more of the previous successful insurance presentations exceeded a first time threshold, cause, while the current insurance presentation is being presented to the current customer during the interactive quote session, update of the first presentation page to reduce an amount of information included in the first presentation page;
 cause, while the current insurance presentation is being presented to the current customer during the interactive quote session, display of the updated first presentation page during the current insurance presentation; and
 cause, while the current insurance presentation is being presented to the current customer during the interactive quote session, and based on determining that an amount of time spent, by the insurance agent, on the updated first presentation page during the current insurance presentation exceeds a second time threshold, display of one or more additional presentation pages having a same topic as the updated first presentation page during the current insurance presentation.

14. The non-transitory computer readable medium of claim 13, wherein the display of the recommendation for the insurance agent to include the first presentation page comprises a display of the first presentation page and a display of the success rate for the first presentation page.

15. The non-transitory computer readable medium of claim 13, wherein the success rate comprises one or more of the following:
 a frequency that a plurality of previous insurance presentations resulted in an acceptance of an insurance quotation, or
 a frequency that insurance agents presenting a plurality of previous insurance presentations received positive reviews from customers.

16. The non-transitory computer readable medium of claim 13, wherein the interactive quote session is supported by one or more microphones or cameras.

17. The non-transitory computer readable medium of claim 13,
 wherein the display of the recommendation for the insurance agent to include the first presentation page comprises a display of the first presentation page and a display of the amount of time spent by insurance agents on the first presentation page in one or more the previous successful insurance presentations.

18. The non-transitory computer readable medium of claim 13, further storing instructions that, when executed by the processor, cause the processor to:
 determine a number of customers that interacted with the first presentation page during presentations of a plurality of previous insurance presentations,
 wherein generating the display of the recommendation for the insurance agent to include the first presentation page in the current insurance presentation is based on the number of customers that interacted with the first presentation page.

19. The non-transitory computer readable medium of claim 13, further storing instructions that, when executed by the processor, cause the processor to:
 provide, based on demographics information of the current customer, a question and answer pair on the first presentation page in response to a selection by the insurance agent of the question and answer pair.

20. The non-transitory computer readable medium of claim 19, further storing instructions that, when executed by the processor, cause the processor to:
 determine a frequency that a plurality of previous insurance presentations including the question and answer pair resulted in an acceptance of an insurance quotation; and based on the frequency that the plurality of previous insurance presentations including the question and answer pair resulted in an acceptance of an insurance quotation, generate a display of a recommendation for the insurance agent to include the question and answer pair on the first presentation page.

\* \* \* \* \*